United States Patent
Kuriki et al.

(10) Patent No.: US 12,322,758 B2
(45) Date of Patent: Jun. 3, 2025

(54) SECONDARY BATTERY, ELECTRONIC DEVICE, AND VEHICLE

(71) Applicant: SEMICONDUCTOR ENERGY LABORATORY CO., LTD., Atsugi (JP)

(72) Inventors: Kazutaka Kuriki, Kanagawa (JP); Yumiko Yoneda, Kanagawa (JP); Yohei Momma, Kanagawa (JP); Teruaki Ochiai, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 669 days.

(21) Appl. No.: 17/616,582

(22) PCT Filed: May 26, 2020

(86) PCT No.: PCT/IB2020/054945
§ 371 (c)(1),
(2) Date: Dec. 3, 2021

(87) PCT Pub. No.: WO2020/245701
PCT Pub. Date: Dec. 10, 2020

(65) Prior Publication Data
US 2022/0231341 A1 Jul. 21, 2022

(30) Foreign Application Priority Data
Jun. 7, 2019 (JP) ................... 2019-106816

(51) Int. Cl.
*H01M 10/0568* (2010.01)
*C01G 51/00* (2025.01)
(Continued)

(52) U.S. Cl.
CPC ....... *H01M 10/0568* (2013.01); *H01M 4/525* (2013.01); *H01M 4/587* (2013.01);
(Continued)

(58) Field of Classification Search
CPC .......... H01M 10/0568; H01M 50/121; H01M 50/124; H01M 50/119; H01M 4/525;
(Continued)

(56) References Cited

U.S. PATENT DOCUMENTS 9,054,374 B2 6/2015 Li et al.
9,583,759 B2 2/2017 Li et al.
(Continued)

FOREIGN PATENT DOCUMENTS

CN 101223660 A 7/2008
CN 103531765 A 1/2014
(Continued)

OTHER PUBLICATIONS

Chen.Z et al., "Staging Phase Transitions in LixCoO2", J. Electrochem. Soc. (Journal of the Electrochemical Society), 2002, vol. 149, No. 12, pp. A1604-A1609.
(Continued)

*Primary Examiner* — Allison Bourke
*Assistant Examiner* — Robert Gene West
(74) *Attorney, Agent, or Firm* — Fish & Richardson P.C.

(57) ABSTRACT

A lithium-ion secondary battery having high capacity and excellent charge and discharge cycle performance is provided. A secondary battery having high capacity is provided. A secondary battery having excellent charge and discharge performance is provided. A secondary battery in which a decrease in capacity is suppressed even at high temperatures is provided. The secondary battery includes a positive electrode, a negative electrode, an electrolyte solution, and an exterior body. The positive electrode includes a positive electrode active material. The positive electrode active material contains lithium, cobalt, oxygen, magnesium, and fluorine. The number of magnesium atoms contained in the positive electrode active material is greater than or equal to
(Continued)

0.001 times and less than or equal to 0.1 times the number of cobalt atoms contained in the positive electrode active material. The positive electrode active material includes a region having a layered rock-salt crystal structure. The electrolyte solution contains an ionic liquid. The exterior body includes a metal layer and a polymer layer stacked over the metal layer. The polymer layer includes a region in contact with the electrolyte solution.

12 Claims, 31 Drawing Sheets

(51) Int. Cl.
| | |
|---|---|
| *H01M 4/02* | (2006.01) |
| *H01M 4/13915* | (2010.01) |
| *H01M 4/525* | (2010.01) |
| *H01M 4/587* | (2010.01) |
| *H01M 10/0525* | (2010.01) |
| *H01M 10/0566* | (2010.01) |
| *H01M 10/42* | (2006.01) |
| *H01M 10/44* | (2006.01) |
| *H01M 10/48* | (2006.01) |
| *H01M 50/105* | (2021.01) |
| *H01M 50/119* | (2021.01) |
| *H01M 50/121* | (2021.01) |
| *H01M 50/124* | (2021.01) |

(52) U.S. Cl.
CPC ..... *H01M 10/0525* (2013.01); *H01M 10/486* (2013.01); *H01M 50/119* (2021.01); *H01M 50/121* (2021.01); *H01M 50/124* (2021.01); *H01M 2300/0025* (2013.01)

(58) Field of Classification Search
CPC ............. H01M 4/587; H01M 10/0525; H01M 10/486; H01M 2300/0025
USPC .......................................................... 429/90
See application file for complete search history.

(56) References Cited

U.S. PATENT DOCUMENTS

| | | | |
|---|---|---|---|
| 10,658,701 B2 | 5/2020 | Inoue et al. | |
| 11,133,523 B2 | 9/2021 | Takechi et al. | |
| 2002/0110736 A1 | 8/2002 | Kweon et al. | |
| 2003/0104279 A1 | 6/2003 | Miyazaki et al. | |
| 2004/0142241 A1 | 7/2004 | Nagayama | |
| 2005/0191553 A1* | 9/2005 | Fujihara ............ | H01M 10/0525 429/223 |
| 2006/0263690 A1 | 11/2006 | Suhara et al. | |
| 2007/0117014 A1 | 5/2007 | Saito et al. | |
| 2008/0241693 A1 | 10/2008 | Fukuchi et al. | |
| 2009/0087362 A1 | 4/2009 | Sun et al. | |
| 2009/0104532 A1 | 4/2009 | Hosoya | |
| 2010/0086854 A1 | 4/2010 | Kumar et al. | |
| 2010/0173197 A1 | 7/2010 | Li et al. | |
| 2010/0247986 A1 | 9/2010 | Toyama et al. | |
| 2013/0052534 A1 | 2/2013 | Fujiki et al. | |
| 2013/0244113 A1 | 9/2013 | Li et al. | |
| 2013/0323596 A1 | 12/2013 | Morita et al. | |
| 2015/0311522 A1* | 10/2015 | Fang ....................... | C01G 53/50 427/126.3 |
| 2016/0013478 A1 | 1/2016 | Satow et al. | |
| 2016/0276659 A1 | 9/2016 | Choi et al. | |
| 2017/0222265 A1* | 8/2017 | Inoue ................... | H01M 4/386 |
| 2017/0237127 A1 | 8/2017 | Ishikawa et al. | |
| 2018/0013130 A1* | 1/2018 | Ochiai ................. | H01M 4/1391 |
| 2018/0102536 A1 | 4/2018 | Kawakami et al. | |
| 2018/0145317 A1 | 5/2018 | Momma et al. | |
| 2018/0145368 A1 | 5/2018 | Ochiai et al. | |
| 2019/0036151 A1 | 1/2019 | Takechi et al. | |
| 2020/0144601 A1 | 5/2020 | Takahashi et al. | |
| 2020/0161706 A1* | 5/2020 | Cao ..................... | H01M 10/0568 |
| 2020/0176770 A1 | 6/2020 | Takahashi et al. | |
| 2020/0280101 A1 | 9/2020 | Inoue et al. | |
| 2020/0295349 A1 | 9/2020 | Ochiai et al. | |
| 2020/0313177 A1 | 10/2020 | Momma et al. | |
| 2020/0313178 A1 | 10/2020 | Momma et al. | |
| 2020/0313228 A1 | 10/2020 | Ochiai et al. | |
| 2020/0328402 A1 | 10/2020 | Ochiai et al. | |
| 2020/0328413 A1 | 10/2020 | Momma et al. | |
| 2020/0343529 A1 | 10/2020 | Ochiai et al. | |
| 2020/0358091 A1 | 11/2020 | Momma et al. | |
| 2020/0373567 A1 | 11/2020 | Momma et al. | |
| 2020/0373568 A1 | 11/2020 | Momma et al. | |
| 2020/0373569 A1 | 11/2020 | Momma et al. | |
| 2021/0083281 A1 | 3/2021 | Mikami et al. | |

FOREIGN PATENT DOCUMENTS

| | | |
|---|---|---|
| CN | 104064729 A | 9/2014 |
| CN | 105655554 A | 6/2016 |
| CN | 107026270 A | 8/2017 |
| CN | 108075114 A | 5/2018 |
| CN | 108110225 A | 6/2018 |
| CN | 109417170 A | 3/2019 |
| CN | 110574193 A | 12/2019 |
| DE | 112017002507 | 3/2019 |
| JP | 2000-203842 A | 7/2000 |
| JP | 2002-216760 A | 8/2002 |
| JP | 2006-261132 A | 9/2006 |
| JP | 2010-080407 A | 4/2010 |
| JP | 2014-220261 A | 11/2014 |
| JP | 2015-099722 A | 5/2015 |
| JP | 2017-139224 A | 8/2017 |
| JP | 2018-073455 A | 5/2018 |
| JP | 2018-088400 A | 6/2018 |
| JP | 2018-088407 A | 6/2018 |
| JP | 2018-120673 A | 8/2018 |
| JP | 2018-195581 A | 12/2018 |
| JP | 2018-206747 A | 12/2018 |
| JP | 2019-050183 A | 3/2019 |
| JP | 2020-004733 A | 1/2020 |
| JP | 2020-024941 A | 2/2020 |
| JP | 2020-031072 A | 2/2020 |
| KR | 2008-0007469 A | 1/2008 |
| KR | 2017-0091015 A | 8/2017 |
| KR | 2018-0056367 A | 5/2018 |
| KR | 2018-0058628 A | 6/2018 |
| KR | 2019-0025632 A | 3/2019 |
| KR | 2019-0134824 A | 12/2019 |
| KR | 2019-0140094 A | 12/2019 |
| KR | 2019-0141022 A | 12/2019 |
| KR | 2019-0141638 A | 12/2019 |
| KR | 2019-0141639 A | 12/2019 |
| KR | 2019-0141640 A | 12/2019 |
| KR | 2019-0141641 A | 12/2019 |
| KR | 2019-0141792 A | 12/2019 |
| KR | 2019-0142299 A | 12/2019 |
| KR | 2019-0142300 A | 12/2019 |
| KR | 2020-0009034 A | 1/2020 |
| TW | 201902012 | 1/2019 |
| WO | WO-2006/123572 | 11/2006 |
| WO | WO-2016/063175 | 4/2016 |
| WO | WO-2018/007908 | 1/2018 |
| WO | WO-2018/135061 | 7/2018 |
| WO | WO-2018/211375 | 11/2018 |

OTHER PUBLICATIONS

Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, pp. 165114-1-165114-9.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

(56) References Cited

OTHER PUBLICATIONS

Counts.W et al., "Fluoride Model Systems: II, The Binary Systems $CaF_2$—$BeF_2$, $MgF_2$—$BeF_2$, and LiF—$MgF_2$", J. Am. Ceram. Soc. (Journal of the American Ceramic Society), 1953, vol. 36, No. 1, pp. 12-17.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

International Search Report (Application No. PCT/IB2020/054945) Dated Sep. 1, 2020.

Written Opinion (Application No. PCT/IB2020/054945) Dated Sep. 1, 2020.

\* cited by examiner

SECONDARY BATTERY, ELECTRONIC DEVICE, AND VEHICLE

CROSS REFERENCE TO RELATED APPLICATIONS

This application is a U.S. National Phase Application under 35 U.S.C. § 371 of International Application PCT/IB2020/054945, filed on May 26, 2020, which is incorporated by reference and claims the benefit of a foreign priority application filed in Japan on Jun. 7, 2019, as Application No. 2019-106816.

TECHNICAL FIELD

One embodiment of the present invention relates to an object, a method, or a manufacturing method. One embodiment of the present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used for a secondary battery, a secondary battery, an electronic device including a secondary battery, and a vehicle including a secondary battery.

Another embodiment of the present invention relates to a power storage system including a secondary battery and a battery control circuit. Another embodiment of the present invention relates to an electronic device and a vehicle each including a power storage system.

Note that in this specification, a power storage device refers to every element and device having a function of storing power. Examples of the power storage device include a storage battery (also referred to as a secondary battery) such as a lithium-ion secondary battery, a lithium-ion capacitor, and an electric double layer capacitor.

In addition, electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, tablets, and laptop computers, portable music players, digital cameras, medical equipment, and next-generation clean energy vehicles (e.g., hybrid vehicles (HVs), electric vehicles (EVs), and plug-in hybrid vehicles (PHVs)), for example. The lithium-ion secondary batteries are essential as rechargeable energy supply sources for today's information society.

The performance required for lithium-ion secondary batteries includes much higher energy density, improved cycle performance, safety under a variety of operation environments, and improved long-term reliability.

In view of the above, improvement of positive electrode active materials has been studied to improve the cycle performance and increase the capacity of lithium-ion secondary batteries (Patent Document 1 and Patent Document 2). In addition, crystal structures of positive electrode active materials have been studied (Non-Patent Document 1 to Non-Patent Document 3).

Non-Patent Document 4 discloses the physical properties of metal fluorides.

X-ray diffraction (XRD) is one of methods used for analysis of a crystal structure of a positive electrode active material. With the use of the ICSD (Inorganic Crystal Structure Database) described in Non-Patent Document 5, XRD data can be analyzed.

REFERENCE

Patent Document

[Patent Document 1] Japanese Published Patent Application No. 2002-216760
[Patent Document 2] Japanese Published Patent Application No. 2006-261132

Non-Patent Document

[Non-Patent Document 1] Toyoki Okumura et al., "Correlation of lithium ion distribution and X-ray absorption near-edge structure in O3- and O2-lithium cobalt oxides from first-principle calculation", *Journal of Materials Chemistry*, 2012, 22, pp. 17340-17348.
[Non-Patent Document 2] Motohashi, T. et al., "Electronic phase diagram of the layered cobalt oxide system $Li_xCoO_2$ ($0.0 \leq x \leq 1.0$)", *Physical Review B*, 80 (16); 165114.
[Non-Patent Document 3] Zhaohui Chen et al., "Staging Phase Transitions in $Li_xCoO_2$", *Journal of The Electrochemical Society*, 2002, 149 (12) A1604-A1609.
[Non-Patent Document 4] W. E. Counts et al., "Flouride Model Systems: II, The Binary Systems $CaF_2$—$BeF_2$, $MgF_2$—$BeF_2$, and LiF—$MgF_2$", *Journal of the American Ceramic Society* (1953), 36 [1], 12-17. FIG. 01471.
[Non-Patent Document 5] Belsky, A. et al., "New developments in the Inorganic Crystal Structure Database (ICSD): accessibility in support of materials research and design", *Acta Cryst.* (2002), B58, 364-369.

SUMMARY OF THE INVENTION

Problems to be Solved by the Invention

An object of one embodiment of the present invention is to provide a lithium-ion secondary battery having high capacity and excellent charge and discharge cycle performance, and a manufacturing method thereof. Another object of one embodiment of the present invention is to provide a secondary battery that can be rapidly charged, and a manufacturing method thereof. Another object of one embodiment of the present invention is to provide a high-capacity secondary battery, and a manufacturing method thereof. Another object of one embodiment of the present invention is to provide a secondary battery having excellent charge and discharge performance, and a manufacturing method thereof. Another object of one embodiment of the present invention is to provide a secondary battery in which a decrease in capacity is suppressed even when a state being charged with a high voltage is held for a long time, and a manufacturing method thereof. Another object of one embodiment of the present invention is to provide a highly safe or reliable secondary battery, and a manufacturing method thereof. Another object of one embodiment of the present invention is to provide a secondary battery in which a decrease in capacity is suppressed even at high temperatures, and a manufacturing method thereof. Another object of one embodiment of the present invention is to provide a long-life secondary battery, and a manufacturing method thereof.

An object of one embodiment of the present invention is to provide a safe, long-life, and extremely excellent secondary battery that can be rapidly charged, can be used at high temperatures, and can have a high energy density due to increased charge voltage.

An object of one embodiment of the present invention is to provide a positive electrode active material that has high capacity and excellent charge and discharge cycle performance for a lithium-ion secondary battery, and a manufacturing method thereof. Another object of one embodiment of the present invention is to provide a method for manufacturing a positive electrode active material with high productivity. Another object of one embodiment of the present invention is to provide a positive electrode active material that suppresses a decrease in capacity in charge and discharge cycles when used for a lithium-ion secondary battery. Another object of one embodiment of the present invention is to provide a positive electrode active material in which elution of a transition metal such as cobalt is suppressed even when a state being charged with a high voltage is held for a long time.

Another object of one embodiment of the present invention is to provide a novel material, novel active material particles, a novel power storage device, or a manufacturing method thereof.

Note that the description of these objects does not preclude the existence of other objects. One embodiment of the present invention does not have to achieve all these objects. Note that other objects can be taken from the description of the specification, the drawings, and the claims.

Means for Solving the Problems

One embodiment of the present invention is a secondary battery including a positive electrode, a negative electrode, an electrolyte solution, and an exterior body. The positive electrode includes a positive electrode active material. The positive electrode active material contains lithium, cobalt, oxygen, magnesium, and fluorine. The number of magnesium atoms contained in the positive electrode active material is greater than or equal to 0.001 times and less than or equal to 0.1 times the number of cobalt atoms contained in the positive electrode active material. The positive electrode active material includes a region having a layered rock-salt crystal structure. The electrolyte solution contains an ionic liquid. The exterior body includes a metal layer and a polymer layer stacked over the metal layer. The polymer layer includes a region in contact with the electrolyte solution.

In the above structure, it is preferable that the ionic liquid contain an imidazolium cation represented by General Formula (G1); $R^1$ represent an alkyl group having 1 to 4, inclusive, carbon atoms; $R^2$ to $R^4$ each independently represent a hydrogen atom or an alkyl group having 1 to 4, inclusive, carbon atoms; and $R^5$ represent an alkyl group or a main chain composed of two or more atoms selected from C, O, Si, N, S, and P atoms.

[Chemical Formula 1]

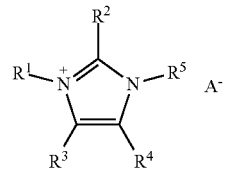

(G1)

In the above structure, it is preferable that the ionic liquid contain a pyridinium cation represented by General Formula (G2); $R^6$ represent an alkyl group or a main chain composed of two or more atoms selected from C, O, Si, N, S, and P atoms; and $R^7$ to $R^{11}$ each independently represent a hydrogen atom or an alkyl group having 1 to 4, inclusive, carbon atoms.

[Chemical Formula 2]

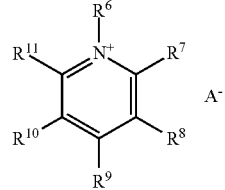

(G2)

In the above structure, it is preferable that the ionic liquid contain a quaternary ammonium cation.

In the above structure, it is preferable that the quaternary ammonium cation be one or more selected from General Formula (G4), General Formula (G5), and General Formula (G6); $R^{12}$ to $R^{17}$ and $R^{18}$ to $R^{24}$ each independently represent an alkyl group, methoxy group, methoxymethyl group, or methoxyethyl group having 1 to 20, inclusive, carbon atoms, or a hydrogen atom; n and m be greater than or equal to 1 and less than or equal to 3; a be greater than or equal to 0 and less than or equal to 6; β be greater than or equal to 0 and less than or equal to 6; and X or Y represent a substituent which is a straight-chain or side-chain alkyl group having 1 to 4, inclusive, carbon atoms, a straight-chain or side-chain alkoxy group having 1 to 4, inclusive, carbon atoms, or a straight-chain or side-chain alkoxyalkyl group having 1 to 4, inclusive, carbon atoms.

[Chemical Formula 3]

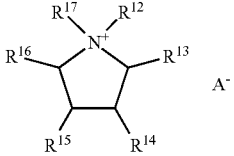

(G4)

-continued

[Chemical Formula 4]

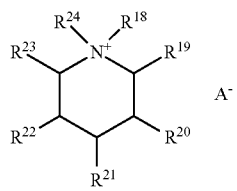

(G5)

[Chemical Formula 5]

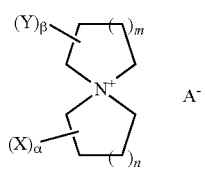

(G6)

In the above structure, it is preferable that the ionic liquid contain a tertiary sulfonium cation represented by General Formula (G7), and $R^{25}$ to $R^{27}$ each independently represent a hydrogen atom, an alkyl group or phenyl group having 1 to 4, inclusive, carbon atoms, or a main chain composed of two or more atoms selected from C, O, Si, N, S, and P atoms.

[Chemical Formula 6]

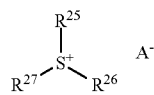

(G7)

In the above structure, it is preferable that the ionic liquid contain a quaternary phosphonium cation represented by General Formula (G8), and $R^{32}$ to $R^{35}$ each independently represent a hydrogen atom or an alkyl group having 1 to 4, inclusive, carbon atoms, a phenyl group, or a main chain composed of two or more atoms selected from C, O, Si, N, S, and P atoms.

[Chemical Formula 7]

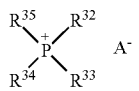

(G8)

In the above structure, it is preferable that an anion of the ionic liquid be $(FSO_2)_2N^-$ or $(CF_3SO_2)_2N^-$.

In the above structure, it is preferable that an anion of the ionic liquid be $(FSO_2)_2N^-$ or $(CF_3SO_2)_2N^-$, and the negative electrode include graphite.

One embodiment of the present invention is a secondary battery including a positive electrode, a negative electrode, an electrolyte solution, and an exterior body. The positive electrode includes a positive electrode active material. The positive electrode active material contains lithium, cobalt, oxygen, magnesium, and fluorine. The positive electrode active material includes a region having a layered rock-salt crystal structure. The electrolyte solution contains an ionic liquid. The ionic liquid contains a cation selected from one or more of an aromatic cation, a quaternary ammonium cation, a tertiary sulfonium cation, and a quaternary phosphonium cation. The exterior body includes a metal layer and a polymer layer stacked over the metal layer. The polymer layer includes a region in contact with the electrolyte solution. The negative electrode includes graphite. When constant current charge is performed until battery voltage becomes 4.5 V in an environment at 25° C., constant voltage charge is performed until a current value becomes 0.01 C, and then the positive electrode is analyzed by powder X-ray diffraction using a CuKα1 ray, diffraction peaks are exhibited at 2θ of greater than or equal to 19.100 and less than or equal to 19.50° and 2θ of greater than or equal to 45.450 and less than or equal to 45.65°.

In the above structure, it is preferable that an anion of the ionic liquid be $(FSO_2)_2N^-$ or $(CF_3SO_2)_2N^-$.

One embodiment of the present invention is a secondary battery including a positive electrode, a negative electrode, and an electrolyte solution. The positive electrode includes a positive electrode active material. The positive electrode active material contains lithium, cobalt, and oxygen. When a temperature during charge is in a range of higher than or equal to a first temperature and lower than a second temperature, upper limit voltage of the charge is a first value. When a temperature during charge is higher than or equal to the second temperature, upper limit voltage of the charge is a second value. The first temperature is higher than or equal to 5° C. and lower than 15° C. The second temperature is higher than or equal to 25° C. and lower than 55° C. The first value is larger than the second value by 0.02 V or more. The first value is larger than or equal to 4.45 V and smaller than or equal to 4.6 V.

In the above structure, it is preferable that the positive electrode active material contain magnesium and fluorine.

In the above structure, it is preferable that the negative electrode contain graphite.

One embodiment of the present invention is an electronic device including the secondary battery described in any of the above and a temperature sensor.

One embodiment of the present invention is a vehicle including the secondary battery described in any of the above and a temperature sensor.

Effect of the Invention

According to one embodiment of the present invention, a lithium-ion secondary battery having high capacity and excellent charge and discharge cycle performance, and a manufacturing method thereof can be provided. According to another embodiment of the present invention, a secondary battery that can be rapidly charged, and a manufacturing method thereof can be provided. According to another embodiment of the present invention, a secondary battery in which a decrease in capacity is suppressed even when a state being charged with a high voltage is held for a long time, and a manufacturing method thereof can be provided. According to another embodiment of the present invention, a highly safe or reliable secondary battery, and a manufacturing method thereof can be provided. According to another embodiment of the present invention, a secondary battery in which a decrease in capacity is suppressed even at high temperatures, and a manufacturing method thereof can be provided. According to another embodiment of the present invention, a long-life secondary battery, and a manufacturing method thereof can be provided.

According to one embodiment of the present invention, a safe, long-life, and extremely excellent secondary battery that can be rapidly charged, can be used at high temperatures, and can have a high energy density due to increased charge voltage can be provided.

According to one embodiment of the present invention, a positive electrode active material that has high capacity and excellent charge and discharge cycle performance for a lithium-ion secondary battery, and a manufacturing method thereof can be provided. A method for manufacturing a positive electrode active material with high productivity can be provided. According to one embodiment of the present invention, a positive electrode active material that suppresses a decrease in capacity in charge and discharge cycles when used for a lithium-ion secondary battery can be provided. According to one embodiment of the present invention, a positive electrode active material in which elution of a transition metal such as cobalt is suppressed even when a state being charged with a high voltage is held for a long time can be provided.

One embodiment of the present invention can provide a novel material, novel active material particles, a novel power storage device, or a manufacturing method thereof.

Note that the description of these effects does not preclude the existence of other effects. One embodiment of the present invention does not have to have all these effects. Note that effects other than these will be apparent from the description of the specification, the drawings, the claims, and the like and effects other than these can be taken from the description of the specification, the drawings, the claims, and the like.

BRIEF DESCRIPTION OF THE DRAWINGS

FIG. 1C is a diagram illustrating a bendable secondary battery.

MODE FOR CARRYING OUT THE INVENTION

Figure 1:
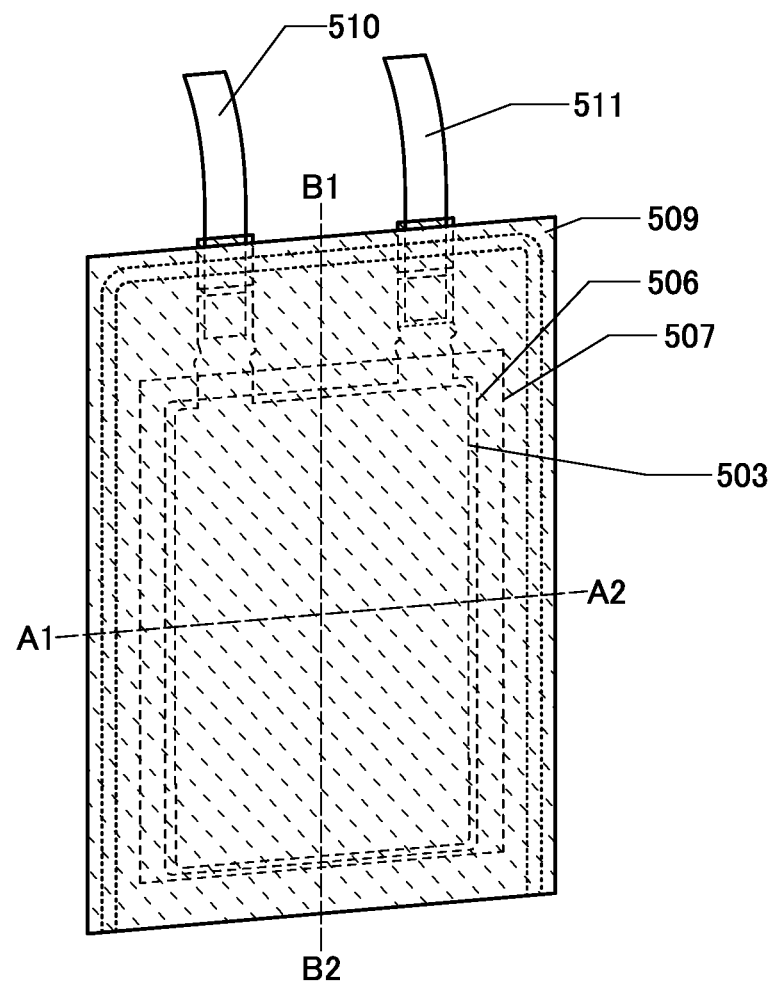
FIG. 1 is a diagram showing an example of a secondary battery.

Embodiments of the present invention will be described in detail below with reference to the drawings. Note that the present invention is not limited to the following description, and it is readily understood by those skilled in the art that modes and details of the present invention can be modified in various ways. In addition, the present invention should not be construed as being limited to the description of the embodiments below.

In this specification and the like, crystal planes and orientations are indicated by the Miller index. In the crystallography, a bar is placed over a number in the expression of crystal planes and orientations; however, in this specification and the like, because of application format limitations, crystal planes and orientations may be expressed by placing – (a minus sign) at the front of a number instead of placing a bar over the number. Furthermore, an individual direction that shows an orientation in a crystal is denoted by "[ ]", a set direction that shows all of the equivalent orientations is denoted by "< >", an individual plane that shows a crystal plane is denoted by "( )", and a set plane having equivalent symmetry is denoted by "{ }".

In this specification and the like, segregation refers to a phenomenon in which in a solid made of a plurality of elements (e.g., A, B, and C), a certain element (e.g., B) is spatially non-uniformly distributed.

In this specification and the like, a surface portion of a particle of an active material or the like refers to a region from a surface to a depth of approximately 10 nm. A plane generated by a crack may also be referred to as a surface. In addition, a region whose position is deeper than that of the surface portion is referred to as an inner portion.

In this specification and the like, a layered rock-salt crystal structure of a composite oxide containing lithium and a transition metal refers to a crystal structure in which a rock-salt ion arrangement where cations and anions are alternately arranged is included and the transition metal and lithium are regularly arranged to form a two-dimensional plane, so that lithium can be two-dimensionally diffused. Note that a defect such as a cation or anion vacancy may exist. Moreover, in the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, a pseudo-spinel crystal structure of a composite oxide containing lithium and a transition metal refers to a crystal structure with a space group R-3m, which is not a spinel crystal structure but a crystal structure where oxygen is hexacoordinated to ions of cobalt, magnesium, or the like and the cation arrangement has symmetry similar to that of the spinel crystal structure. Note that in the pseudo-spinel crystal structure, oxygen is tetracoordinated to a light element such as lithium in some cases. Also in that case, the ion arrangement has symmetry similar to that of the spinel crystal structure.

The pseudo-spinel crystal structure can also be regarded as a crystal structure that contains Li between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure in general.

Anions of a layered rock-salt crystal and anions of a rock-salt crystal have a cubic close-packed structure (face-centered cubic lattice structure). Anions of a pseudo-spinel crystal are also presumed to have a cubic close-packed structure. When the pseudo-spinel crystal is in contact with the layered rock-salt crystal and the rock-salt crystal, there is a crystal plane at which orientations of cubic close-packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic close-packed structures composed of anions in the layered rock-salt crystal, the pseudo-spinel crystal, and the rock-salt crystal are aligned is sometimes referred to as a state where crystal orientations are substantially aligned.

A secondary battery includes a positive electrode and a negative electrode, for example. A positive electrode active material is a material included in the positive electrode. The positive electrode active material is a substance that performs a reaction contributing to the charge and discharge capacity, for example. Note that the positive electrode active material may partly contain a substance that does not contribute to the charge and discharge capacity.

In this specification and the like, the positive electrode active material of one embodiment of the present invention is expressed as a positive electrode material, a secondary battery positive electrode material, or the like in some cases. In this specification and the like, the positive electrode active material of one embodiment of the present invention preferably contains a compound. In this specification and the like, the positive electrode active material of one embodiment of the present invention preferably contains a composition. In this specification and the like, the positive electrode active material of one embodiment of the present invention preferably contains a composite.

Embodiment 1

In this embodiment, an example of a secondary battery of one embodiment of the present invention is described.

An increase in the charge voltage of a secondary battery can increase discharge capacity. Furthermore, energy density can also be increased.

Meanwhile, when the charge voltage of a secondary battery is increased, a noticeable decrease in capacity due to charge and discharge cycles may occur. At a high charge voltage, for example, the crystal structure of a positive electrode active material may become unstable.

The case where a material containing a metal serving as a carrier ion (hereinafter a metal A) is used as a positive electrode active material is considered, for example. The metal A is extracted from the positive electrode active material due to a charge reaction. As charge voltage is increased, a larger amount of the metal A may be extracted from the positive electrode active material and the crystal structure of the positive electrode active material may largely change. In the case where a change in the crystal structure due to insertion and extraction of the metal A is irreversible, the crystal structure may gradually collapse and a noticeable decrease in capacity due to charge and discharge cycles may occur.

In a secondary battery using the positive electrode active material of one embodiment of the present invention, collapse of the crystal structure can be suppressed and a decrease in capacity due to charge and discharge cycles can be suppressed even when the secondary battery is repeatedly charged with a high charge voltage.

As described in Example below, it was found that when a secondary battery using the positive electrode active material of one embodiment of the present invention uses a positive electrode including the positive electrode active material of one embodiment of the present invention as a positive electrode and uses an ionic liquid as a main solvent in an electrolyte solution, a decrease in capacity due to charge and discharge cycles is further suppressed and significantly excellent performance of the secondary battery is achieved.

An ionic liquid is a salt formed by a combination of a cation and an anion. An ionic liquid is referred to as a room temperature molten salt in some cases.

An ionic liquid has low volatility and low inflammability, and is stable in a wide temperature range. An ionic liquid is not easily volatilized even at high temperatures, so that expansion of a secondary battery due to gas generated from an electrolyte solution can be suppressed. Therefore, the secondary battery stably operates even at high temperatures. Furthermore, an ionic liquid has low inflammability and is less likely to burn.

With use of an ionic liquid, a highly safe secondary battery that can be used at high temperatures can be achieved.

For example, an organic solvent such as diethyl carbonate (DEC) or ethyl methyl carbonate (EMC) has a boiling point lower than 150° C. and has high volatility; therefore, gas might be generated when a secondary battery is used at high temperatures and an exterior body of the secondary battery might be expanded. In addition, an organic solvent has a flash point lower than or equal to 50° C. in some cases.

In contrast, an ionic liquid has low volatility, and is extremely stable at up to a temperature lower than a temperature at which a reaction such as decomposition occurs, e.g., up to approximately 300° C.

As described above, it is shown that an ionic liquid is stable even at high temperatures. However, when other components of a secondary battery such as a positive electrode active material, a negative electrode active material, and an exterior body change at high temperatures, particularly irreversibly change, a significant decrease in the capacity of the secondary battery might occur.

For example, when the crystal structure of a material included in a positive electrode active material irreversibly changes due to charge at high temperatures, a secondary battery significantly deteriorates. For example, a significant decrease in capacity due to charge and discharge cycles might occur. The crystal structure of a positive electrode might become more unstable at higher temperatures and at a higher charge voltage.

When a positive electrode active material whose crystal structure is extremely stable at a high charge voltage and at high temperatures is used for the secondary battery of one embodiment of the present invention, excellent performance can be achieved even at high temperatures and at a high charge voltage, and an ionic liquid can sufficiently exert its effect. In other words, a significant improvement in performance achieved by employing the structure of the secondary battery of one embodiment of the present invention is found when the structure is combined with the positive electrode active material of one embodiment of the present invention.

The positive electrode active material of one embodiment of the present invention preferably contains an element X as described later, and preferably contains halogen in addition to the element X. It is suggested that when the positive electrode active material of one embodiment of the present invention contains the element X or contains halogen in addition to the element X, a reaction with an ionic liquid on the surface of the positive electrode active material is suppressed. As described above, an ionic liquid is extremely stable even at high temperatures. Meanwhile, in the secondary battery of one embodiment of the present invention, the range of reaction potential is extremely wide. In such a wide reaction potential range, a reaction with an ionic liquid on the surface of the active material is concerned in some cases. When the positive electrode active material of one embodiment of the present invention is used, a reaction with an ionic liquid is suppressed and it is suggested that a more stable secondary battery is achieved.

By employing the structure of the secondary battery of one embodiment of the present invention, for example, it is possible to achieve a secondary battery that can be repeatedly charged even when the upper limit voltage of the charge is high. For example, it is possible to achieve a secondary battery that can be repeatedly charged while the upper limit voltage of the charge is preferably 4.45 V or higher, further preferably 4.47 V or higher, still further preferably 4.49 V or higher, e.g., approximately 4.5 V. By employing the structure of the secondary battery of one embodiment of the present invention, a decrease in discharge capacity can be significantly suppressed even when the upper limit voltage of charge is high.

In the structure of the secondary battery of one embodiment of the present invention, the upper limit voltage of charge is preferably v(1) [V] when the temperature during the charge is in a range of higher than or equal to t(1) [° C.] and lower than t(2) [° C.], and the upper limit voltage of charge is preferably v(2) [V] when the temperature during the charge is t(2) [° C.] or higher. Here, t(1) is preferably a value larger than or equal to 5 and less than or equal to 15, and t(2) is preferably a value larger than or equal to 25 and less than 55. Furthermore, v(1) is preferably a value larger than v(2) by 0.02 or more, and v(1) is preferably a value larger than or equal to 4.45 and less than or equal to 4.6.

By employing the structure of the secondary battery of one embodiment of the present invention, for example, it is possible to achieve a secondary battery that can be repeatedly charged with a high charge voltage and even at a high temperature of 42° C. or higher. For example, it is possible to achieve a secondary battery that can be repeatedly charged at a high temperature of 42° C. or higher while the upper limit voltage of the charge is preferably 4.37 V or higher, further preferably 4.40 V or higher, still further preferably 4.42 V or higher, still further preferably 4.44 V or higher, e.g., approximately 4.45 V.

Furthermore, an excellent secondary battery can be achieved even at higher temperatures. For example, it is sometimes possible to achieve a secondary battery that stably operates at higher than or equal to 42° C. and lower than or equal to 200° C., higher than or equal to 42° C. and lower than or equal to 180° C., higher than or equal to 42° C. and lower than or equal to 150° C., higher than or equal to 42° C. and lower than or equal to 120° C., higher than or equal to 42° C. and lower than or equal to 100° C., or higher than or equal to 42° C. and lower than or equal to 90° C.

The secondary battery of one embodiment of the present invention has a discharge capacity higher than or equal to 160 mAh/g after the accumulated amount of electric charge of 57000 mAh/g is discharged. Here, the discharge capacity is preferably measured at 0.2 C, for example. The accumulated amount of electric charge and discharge capacity are preferably calculated per weight of the positive electrode active material.

The secondary battery of one embodiment of the present invention has a discharge capacity higher than or equal to 160 mAh/g after charge is performed 300 times at 25° C. and at a charge voltage of 4.5 V. Here, the discharge capacity is preferably measured at 0.2 C, for example. The accumulated amount of electric charge and discharge capacity are preferably calculated per weight of the positive electrode active material.

The secondary battery of one embodiment of the present invention is preferably used in combination with a battery control circuit. The battery control circuit preferably has a function of controlling charge, for example. Controlling charge refers to, for example, monitoring a parameter of a secondary battery and changing charge conditions in accordance with a state. Examples of a parameter to be monitored of a secondary battery include the voltage, current, temperature, amount of electric charge, and impedance of the secondary battery.

The secondary battery of one embodiment of the present invention is preferably used in combination with a sensor. The sensor preferably has a function of measuring, for example, one or more of displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, and infrared rays.

Charge of the secondary battery of one embodiment of the present invention is preferably controlled in accordance with a value measured by the sensor. An example of control of the secondary battery using a temperature sensor will be described later.

[Positive Electrode Active Material]

A positive electrode active material that is preferably used for the secondary battery of one embodiment of the present invention will be described below.

<Structure of Positive Electrode Active Material>

The positive electrode active material preferably contains a metal serving as a carrier ion (hereinafter an element A). As the element A, an alkali metal such as lithium, sodium, or potassium or a Group 2 element such as calcium, beryllium, or magnesium can be used, for example.

In the positive electrode active material, carrier ions are extracted from the positive electrode active material due to charge. A larger amount of the extracted element A means a larger amount of ions contributing to the capacity of a secondary battery, increasing the capacity. Meanwhile, a large amount of the extracted element A easily causes collapse of the crystal structure of a compound contained in the positive electrode active material. Collapse of the crystal structure of the positive electrode active material may lead to a decrease in the discharge capacity due to charge and discharge cycles. The positive electrode active material of one embodiment of the present invention contains the element X, whereby collapse of a crystal structure that would occur when carrier ions are extracted in charge of a secondary battery may be suppressed. Part of the element X substitutes at an element A position, for example. An element such as magnesium, calcium, zirconium, lanthanum, or barium can be used as the element X. As another example, an element such as copper, potassium, sodium, or zinc can be used as the element X. Two or more of the elements described above as the element X may be used in combination.

Furthermore, the positive electrode active material of one embodiment of the present invention preferably contains halogen in addition to the element X. The positive electrode active material preferably contains halogen such as fluorine or chlorine. When the positive electrode active material of one embodiment of the present invention contains the halogen, substitution of the element X at the position of the element A is promoted in some cases.

In the case where the positive electrode active material of one embodiment of the present invention contains the element X or contains halogen in addition to the element X, electrical conductivity on the surface of the positive electrode active material is sometimes suppressed.

The positive electrode active material of one embodiment of the present invention contains a metal whose valence number changes due to charge and discharge of a secondary battery (hereinafter an element M). The element M is a transition metal, for example. The positive electrode active material of one embodiment of the present invention contains one or more of cobalt, nickel, and manganese, particularly cobalt, as the element M, for example. The positive electrode active material may contain, at an element M position, an element that has no valence number change and can have the same valence number as the element M, such as aluminum, specifically, a trivalent representative element, for example. The above-described element X may be substituted at the element M position, for example. In the case where the positive electrode active material of one embodiment of the present invention is an oxide, the element X may substitute at an oxygen position.

As the positive electrode active material of one embodiment of the present invention, a lithium composite oxide having a layered rock-salt crystal structure is preferably used, for example. Specifically, as the lithium composite oxide having a layered rock-salt crystal structure, lithium cobalt oxide, lithium nickel oxide, a lithium composite oxide containing nickel, manganese, and cobalt, or a lithium composite oxide containing nickel, cobalt, and aluminum can be used, for example. Moreover, such a positive electrode active material is preferably represented by a space group R-3m.

In the positive electrode active material having a layered rock-salt crystal structure, increasing the charge depth may cause collapse of a crystal structure. Here, collapse of a crystal structure refers to displacement of a layer, for example. In the case where collapse of a crystal structure is irreversible, the capacity of a secondary battery might be decreased by repeated charges and discharges.

The positive electrode active material of one embodiment of the present invention includes the element X, whereby the displacement of a layer can be suppressed even when the charge depth is increased, for example. By suppressing the displacement, a change in volume due to charge and discharge can be small. Accordingly, the positive electrode active material of one embodiment of the present invention can achieve excellent cycle performance. In addition, the positive electrode active material of one embodiment of the present invention can have a stable crystal structure in a high-voltage charging state. Thus, in the positive electrode active material of one embodiment of the present invention, a short circuit is less likely to occur while the high-voltage charging state is maintained. This is preferable because the safety is further improved.

The positive electrode active material of one embodiment of the present invention has a small change in the crystal structure and a small difference in volume per the same number of transition metal atoms between a sufficiently discharging state and a high-voltage charging state.

The positive electrode active material of one embodiment of the present invention may be represented by the chemical formula $AM_yO_z$ (y>0, z>0). For example, lithium cobalt oxide may be represented by $LiCoO_2$. As another example, lithium nickel oxide may be represented by $LiNiO_2$.

When the charge depth is greater than or equal to 0.8, the positive electrode active material of one embodiment of the present invention, which contains the element X, may have a structure that is represented by the space group R-3m and is not a spinel crystal structure but is a structure where oxygen is hexacoordinated to ions of the element M (e.g., cobalt), the element X (e.g., magnesium), and the like and the cation arrangement has symmetry similar to that of the spinel crystal structure. This structure is referred to as a pseudo-spinel crystal structure in this specification and the like. Note that in the pseudo-spinel crystal structure, oxygen is tetracoordinated to a light element such as lithium in some cases. Also in that case, the ion arrangement has symmetry similar to that of the spinel crystal structure.

Extraction of carrier ions due to charge makes the structure of a positive electrode active material unstable. The pseudo-spinel crystal structure is said to be a structure that can maintain high stability in spite of extraction of carrier ions.

In the case where the charge depth is high in the present invention, by using the positive electrode active material having the pseudo-spinel structure in a secondary battery, the structure of the positive electrode active material is stable and a decrease in capacity due to charge and discharge can be suppressed at a voltage higher than or equal to 4.57 V and lower than 4.65 V or higher than or equal to 4.59 V and lower than 4.63 V, e.g., at approximately 4.6 V with respect to the potential of a lithium metal, for example. Note that in the case where graphite is used as a negative electrode active material in a secondary battery, for example, the structure of the positive electrode active material is stable and a decrease in capacity due to charge and discharge can be suppressed at a secondary battery voltage that is preferably higher than or equal to 4.45 V and lower than or equal to 4.6 V, further preferably higher than or equal to 4.47 V and lower than 4.55 V, still further preferably higher than or equal to 4.49 V and lower than 4.53 V, e.g., at approximately 4.5 V, for example.

The pseudo-spinel crystal structure can also be regarded as a crystal structure that contains Li between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure in general.

Anions of a layered rock-salt crystal and anions of a rock-salt crystal have a cubic close-packed structure (face-centered cubic lattice structure). Anions of a pseudo-spinel crystal are also presumed to have a cubic close-packed structure. When the pseudo-spinel crystal is in contact with the layered rock-salt crystal and the rock-salt crystal, there is a crystal plane at which orientations of cubic close-packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic close-packed structures composed of anions in the layered rock-salt crystal, the pseudo-spinel crystal, and the rock-salt crystal are aligned is sometimes referred to as a state where crystal orientations are substantially aligned.

In the unit cell of the pseudo-spinel crystal structure, the coordinates of cobalt and oxygen can be represented by Co (0, 0, 0.5) and O (0, 0, x) within the range of $0.20 \leq x \leq 0.25$.

In the positive electrode active material of one embodiment of the present invention, a difference between the volume of the unit cell with a charge depth of 0 and the volume per unit cell of the pseudo-spinel crystal structure with a charge depth of 0.82 is preferably less than or equal to 2.5%, further preferably less than or equal to 2.2%.

The pseudo-spinel crystal structure has diffraction peaks at 2θ of 19.30±0.20° (greater than or equal to 19.10° and less than or equal to 19.50°) and 2θ of 45.55±0.10° (greater than or equal to 45.45° and less than or equal to 45.65°). More specifically, sharp diffraction peaks appear at 2θ of 19.30±0.10° (greater than or equal to 19.20° and less than or equal to 19.40°) and 2θ of 45.55±0.05° (greater than or equal to 45.50° and less than or equal to 45.60).

Note that although the positive electrode active material of one embodiment of the present invention has the pseudo-spinel crystal structure when being charged with a high voltage, not all the particles necessarily have the pseudo-spinel crystal structure. The particles may have another crystal structure, or some of the particles may be amorphous. Note that when the XRD patterns are analyzed by the Rietveld analysis, the pseudo-spinel crystal structure preferably accounts for more than or equal to 50 wt %, further preferably more than or equal to 60 wt %, still further preferably more than or equal to 66 wt % of the positive electrode active material. The positive electrode active material in which the pseudo-spinel crystal structure accounts for more than or equal to 50 wt %, further preferably more than or equal to 60 wt %, still further preferably more than or equal to 66 wt % can have sufficiently good cycle performance.

The number of atoms of the element X is preferably greater than or equal to 0.001 times and less than or equal to 0.1 times the number of atoms of the element M, further preferably greater than 0.01 and less than 0.04, still further preferably approximately 0.02. The concentration of the element X described here may be a value obtained by element analysis on the entire particle of the positive electrode active material using ICP-MS or the like, or may be a value based on the ratio of the raw materials mixed in the process of forming the positive electrode active material, for example.

In the case where cobalt and nickel are contained as the element M, the proportion of nickel atoms (Ni) in the sum of cobalt atoms and nickel atoms (Co+Ni) (Ni/(Co+Ni)) is preferably less than 0.1, further preferably less than or equal to 0.075.

The positive electrode active material of one embodiment of the present invention is not limited to the materials described above.

As the positive electrode active material, a composite oxide with a spinel crystal structure can be used, for example. Alternatively, a polyanionic material can be used as the positive electrode active material, for example. Examples of the polyanionic material include a material with an olivine crystal structure and a material with a NASICON structure. Alternatively, a material containing sulfur can be used as the positive electrode active material, for example.

As the material with a spinel crystal structure, for example, a composite oxide represented by $LiM_2O_4$ can be used. It is preferable to contain Mn as the element M. For example, $LiMn_2O_4$ can be used. It is preferable to contain Ni in addition to Mn as the element M because the discharge voltage and the energy density of the secondary battery are increased in some cases. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese, such as $LiMn_2O_4$, because the performance of the secondary battery can be improved.

As a polyanionic material, for example, a composite oxide containing oxygen, the metal A, the metal M, and an element Z can be used. The metal A is one or more of Li, Na, and Mg; the metal M is one or more of Fe, Mn, Co, Ni, Ti, V, and Nb; and the element Z is one or more of S, P, Mo, W, As, and Si.

As the material with an olivine crystal structure, for example, a composite material (general formula $LiMPO_4$ (M is one or more of Fe(II), Mn(II), Co(II), and Ni(II)) can be used. Typical examples of the general formula $LiMPO_4$ include lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a composite material such as a general formula $Li_{(2-j)}MSiO_4$ (M is one or more of Fe(II), Mn(II), Co(II), and Ni(II); 0≤j≤2) can be used. Typical examples of the general formula $Li_{(2-j)}MSiO_4$ include lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound represented by a general formula $A_xM_2(XO_4)_3$ (A=Li, Na, or Mg, M=Fe, Mn, Ti, V, or Nb, X=S, P, Mo, W, As, or Si) can be used. Examples of the NASICON compound include $Fe_2(MnO_4)_3$, $Fe_2(SO_4)_3$, and $Li_3Fe_2(PO_4)_3$. Further alternatively, a compound represented by a general formula $Li_2MPO_4F$, $Li_2MP_2O_7$, or $LisMO_4$ (M=Fe or Mn) can be used as the positive electrode active material.

Further alternatively, a perovskite fluoride such as $NaFeF_3$ and $FeF_3$, a metal chalcogenide (a sulfide, a selenide, or a telluride) such as $TiS_2$ and $MoS_2$, an oxide with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like may be used as the positive electrode active material.

Alternatively, a borate-based material represented by a general formula $LiMBO_3$ (M is Fe(II), Mn(II), or Co(II)) may be used as the positive electrode active material.

As a material containing sodium, for example, an oxide containing sodium such as $NaFeO_2$, $Na_{2/3}[Fe_{1/2}Mn_{1/2}]O_2$, $Na_{2/3}[Ni_{1/3}Mn_{2/3}]O_2$, $Na_2Fe_2(SO_4)_3$, $Na_3V_2(PO_4)_3$, $Na_2FePO_4F$, $NaVPO_4F$, $NaMPO_4$ (M is Fe(II), Mn(II), Co(II), or Ni(II)), $Na_2FePO_4F$, or $Na_4Co_3(PO_4)_2P_2O_7$ may be used as the positive electrode active material.

As the positive electrode active material, a lithium-containing metal sulfide may be used. Examples of the lithium-containing metal sulfide are $Li_2TiS_3$ and $Li_3NbS_4$.

A mixture of two or more of the above-described materials may be used as the positive electrode active material of one embodiment of the present invention.

In a general secondary battery, as charge voltage increases, the structure of a positive electrode active material might become unstable and elution of the element M contained in the positive electrode active material into an electrolyte solution might occur. The elution of the element M into the electrolyte solution might decrease the capacity of the positive electrode, for example. The decrease in the capacity of the positive electrode leads to a decrease in the capacity of the secondary battery. Furthermore, the element M eluted into the electrolyte solution is precipitated on the surface of a negative electrode of the secondary battery in some cases. A hindrance to a reaction of the negative electrode by the precipitated element M leads to a decrease in the capacity of the secondary battery.

In a secondary battery using the positive electrode active material of one embodiment of the present invention, the structure of the positive electrode active material is stable even at a high charge voltage; thus, elution of the element M contained in the positive electrode active material into an electrolyte solution can be suppressed.

[Electrolyte Solution]

The secondary battery of one embodiment of the present invention preferably includes an electrolyte solution. The electrolyte solution included in the secondary battery of one embodiment of the present invention preferably contains an ionic liquid and a salt containing a metal serving as a carrier ion.

In the case where the metal serving as a carrier ion is lithium, as the salt containing the metal serving as a carrier ion, one of lithium salts such as $LiN(FSO_2)_2$, $LiN(CF_3SO_2)_2$, $LiN(C_4F_9SO_2)(CF_3SO_2)$, $LiN(C_2F_5SO_2)_2$, $LiC(FSO_2)_3$, $LiC(CF_3SO_2)_3$, $LiC(C_2F_5SO_2)_3$, $LiCF_3SO_3$, $LiC_4F_9SO_3$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiPF_6$, and $LiClO_4$ can be used, or two or more of them can be used in an appropriate combination in an appropriate ratio.

In particular, metal salts of a fluorosulfonate anion and a fluoroalkylsulfonate anion are preferable in some cases: among them, a metal salt of an amide-based anion represented by $(C_nF_{2n+1}SO_2)_2N^-$ (n is greater than or equal to 0 and less than or equal to 3) is preferable because of its high stability at high temperatures and high resistance to oxidation reduction.

An ionic liquid contains a cation and an anion, specifically, an organic cation and an anion. Examples of the organic cation used for the electrolyte solution include aromatic cations such as an imidazolium cation and a pyridinium cation, and aliphatic onium cations such as a quaternary ammonium cation, a tertiary sulfonium cation, and a quaternary phosphonium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

The electrolyte solution may contain, in addition to an ionic liquid, an aprotic organic solvent. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), DEC, EMC, methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone may be contained, or two or more of these solvents may be contained in an appropriate combination in an appropriate ratio.

Furthermore, an additive such as vinylene carbonate (VC), propane sultone (PS), tert-butylbenzene (TBB), fluoroethylene carbonate (FEC), lithium bis(oxalate)borate (LiBOB), or a dinitrile compound such as succinonitrile, adiponitrile, fluorobenzene, cyclohexylbenzene, or biphenyl may be added to the electrolyte solution. The concentration of the material to be added in the whole solvent is, for example, higher than or equal to 0.1 wt % and lower than or equal to 5 wt %.

As an ionic liquid containing imidazolium cations, an ionic liquid represented by General Formula (G1) below can be used, for example. In General Formula (G1), $R^1$ represents an alkyl group having 1 to 4, inclusive, carbon atoms, $R^2$ to $R^4$ each independently represent a hydrogen atom or an alkyl group having 1 to 4, inclusive, carbon atoms, and $R^5$ represents an alkyl group or a main chain composed of two or more atoms selected from C, O, Si, N, S, and P atoms. A substituent may be introduced into the main chain represented by $R^5$. Examples of the substituent to be introduced include an alkyl group and an alkoxy group.

[Chemical Formula 8]

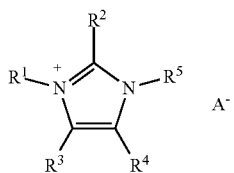

(G1)

As an ionic liquid containing pyridinium cations, an ionic liquid represented by General Formula (G2) below may be used, for example. In General Formula (G2), $R^6$ represents an alkyl group or a main chain composed of two or more atoms selected from C, O, Si, N, S, and P atoms, and $R^7$ to $R^{11}$ each independently represent a hydrogen atom or an alkyl group having 1 to 4, inclusive, carbon atoms. A substituent may be introduced into the main chain represented by $R^6$. Examples of the substituent to be introduced include an alkyl group and an alkoxy group.

[Chemical Formula 9]

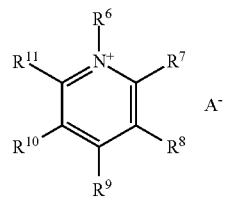

(G2)

As an ionic liquid containing quaternary ammonium cations, an ionic liquid represented by General Formula (G3), (G4), (G5), or (G6) below can be used, for example.

[Chemical Formula 10]

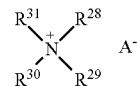

(G3)

In General Formula (G3), $R^{28}$ to $R^{31}$ each independently represent an alkyl group, methoxy group, methoxymethyl group, or methoxyethyl group having 1 to 20, inclusive, carbon atoms, or a hydrogen atom.

[Chemical Formula 11]

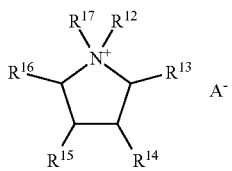

(G4)

In General Formula (G4), $R^{12}$ to $R^{17}$ each independently represent an alkyl group, methoxy group, methoxymethyl group, or methoxyethyl group having 1 to 20, inclusive, carbon atoms, or a hydrogen atom.

[Chemical Formula 12]

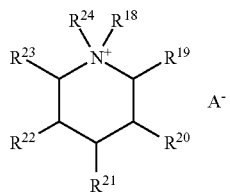

(G5)

In General Formula (G5), $R^{18}$ to $R^{24}$ each independently represent an alkyl group, methoxy group, methoxymethyl group, or methoxyethyl group having 1 to 20, inclusive, carbon atoms, or a hydrogen atom.

[Chemical Formula 13]

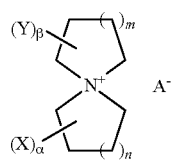
(G6)

In General Formula (G6), n and m are greater than or equal to 1 and less than or equal to 3. Assume that a is greater than or equal to 0 and less than or equal to 6. When n is 1, a is greater than or equal to 0 and less than or equal to 4. When n is 2, a is greater than or equal to 0 and less than or equal to 5. When n is 3, a is greater than or equal to 0 and less than or equal to 6. Assume that β is greater than or equal to 0 and less than or equal to 6. When m is 1, β is greater than or equal to 0 and less than or equal to 4. When m is 2, β is greater than or equal to 0 and less than or equal to 5. When m is 3, β is greater than or equal to 0 and less than or equal to 6. Note that "α or, β is 0" means "unsubstituted". The case where both α and, β are 0 is excluded. X or Y represents a substituent such as a straight-chain or side-chain alkyl group having 1 to 4, inclusive, carbon atoms, a straight-chain or side-chain alkoxy group having 1 to 4, inclusive, carbon atoms, or a straight-chain or side-chain alkoxyalkyl group having 1 to 4, inclusive, carbon atoms.

As an ionic liquid containing tertiary sulfonium cations, an ionic liquid represented by General Formula (G7) below can be used, for example. In General Formula (G7), $R^{25}$ to $R^{27}$ each independently represent a hydrogen atom, an alkyl group having 1 to 4, inclusive, carbon atoms, or a phenyl group. Alternatively, $R^{25}$ to $R^{27}$ may each independently represent a main chain composed of two or more atoms selected from C, O, Si, N, S, and P atoms.

[Chemical Formula 14]

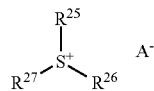
(G7)

As an ionic liquid containing quaternary phosphonium cations, an ionic liquid represented by General Formula (G8) below can be used, for example. In General Formula (G8), $R^{32}$ to $R^{35}$ each independently represent a hydrogen atom, an alkyl group having 1 to 4, inclusive, carbon atoms, or a phenyl group. Alternatively, $R^{32}$ to $R^{35}$ may each independently represent a main chain composed of two or more atoms selected from C, O, Si, N, S, and P atoms.

[Chemical Formula 15]

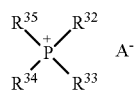
(G8)

As A⁻ shown in General Formulae (G1) to (G8), one or more of a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion can be used.

As a monovalent amide-based anion, $(C_nF_{2n+1}SO_2)_2N^-$ (n=0 to 3) can be used, and as a monovalent cyclic amide-based anion, $(CF_2SO_2)_2N^-$ or the like can be used. As a monovalent methide-based anion, $(C_nF_{2n+1}SO_2)_3C^-$ (n=0 to 3) can be used, and as a monovalent cyclic methide-based anion, $(CF_2SO_2)_2C^-(CF_3SO_2)$ or the like can be used. As a fluoroalkyl sulfonic acid anion, $(C_mF_{2m+1}SO_3)^-$ (m=0 to 4) or the like is given. As a fluoroalkylborate anion, $\{BF_n(C_mH_kF_{2m+1-k})_{4-n}\}^-$ (n=0 to 3, m=1 to 4, and k=0 to 2m) or the like is given. As a fluoroalkylphosphate anion, $\{PF_n(C_mH_kF_{2m+1-k})_{6-n}\}^-$ (n=0 to 5, m=1 to 4, and k=0 to 2m) or the like is given.

As a monovalent amide-based anion, one or more of a bis(fluorosulfonyl)amide anion and a bis(trifluoromethanesulfonyl)amide anion can be used.

An ionic liquid may contain one or more of a hexafluorophosphate anion and a tetrafluoroborate anion.

Hereinafter, an anion represented by $(FSO_2)_2N^-$ is sometimes represented by an FSA anion and an anion represented by $(CF_3SO_2)_2N^-$ is sometimes represented by a TFSA anion.

Specific examples of the cation represented by General Formula (G1) above include Structural Formula (111) to Structural Formula (174).

[Chemical Formulae 16]

(111)

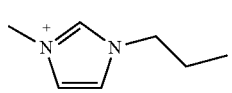
(112)

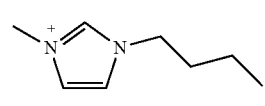
(113)

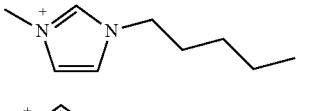
(114)

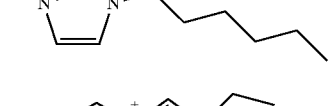
(115)

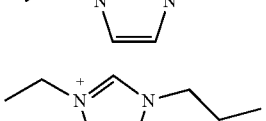
(116)

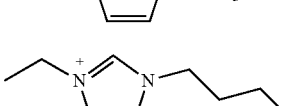
(117)

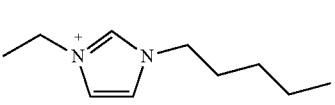
(118)

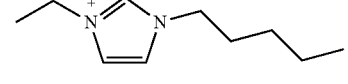
(119)

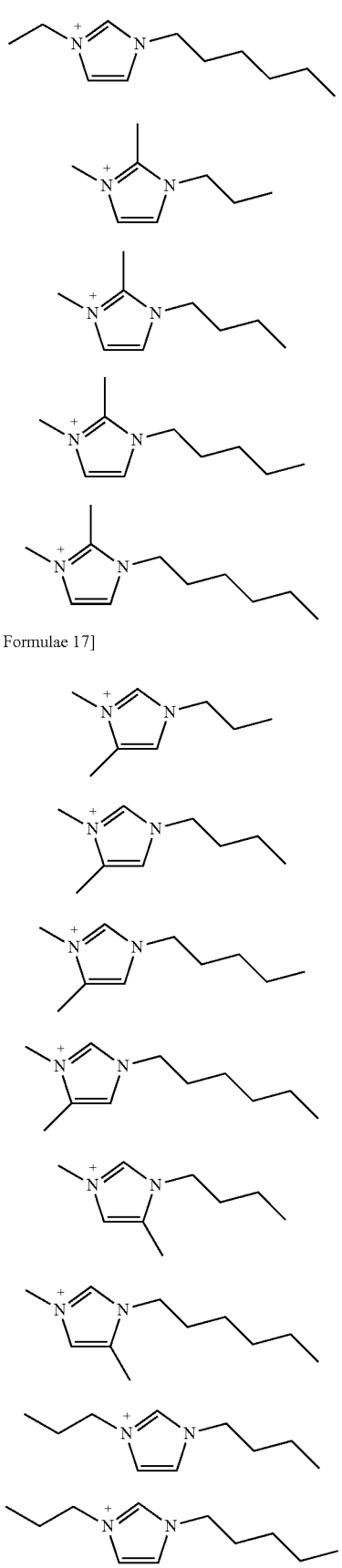
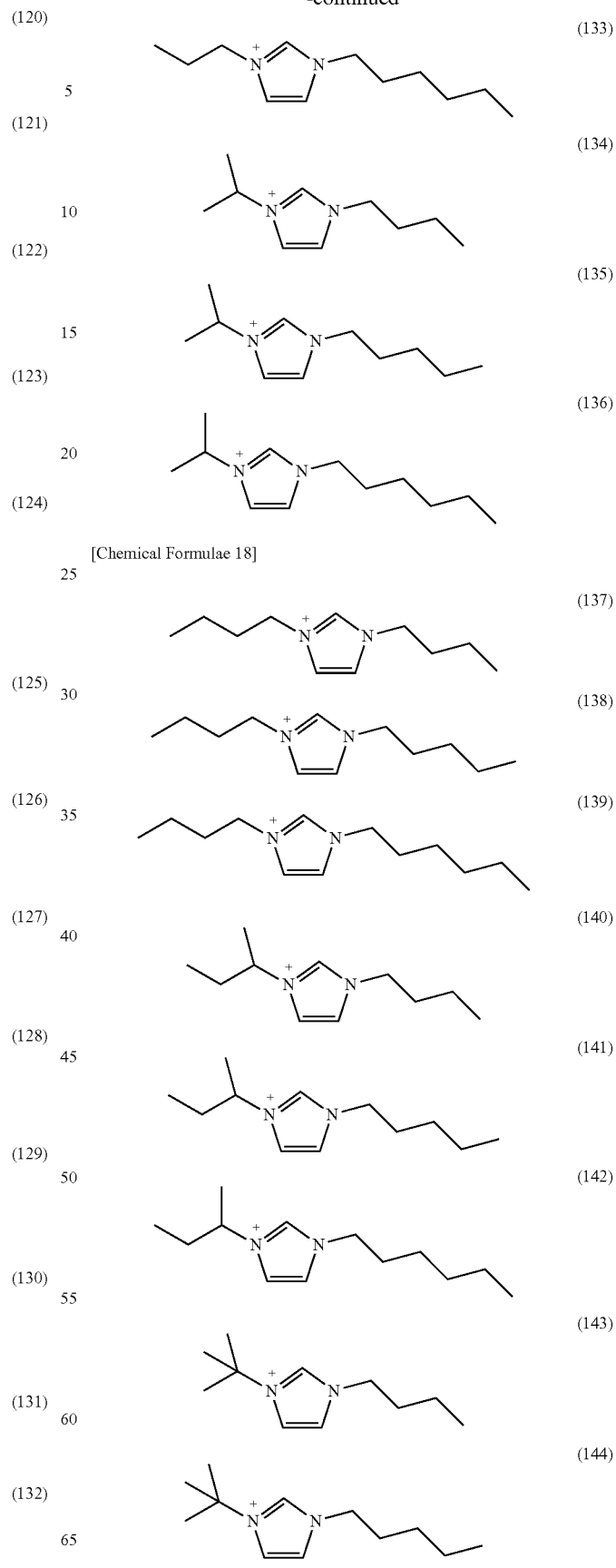

[Chemical Formulae 19]

[Chemical Formulae 20]

[Chemical Formulae 21]

-continued
(169)
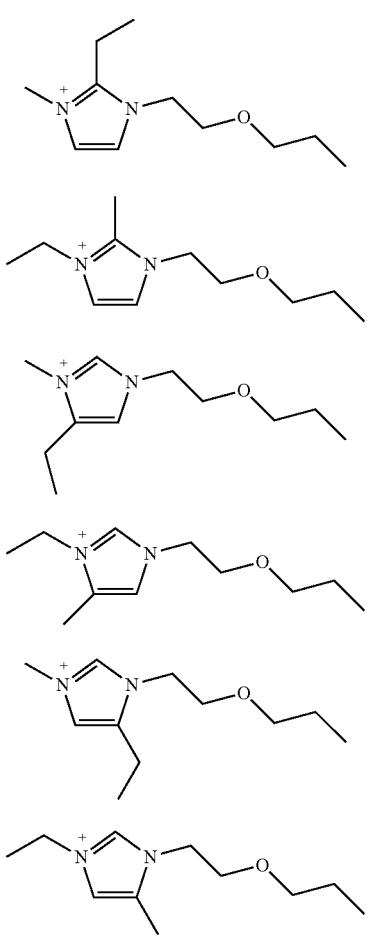
(170)
(171)
(172)
(173)
(174)
Specific examples of the cation represented by General Formula (G2) above include Structural Formula (701) to Structural Formula (719).
[Chemical Formulae 23]
(701)
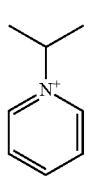
(702)
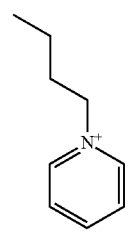
(703)
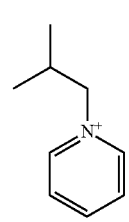
-continued
(704)
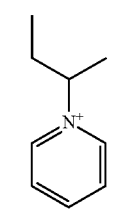
(705)
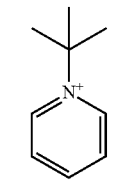
(706)
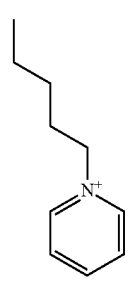
(707)
(708)
(709)
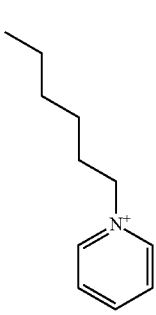
(710)

[Chemical Formulae 23]
(711) 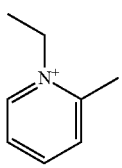
(712) 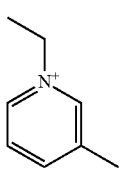
(713) 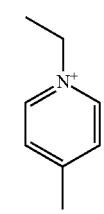
(714) 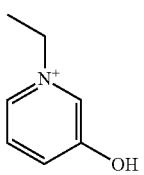
(715) 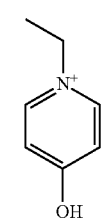
(716) 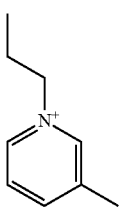
(717) 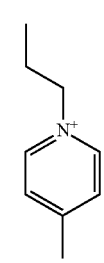
(718) 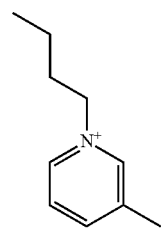
(719) 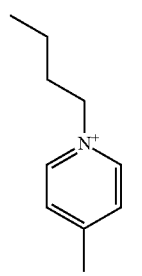
Specific examples of the cation represented by General Formula (G4) above include Structural Formula (501) to Structural Formula (520).
[Chemical Formulae 24]
(501) 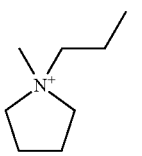
(502) 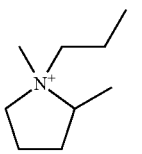
(503) 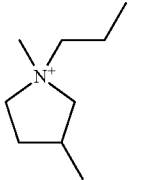
(504) 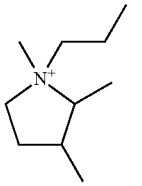
(505) 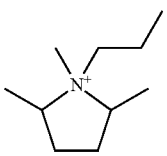

(506) 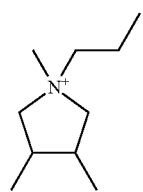
(507) 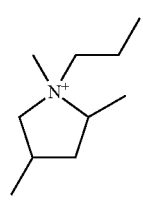
(508) 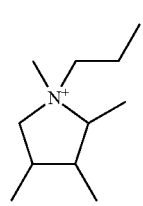
(509) 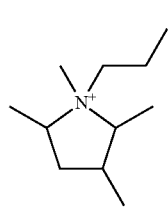
(510) 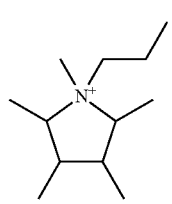
(511) 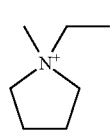
(512) 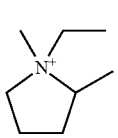
(513) 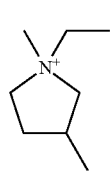
(514) 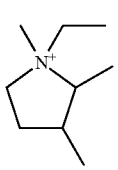
(515) 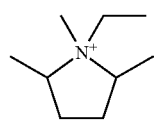
(516) 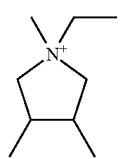
(517) 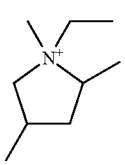
(518) 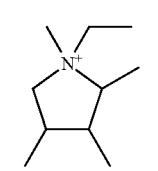
(519) 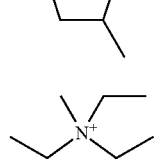
(520)
Specific examples of the cation represented by General Formula (G5) above include Structural Formula (601) to Structural Formula (630).
[Chemical Formulae 25]
(601) 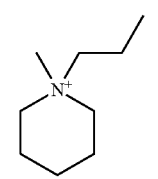
(602) 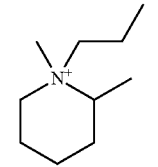

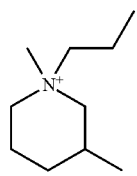
(603)
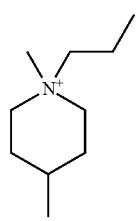
(604)
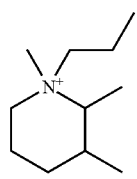
(605)
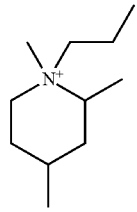
(606)
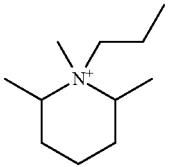
(607)
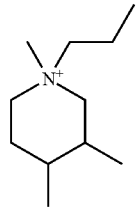
(608)
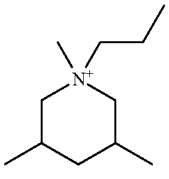
(609)
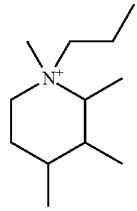
(610)
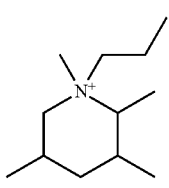
(611)
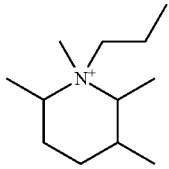
(612)
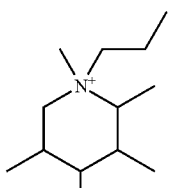
(613)
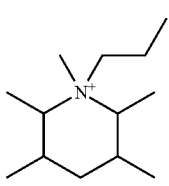
(614)
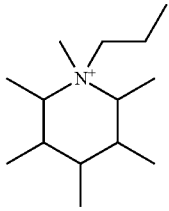
(615)
[Chemical Formulae 26]
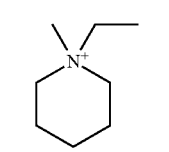
(616)
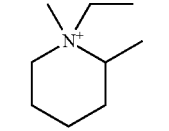
(617)
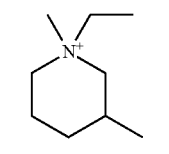
(618)

(619) 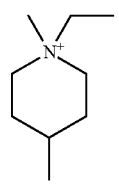
(620) 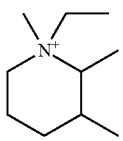
(621) 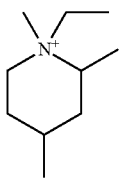
(622) 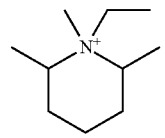
(623) 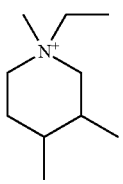
(624) 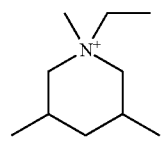
(623) 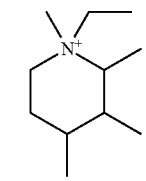
(624) 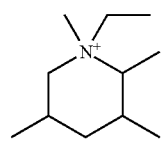
(625) 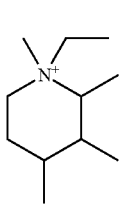
(626) 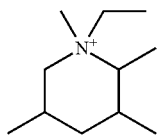
(627) 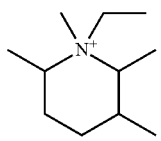
(628) 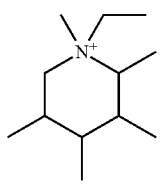
(629) 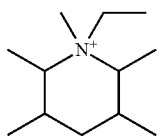
(630) 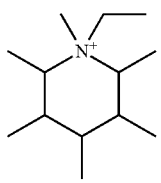
Specific examples of the cation represented by General Formula (G6) above include Structural Formula (301) to Structural Formula (309) and Structural Formula (401) to Structural Formula (419).
[Chemical Formulae 27]
(301) 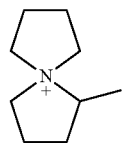
(302) 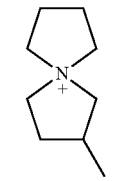
(303) 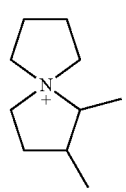

-continued
(304) 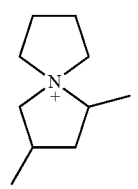
(305) 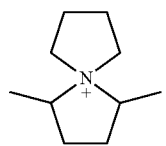
(306) 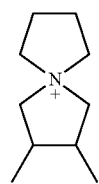
(307) 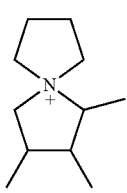
(308) 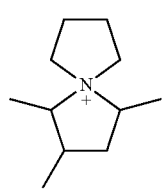
(309) 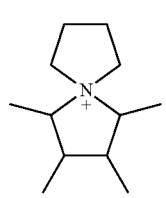
[Chemical Formulae 28]
(401) 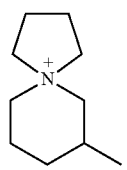
(402) 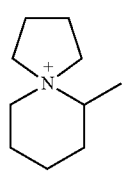
-continued
(403) 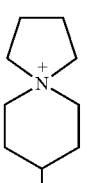
(404) 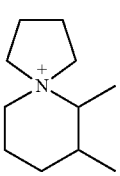
(405) 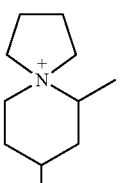
(406) 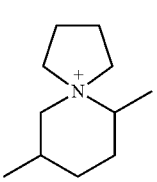
(407) 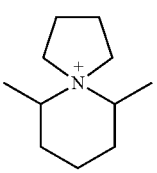
(408) 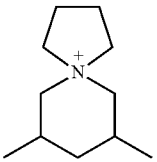
(409) 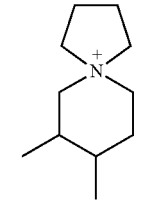
(410) 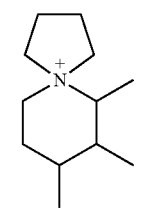

(411)
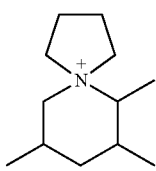

(412)
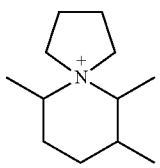

(413)
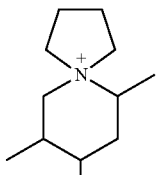

(414)
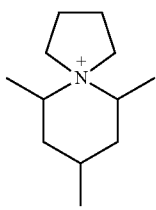

(415)
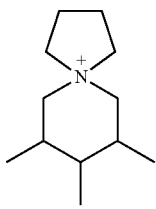

(416)
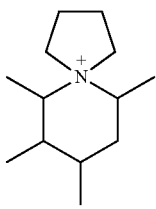

(417)
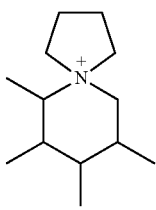

(418)
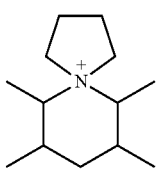

(419)
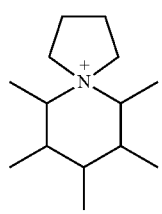

Although Structural Formula (301) to Structural Formula (309) and Structural Formula (401) to Structural Formula (419) each show an example in which m is 1 in General Formula (G6), m can be changed into 2 or 3 in Structural Formula (301) to Structural Formula (309) and Structural Formula (401) to Structural Formula (419).

Specific examples of the cation represented by General Formula (G7) above include Structural Formula (201) to Structural Formula (215).

[Chemical Formulae 29]

(201)
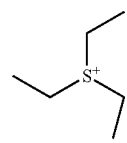

(202)
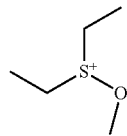

(203)
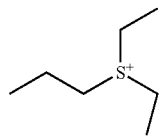

(204)
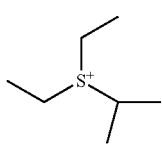

(205)
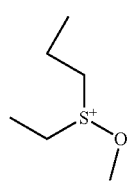

(206)
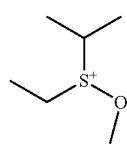

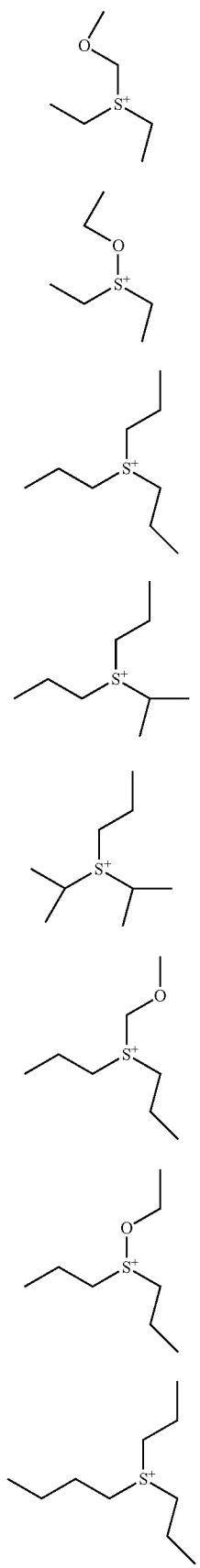

(207)
(208)
(209)
(210)
(211)
(212)
(213)
(214)

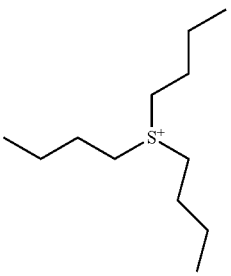

(215)

The secondary battery of one embodiment of the present invention uses the positive electrode active material of one embodiment of the present invention and an electrolyte solution containing the above-described ionic liquid, whereby a decrease in capacity can be suppressed and significantly excellent performance can be achieved even when the secondary battery is repeatedly used at a high charge voltage.

[Negative Electrode Active Material]

As a negative electrode active material of the secondary battery, a material that enables charge and discharge reactions by insertion and extraction of carrier ions, a material that enables charge and discharge reactions by alloying and dealloying reactions with the metal A serving as a carrier ion, or the like can be used.

As the negative electrode material, a carbon-based material such as graphite, graphitizing carbon (soft carbon), non-graphitizing carbon (hard carbon), a carbon nanotube, graphene, or carbon black can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it is relatively easy to have a small surface area. Examples of natural graphite include flake graphite and spherical natural graphite.

Graphite has a low potential substantially equal to that of a lithium metal (higher than or equal to 0.05 V and lower than or equal to 0.3 V vs. Li/Li$^+$) when lithium ions are intercalated into graphite (when a lithium-graphite intercalation compound is formed). For this reason, a lithium-ion secondary battery can have a high operating voltage. That is, for example, the charge voltage of the lithium-ion secondary battery can be increased. Thus, the energy density of the lithium-ion secondary battery can be increased. In addition, graphite is preferred because of its advantages such as a relatively high capacity per unit volume, relatively small volume expansion, low cost, and higher level of safety than that of a lithium metal.

As the negative electrode active material, a material containing at least one of silicon, tin, gallium, aluminum, germanium, lead, antimony, bismuth, silver, zinc, cadmium, indium, and the like can be used. Such elements have higher capacity than carbon, and silicon in particular has a high theoretical capacity of 4200 mAh/g. For this reason, silicon is preferably used as the negative electrode active material. Alternatively, a compound containing any of the above elements may be used. Examples of the compound include SiO, Mg$_2$Si, Mg$_2$Ge, SnO, SnO$_2$, Mg$_2$Sn, SnS$_2$, V$_2$Sn$_3$, FeSn$_2$, CoSn$_2$, Ni$_3$Sn$_2$, Cu$_6$Sn$_5$, Ag$_3$Sn, Ag$_3$Sb, Ni$_2$MnSb, $CeSb_3$, $LaSn_3$, $La_3Co_2Sn_7$, $CoSb_3$, InSb, and SbSn. Here, an element that enables charge-discharge reactions by alloying and dealloying reactions with lithium and a compound containing the element, for example, may be referred to as an alloy-based material.

In this specification and the like, SiO refers, for example, to silicon monoxide. Note that SiO can alternatively be expressed as $SiO_x$. Here, x preferably has an approximate value of 1. Alternatively, x is preferably more than or equal to 0.2 and less than or equal to 1.5, further preferably more than or equal to 0.3 and less than or equal to 1.2, for example.

Alternatively, for the negative electrode active material, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a positive electrode active material that does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material. For example, a transition metal oxide that does not form an alloy with lithium, such as cobalt oxide (CoO), nickel oxide (NiO), and iron oxide (FeO), may be used for the negative electrode active material. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

In a general secondary battery, the element M contained in the positive electrode active material might be eluted into an electrolyte solution and precipitated on the surface of a negative electrode. A hindrance to a reaction of the negative electrode by the precipitated element M leads to a decrease in the capacity of the secondary battery.

The case of using graphite as the negative electrode active material is considered, for example. In graphite, carrier ions are intercalated and extracted between layers in a battery reaction. For example, carrier ions are intercalated and extracted in a region where a cross section of a layer is exposed of the surface of a graphite particle. The battery reaction efficiently occurs only in a particular region of the surface of the particle; thus, for example, it is suggested that the influence of the element M precipitated on the surface of the particle is more significant.

As described above, in a secondary battery using the positive electrode active material of one embodiment of the present invention, elution of the element M contained in the positive electrode active material into an electrolyte solution can be suppressed. Accordingly, even in the case of using graphite as a negative electrode active material and repeatedly using the secondary battery at a high charge voltage, high battery capacity can be maintained.

Furthermore, the use of an ionic liquid may suppress deterioration of graphite due to charge and discharge.

Furthermore, by increasing the concentration of carrier ions contained in the electrolyte solution of the secondary battery of one embodiment of the present invention, intercalation of a cation into graphite is suppressed and the lifetime of the secondary battery is extended in some cases.

In an electrolyte solution containing an ionic liquid, when a lithium ion is used as a carrier ion contained in the electrolyte solution, the concentration of a lithium salt is preferably higher than or equal to 0.8 mol/L, further preferably higher than or equal to 1 mol/L and lower than or equal to 2.5 mol/L, still further preferably higher than or equal to 1.2 mol/L and lower than 2 mol/L, for example.

[Example of Secondary Battery]

FIG. 1 illustrates a secondary battery using a film-like exterior body as an example of a power storage device. When the secondary battery using a film-like exterior body has flexibility and is used in an electronic device at least part of which is flexible, the secondary battery can be bent as the electronic device is bent.

Figure 2A:
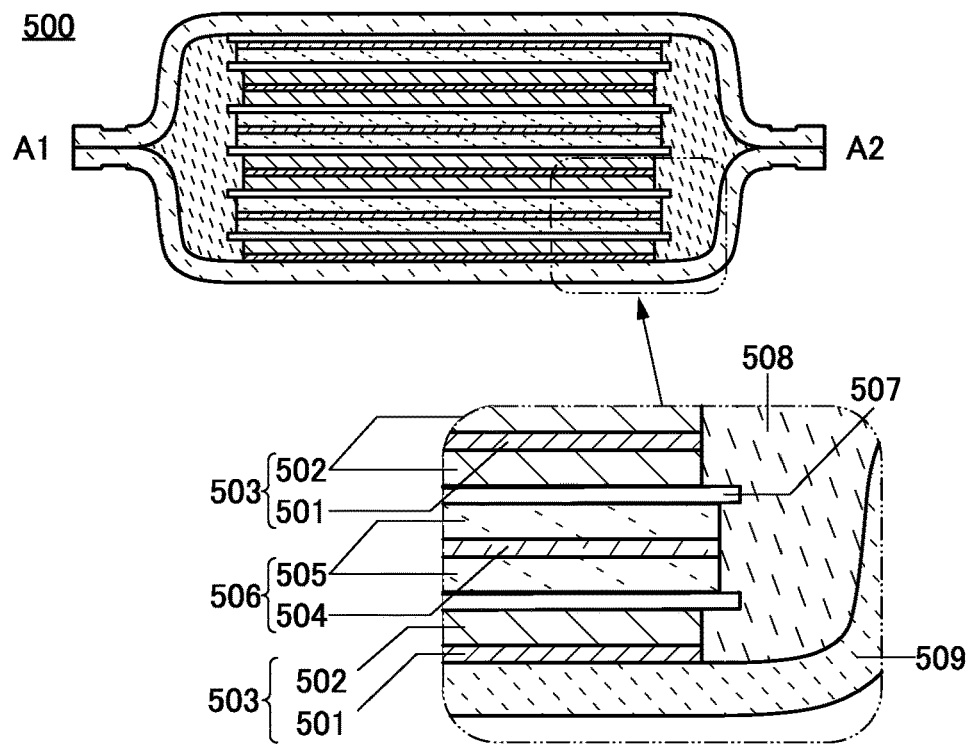
FIG. 2A is a diagram showing an example of a cross section of a secondary battery.
Figure 2B:
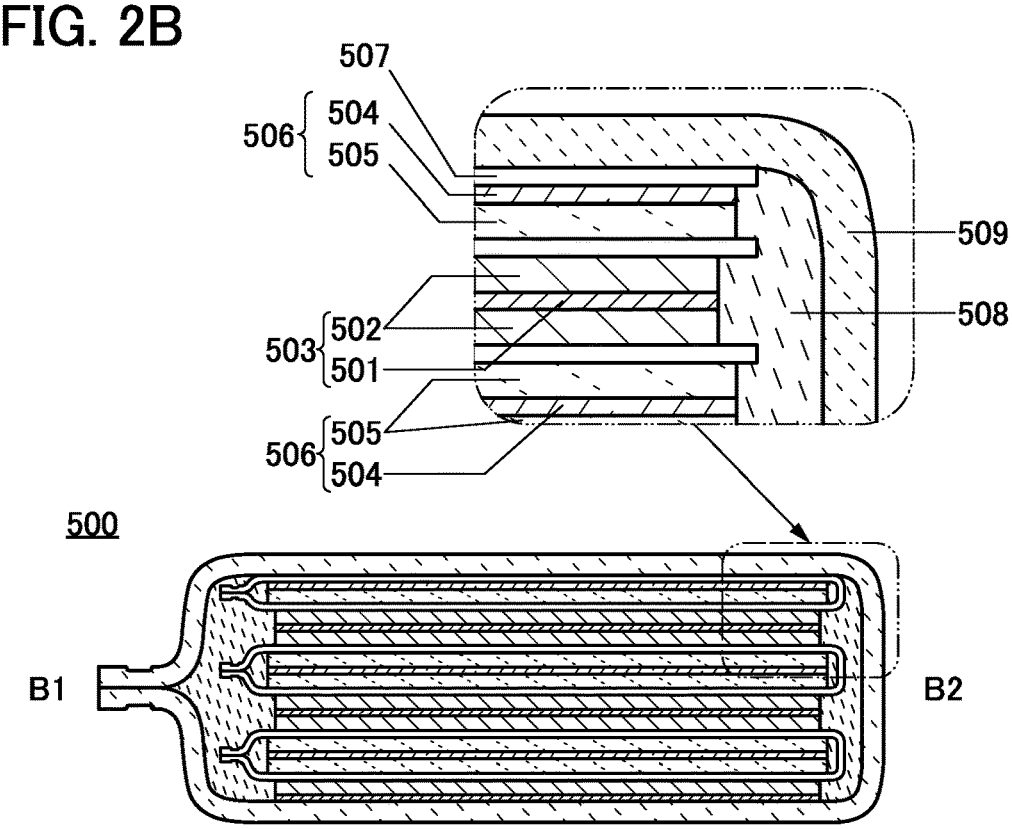
FIG. 2B is a diagram showing an example of a cross section of a secondary battery.

FIG. 1 shows an external view of a secondary battery 500 that is a secondary battery using a film-like exterior body. FIG. 2A and FIG. 2B show a cross section indicated by the dashed-dotted line A1-A2 and a cross section indicated by the dashed-dotted line B1-B2, respectively, in FIG. 1. The secondary battery 500 includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 that are provided in the exterior body 509. The exterior body 509 is filled with the electrolyte solution 508.

In the secondary battery 500 illustrated in FIG. 1 and FIG. 2, a positive electrode lead electrode 510 and a negative electrode lead electrode 511 are welded to the positive electrode current collectors 501 included in the positive electrode 503 and the negative electrode current collectors 504 included in the negative electrode 506, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged such that part of the positive electrode current collector 501 and part of the negative electrode current collector 504 are exposed to the outside of the exterior body 509 without using lead electrodes.

Figure 3:
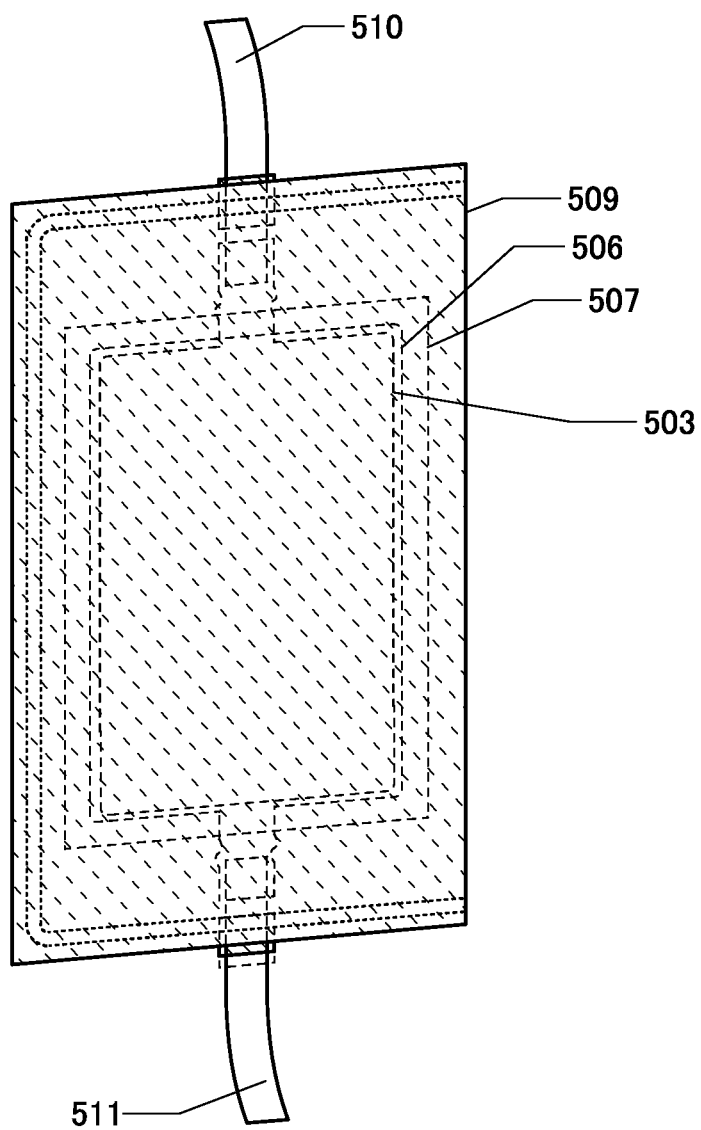
FIG. 3 is a diagram showing an example of a secondary battery.

Although the positive electrode lead electrode 510 and the negative electrode lead electrode 511 are provided on the same side in FIG. 1, the positive electrode lead electrode 510 and the negative electrode lead electrode 511 may be provided on different sides as illustrated in FIG. 3. The lead electrodes of a secondary battery of one embodiment of the present invention can be freely positioned as described above; therefore, the degree of freedom in design is high. Accordingly, a product including a secondary battery of one embodiment of the present invention can have a high degree of freedom in design. Furthermore, production efficiency of products including a secondary battery of one embodiment of the present invention can be increased.

<Exterior Body>

For the exterior body 509 of the secondary battery 500, for example, it is possible to use a film that is a thin metal film whose both surfaces are covered with polymer layers or the like. More specifically, for example, it is possible to use a film having a three-layer structure of a first polymer layer, a thin metal film over the first polymer layer, and a second polymer layer over the thin metal film, in which a highly flexible thin metal film of aluminum, stainless steel, copper, nickel, or the like is used as the thin metal film, the first polymer layer is provided on a surface to be an inner surface of the exterior body, and the second polymer layer is provided on a surface to be an outer surface of the exterior body. The first polymer layer and the second polymer layer are preferably insulating synthetic resin films. Furthermore, a thermoplastic resin can be used for each of the first polymer layer and the second polymer layer, and it is particularly preferable to use a thermoplastic resin for the first polymer layer.

As each of the first polymer layer and the second polymer layer, it is possible to use a film formed of a material that suppresses a reaction with an ionic liquid, e.g., a material such as polyethylene, polypropylene, polycarbonate, ionomer, polyamide, or polyester. As polyamide, nylon can be used, for example.

Although in FIG. 2, five pairs of a positive electrode active material layer and a negative electrode active material layer facing each other are illustrated as an example, the number of pairs of electrodes facing each other, needless to say, is not limited to 5 and may be more than 5 or less than 5. In the case where the number of electrode layers is large, the secondary battery can have higher capacity. Meanwhile, in the case where the number of electrode layers is small, the secondary battery can have small thickness and high flexibility.

In the above structure, the exterior body 509 of the secondary battery can change its form such that the smallest curvature radius is greater than or equal to 3 mm and less than or equal to 30 mm, preferably greater than or equal to 3 mm and less than or equal to 10 mm. The exterior body of the secondary battery is formed of one or two films; in the case of a secondary battery having a layered structure, a cross-sectional structure of the bent battery is sandwiched between two curves of the film serving as the exterior body.

[Fabrication Method Example of Secondary Battery]

Next, an example of a method for fabricating a secondary battery will be described.

Figure 4A:
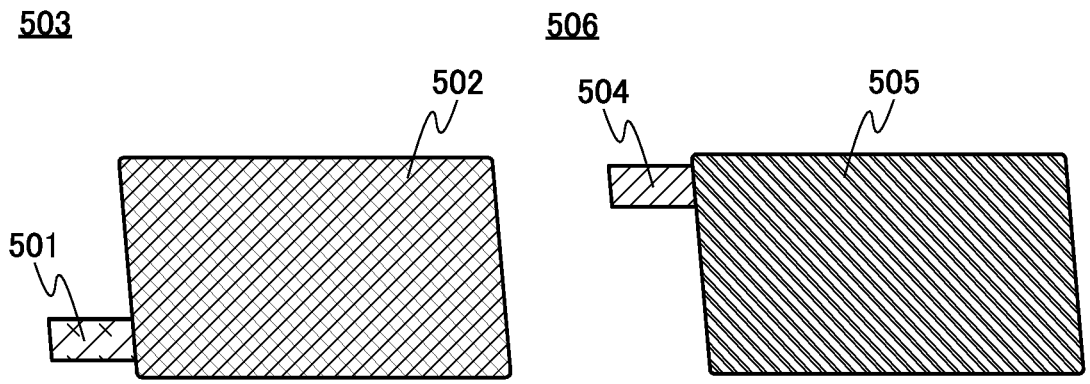
FIG. 4A is a diagram showing examples of electrodes.

First, the negative electrode 506, the separator 507, and the positive electrode 503 are stacked. FIG. 4A shows external views of the positive electrode 503 and the negative electrode 506. The positive electrode 503 includes the positive electrode current collector 501, and the positive electrode active material layer 502 is formed on the surface of the positive electrode current collector 501. The positive electrode 503 also includes a region where the positive electrode current collector 501 is partly exposed (hereinafter referred to as a tab region). The negative electrode 506 includes the negative electrode current collector 504, and the negative electrode active material layer 505 is formed on the surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in the example shown in FIG. 4A.

Figure 4B:
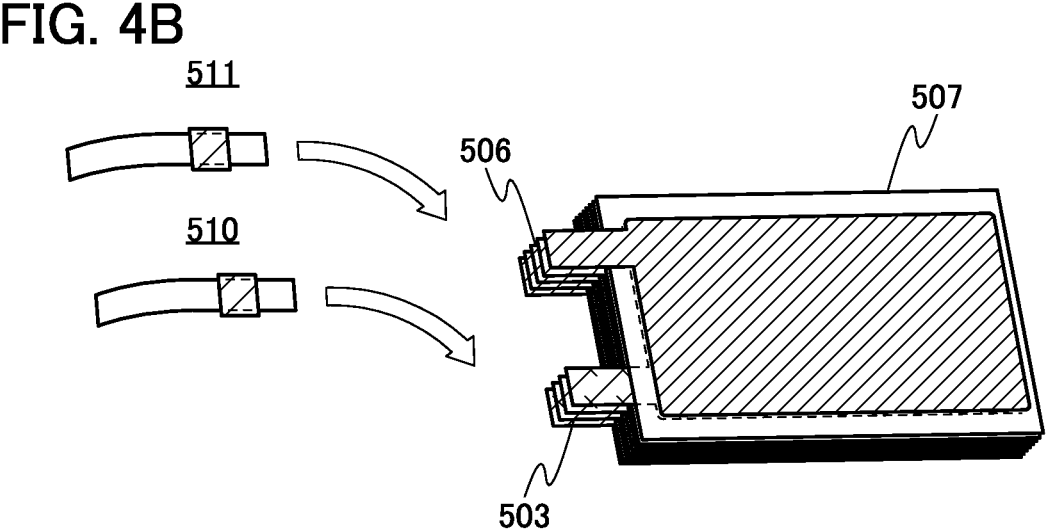
FIG. 4B is a diagram showing an example of a method for manufacturing a secondary battery.

FIG. 4B illustrates a stack including the negative electrode 506, the separator 507, and the positive electrode 503. The case of using five negative electrodes and four positive electrodes is described here. Next, the tab regions of the positive electrodes 503 are bonded to each other, and the positive electrode lead electrode 510 is bonded to the tab region of the positive electrode on the outermost surface. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

After that, the negative electrode 506, the separator 507, and the positive electrode 503 are placed over the exterior body 509.

Figure 4C:
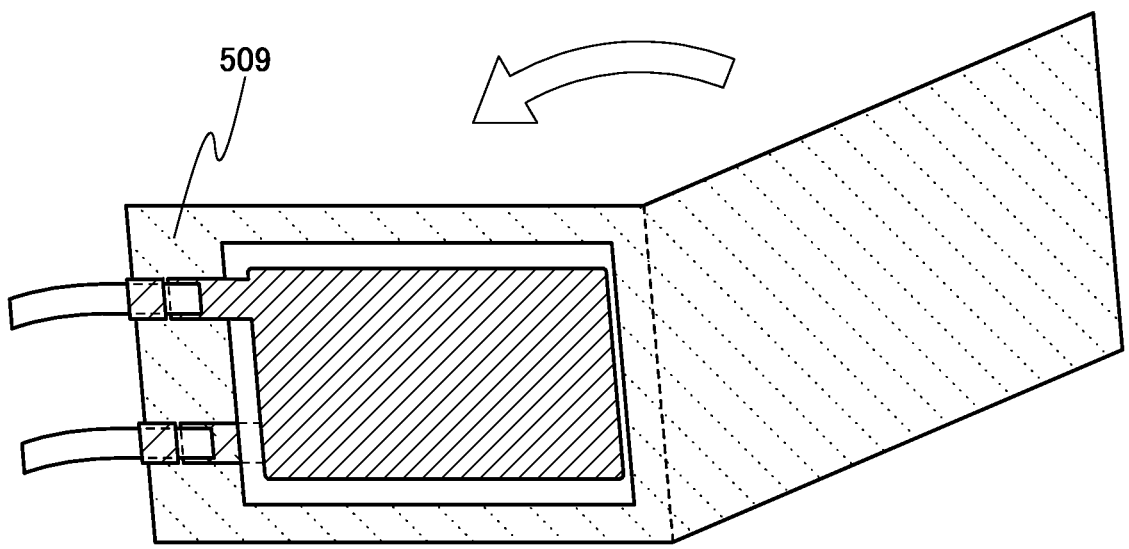
FIG. 4C is a diagram showing an example of a method for manufacturing a secondary battery.

Subsequently, the exterior body 509 is folded along a dashed line as illustrated in FIG. 4C. Then, the outer edges of the exterior body 509 are bonded to each other. The bonding can be performed by thermocompression, for example. At this time, an unbonded region (hereinafter referred to as an inlet) is provided for part (or one side) of the exterior body 509 so that the electrolyte solution 508 can be introduced later.

Figure 5A:
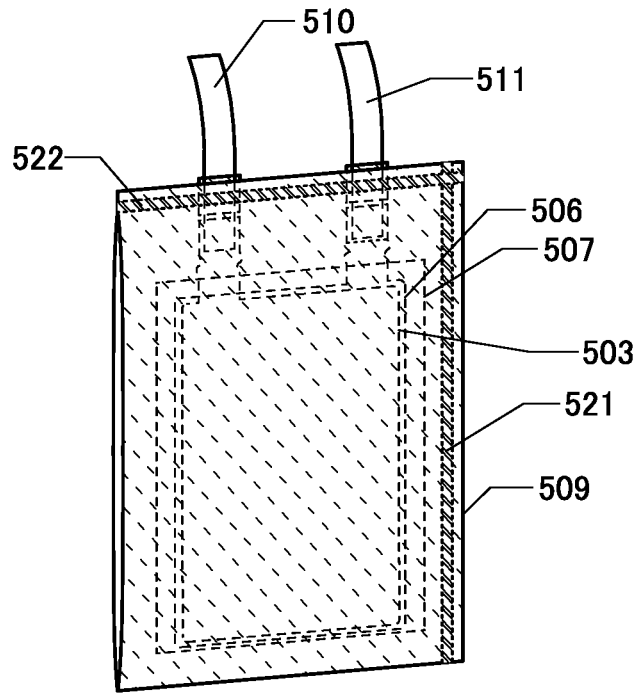
FIG. 5A is a diagram showing an example of a method for manufacturing a secondary battery.
Figure 5B:
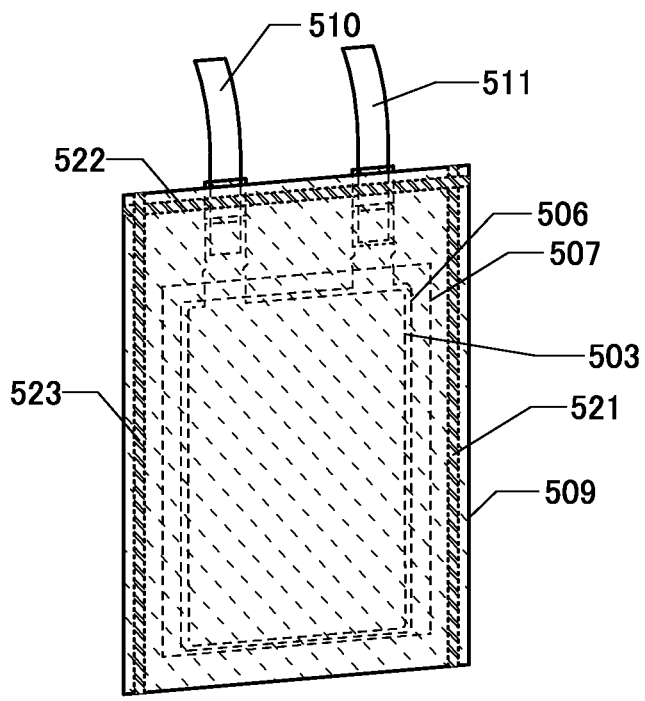
FIG. 5B is a diagram showing an example of a method for manufacturing a secondary battery.

Next, the electrolyte solution 508 (not illustrated) is introduced into the exterior body 509 from the inlet of the exterior body 509. For example, in the exterior body 509, a sealing portion 521 along a first side and a sealing portion 522 along a second side are sealed and a third side is not sealed as illustrated in FIG. 5A. Here, the exterior body 509 may be sealed while bonding layers are sandwiched between the positive electrode lead electrode 510 and the exterior body 509 and between the negative electrode lead electrode 511 and the exterior body 509 in the sealing portion 522. Then, the electrolyte solution 508 is introduced from the opening portion positioned on the third side. After that, a sealing portion 523 along the third side is sealed as illustrated in FIG. 5B. The electrolyte solution 508 is preferably introduced in a reduced pressure atmosphere or in an inert gas atmosphere. Lastly, the inlet is bonded. In the above manner, the laminated secondary battery 500 can be manufactured.

Next, aging after fabrication of a secondary battery will be described. Aging is preferably performed after fabrication of a secondary battery. The aging can be performed under the following conditions, for example. First, charge is performed at a rate of 0.001 C or more and 0.2 C or less. The temperature can be higher than or equal to room temperature and lower than or equal to 50° C., for example. In the case where the reaction potential of the positive electrode or the negative electrode is out of the range of the potential window of the electrolyte solution 508, the electrolyte solution is decomposed by charge and discharge of a secondary battery in some cases. In the case where a gas is generated due to decomposition of an electrolyte solution and the gas accumulated in the cell, a region where the electrolyte solution cannot be in contact with the surface of the electrode is generated. That is to say, an effectual reaction area of the electrode is reduced and effectual resistance is increased.

When the resistance is extremely increased, the negative electrode potential is decreased. Consequently, lithium is intercalated into graphite and lithium is precipitated on the surface of graphite. The lithium precipitation might cause reduction of capacity. For example, if a coating film or the like is grown on the surface after lithium precipitation, lithium precipitated on the surface cannot be eluted again, and the amount of lithium that does not contribute to capacity increases. In addition, also when precipitated lithium is physically collapsed and conduction with the electrode is lost, lithium that does not contribute to capacity is generated. Therefore, the gas is preferably released before the potential of the negative electrode reaches the potential of lithium because of an increase in charge voltage.

After the release of the gas is performed, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the charge initially performed, an electrolyte solution decomposed on the surface forms a coating film on the surface of graphite. The formed coating film may thus be densified when the charging state is held at a temperature higher than room temperature after the release of the gas, for example.

[Example of Stack of Positive Electrode, Negative Electrode, and Separator]

Next, a variety of examples of the stack of the positive electrode, the negative electrode, and the separator will be described.

Figure 6A:
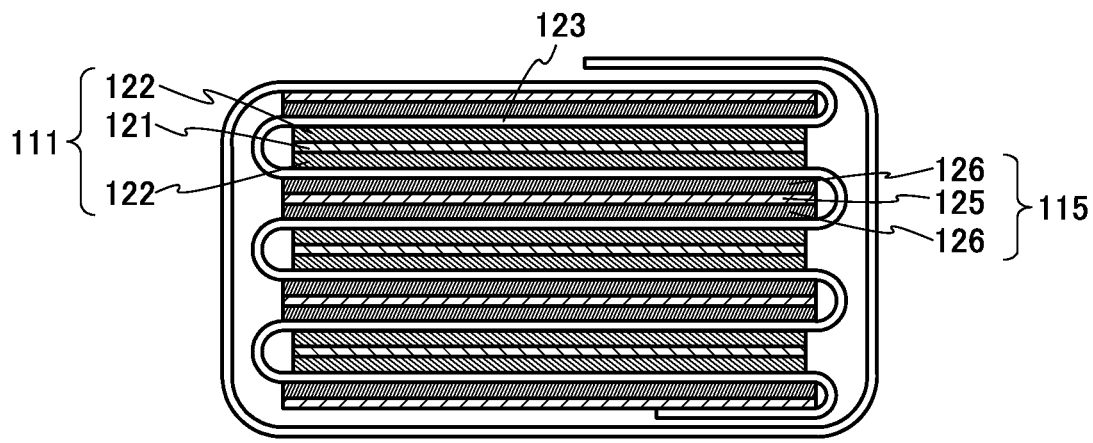
FIG. 6A is a diagram showing an example of an electrode.

In the structure illustrated in FIG. 6A, one sheet of separator 123 is folded more than once to be sandwiched between every pair of the positive electrode active material layer 122 and the negative electrode active material layer 126. In the structure illustrated in FIG. 6A, the positive electrode active material layer 122 is provided on both surfaces or one surface of the positive electrode current collector 121 in the positive electrode 111, and the negative electrode active material layer 126 is provided on both surfaces or one surface of the negative electrode current collector 125 in the positive electrode 115. In the structure illustrated in FIG. 6A, the positive electrode active material layer 122 faces the negative electrode active material layer 126 in six pairs with the separator 123 therebetween, and the separator 123 is preferably bent at least five times. The separator 123 is not necessarily provided so as to be sandwiched between every pair of the positive electrode active material layer 122 and the negative electrode active material layer 126, and the plurality of positive electrodes 111 and the plurality of negative electrodes 115 may be bound together by extending the separator 123.

Figure 6B:
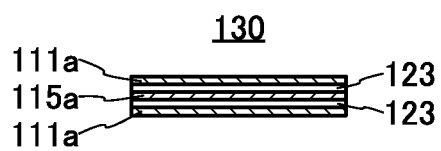
FIG. 6B is a diagram showing an example of a method for manufacturing a secondary battery.
Figure 6C:
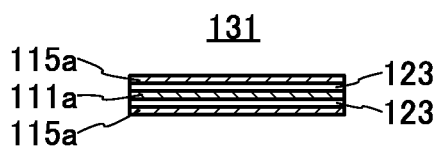
FIG. 6C is a diagram showing an example of a method for manufacturing a secondary battery.
Figure 6D:
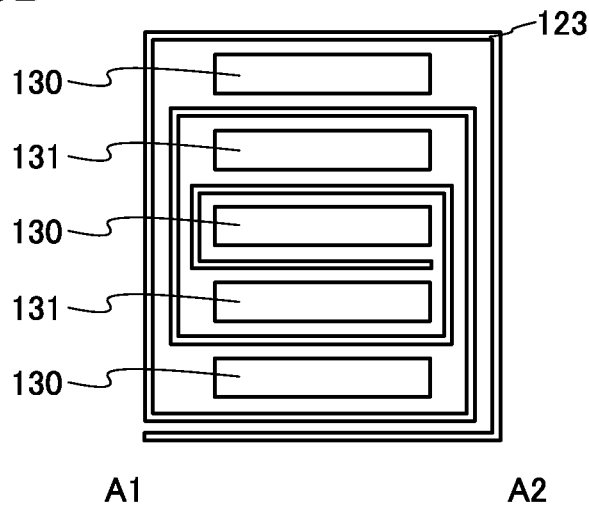
FIG. 6D is a diagram showing an example of a method for manufacturing a secondary battery.

FIG. 6D shows an example in which the wound separator covers a plurality of electrode assemblies. FIG. 6B is a cross-sectional view of a first electrode assembly 130, and FIG. 6C is a cross-sectional view of a second electrode assembly 131. FIG. 6D is a cross-sectional view taken along the dashed-dotted line A1-A2 in FIG. 1. In FIG. 6D, the first electrode assembly 130, the second electrode assembly 131, and the separator 123 are selectively shown for the sake of clarity of the drawing.

As illustrated in FIG. 6B, in each of the first electrode assemblies 130, a positive electrode 111a including the positive electrode active material layers 122 on both surfaces of the positive electrode current collector 121, the separator 123, a negative electrode 115a including the negative electrode active material layers 126 on both surfaces of the negative electrode current collector 125, the separator 123, and the positive electrode 111a including the positive electrode active material layers 122 on both surfaces of the positive electrode current collector 121 are stacked in this order. As illustrated in FIG. 6C, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 6D, the secondary battery 500 includes a plurality of first electrode assemblies 130 and a plurality of second electrode assemblies 131. As illustrated in FIG. 6D, the plurality of first electrode assemblies 130 and the plurality of second electrode assemblies 131 are covered with the wound separator 123.

Example 2 of Secondary Battery

Figure 7A:
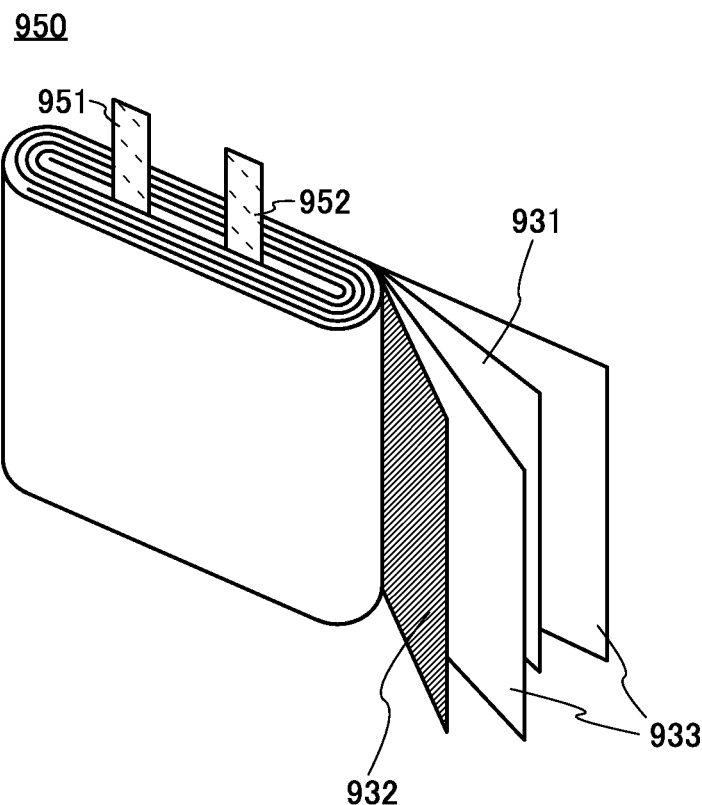
FIG. 7A is a diagram showing a structure example of a secondary battery.

A wound body 950 illustrated in FIG. 7A includes a negative electrode 931, a positive electrode 932, and separators 933. The wound body 950 is obtained by winding a sheet of a stack in which the negative electrode 931 and the positive electrode 932 overlap with the separator 933 provided therebetween. Note that a plurality of stacks each including the negative electrode 931, the positive electrode 932, and the separator 933 may be stacked. Note that the number of stacks including the negative electrode 931, the positive electrode 932, and the separator 933 is designed as appropriate depending on required capacity and element volume.

Figure 7B:
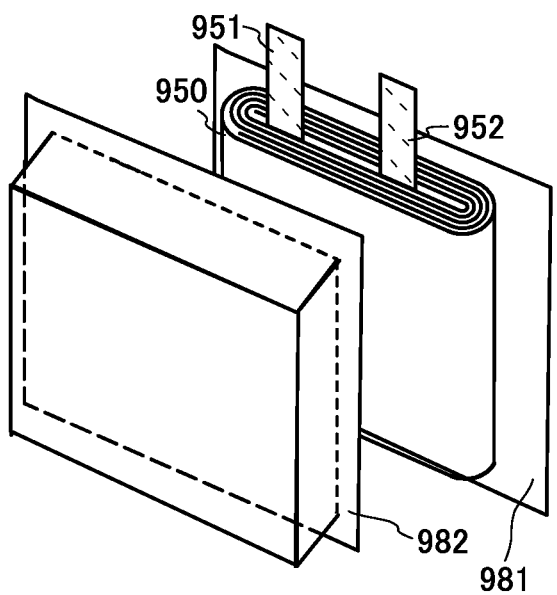
FIG. 7B is a diagram showing a structure example of a secondary battery.
Figure 7C:
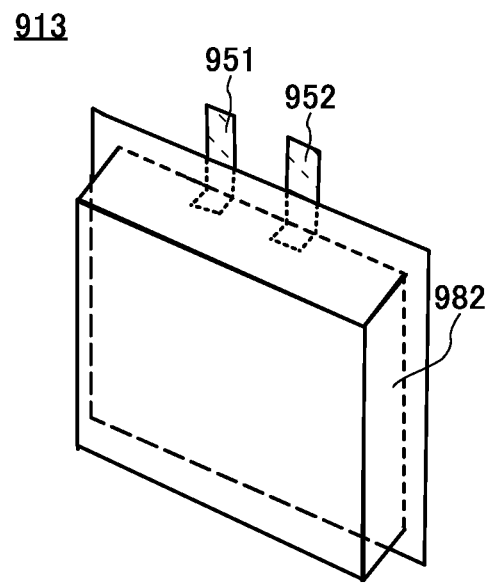
FIG. 7C is a diagram showing a structure example of a secondary battery.

As illustrated in FIG. 7B, the wound body 950 is packed in a space formed through attachment of a film 981 serving as an exterior body and a film 982 having a depressed portion by thermocompression bonding or the like, whereby the secondary battery 913 illustrated in FIG. 7C can be formed. The wound body 950 includes a terminal 951 and a terminal 952, and is immersed in an electrolyte solution inside a space surrounded by the film 981 and the film 982 having a depressed portion. The terminal 951 and the terminal 952 are lead electrodes, for example.

For the film 981 and the film 982 having a depressed portion, the material, mode, and the like described for the exterior body 509 can be used.

In addition, although FIG. 7B and FIG. 7C show an example of using two films, a space may be formed by bending one film and the wound body 950 may be packed in the space.

Figure 8:
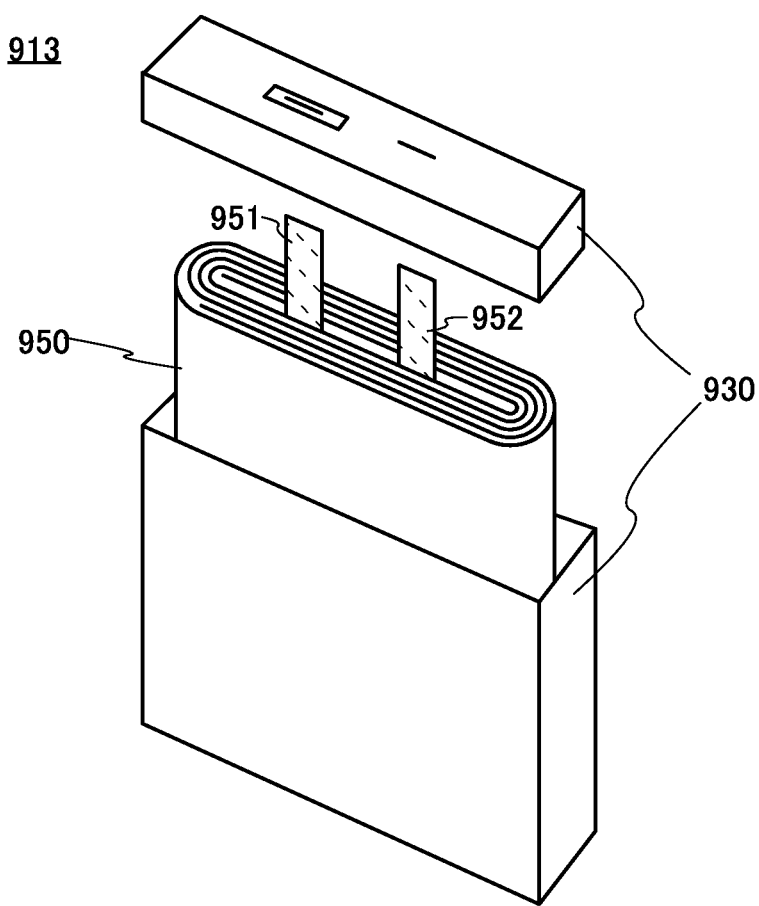
FIG. 8 is a diagram showing a structure example of a secondary battery.

FIG. 8 shows an example in which a prism-shaped case is used as a housing 930. As the housing 930, for example, a prism-shaped can can be used. Alternatively, the housing 930 may have a cylindrical shape, for example. For the can, the following description of a battery can can be referred to, for example.

The wound body 950 is immersed in an electrolyte solution inside the housing 930. The terminal 952 is in contact with the housing 930, and an insulator or the like inhibits contact between the terminal 951 and the housing 930. Note that for convenience, FIG. 8 illustrates the housing 930 divided into pieces; however, in reality, the wound body 950 is covered with the housing 930 and the terminal 951 and the terminal 952 extend to the outside of the housing 930. For the housing 930, a metal material (e.g., aluminum) or a resin material can be used.

Example 1 of Battery Pack

Figure 9A:
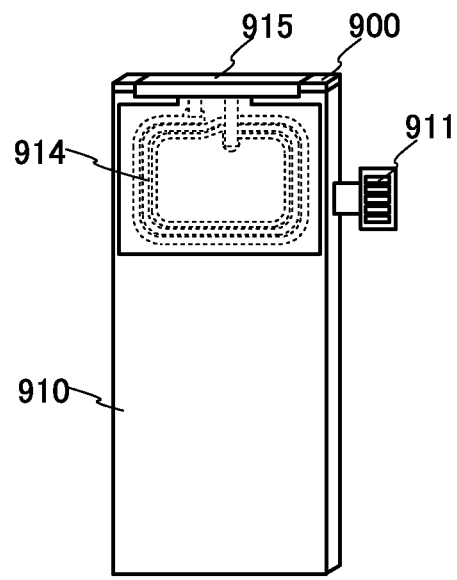
FIG. 9A is a diagram showing a structure example of a battery pack.
Figure 9B:
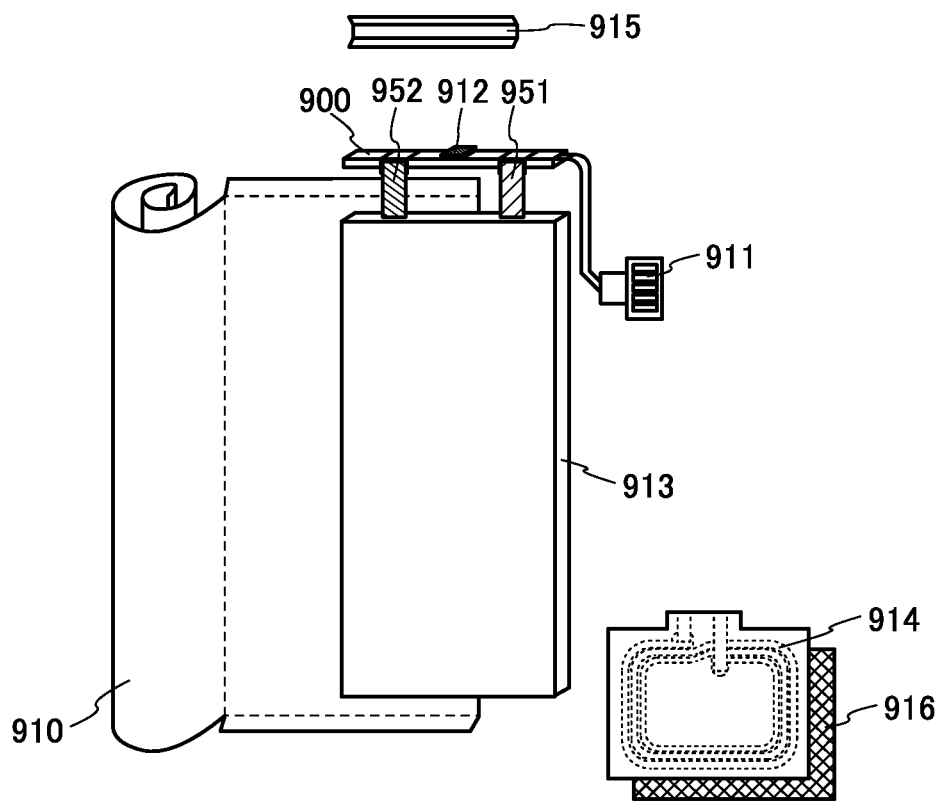
FIG. 9B is a diagram showing a structure example of a battery pack.

FIG. 9A and FIG. 9B are diagrams showing external views of a battery pack. The battery pack includes a circuit board 900 and a secondary battery 913. A label 910 is attached to the secondary battery 913. As illustrated in FIG.

9B, the secondary battery 913 includes a terminal 951 and a terminal 952. The circuit board 900 is fixed by a sealant 915.

The circuit board 900 includes a terminal 911 and a battery control circuit 912. The terminal 911 is connected to the terminal 951, the terminal 952, an antenna 914, and the battery control circuit 912 via the circuit board 900. Note that a plurality of terminals 911 may be provided to serve separately as a control signal input terminal, a power supply terminal, and the like.

The battery control circuit 912 may be provided on the rear surface of the circuit board 900. Note that the shape of the antenna 914 is not limited to a coil shape and may be a linear shape or a plate shape, for example. An antenna such as a planar antenna, an aperture antenna, a traveling-wave antenna, an EH antenna, a magnetic-field antenna, or a dielectric antenna may be used. Alternatively, the antenna 914 may be a flat-plate conductor. This flat-plate conductor can serve as one of conductors for electric field coupling. That is, the antenna 914 can serve as one of two conductors of a capacitor. Thus, electric power can be transmitted and received not only by an electromagnetic field or a magnetic field but also by an electric field.

The battery pack includes a layer 916 between the antenna 914 and the secondary battery 913. The layer 916 has a function of blocking an electromagnetic field from the secondary battery 913, for example. For the layer 916, for example, a magnetic material can be used.

The battery pack preferably includes a temperature sensor.

<Battery Control Circuit>

The battery control circuit 912 can be used as a battery control circuit. The battery control circuit 912 preferably includes a charge control circuit. The battery control circuit 912 includes a switch. The switch can be formed using a transistor, for example.

A first transmission path that is connected to the terminal 951 of the secondary battery 913 and transmits electric power output from the secondary battery 913 is electrically connected to a terminal of the charge control circuit included in the battery control circuit 912. A second transmission path connected to the terminal 952 of the secondary battery 913 is electrically connected to the switch provided in the battery control circuit 912. The switch has a function of blocking the second transmission path. The switch controls conducting and blocking operations and can also be referred to as a switching means that switches between supply and block.

In the case where abnormality such as a micro-short circuit is detected by the battery control circuit 912, a signal is input to a gate of the switch which blocks the second transmission path, so that the second transmission path can be blocked. By blocking the second transmission path, the supply of a current from a charger or the supply of a current to a mobile device including the secondary battery 913 can be stopped. Furthermore, when a signal voltage applied to the gate of the switch for blocking the second transmission path is retained in a memory circuit (including a transistor using an oxide semiconductor), block can be maintained for a long time. Thus, a highly safe charge control system can be achieved.

In the case where the secondary battery 913 is charged with electric power supplied from a charger, the secondary battery 913 is in a charging state. The battery control circuit 912 monitors the behavior of voltage, current, or the like in the electrode 971 and the electrode 972, and when abnormality is detected, the second transmission path is blocked so that the charge is stopped.

The charger refers to a device including an adaptor connected to an external power source and a device that performs power transmission using a wireless signal, for example. Note that the charger is sometimes incorporated in an electronic device such as a mobile device.

<Example of Control in Accordance with Temperature>

Next, an example of controlling the secondary battery of one embodiment of the present invention in accordance with the ambient temperature will be described. The temperature can be measured using a temperature sensor.

The secondary battery of one embodiment of the present invention can be charged and discharged repeatedly with an extremely high charge voltage. As described in Example below, when the temperature is lower, the secondary battery of one embodiment of the present invention can be operated stably and repeatedly at a higher charge voltage.

An example in which the charge conditions of the secondary battery of one embodiment of the present invention are controlled in accordance with the temperature will be described below.

In the case where the temperature during charge is in a range of higher than or equal to a first temperature and lower than a second temperature, the upper limit voltage of the charge is a first value. In the case where the temperature during charge is higher than or equal to the second temperature, the upper limit voltage of the charge is a second value.

For example, the first temperature is higher than or equal to 5° C. and lower than 15° C., and the second temperature is higher than or equal to 25° C. and lower than 55° C. Alternatively, the first temperature is higher than or equal to 8° C. and lower than 15° C., and the second temperature is higher than or equal to 30° C. and lower than 55° C.

The first value is larger than the second value by 0.02 V or higher, 0.04 V or higher, 0.06 V or higher, or 0.08 V or higher, and is 0.05 V, for example.

The first value is larger than or equal to 4.45 V and smaller than or equal to 4.6 V, preferably larger than or equal to 4.47 V and smaller than 4.6 V, further preferably larger than or equal to 4.47 V and smaller than 4.55 V or larger than or equal to 4.49 V and smaller than 4.53 V, and is approximately 4.5 V, for example.

As described above, by controlling the charge conditions of the secondary battery, deterioration of the secondary battery can be suppressed and a lifetime can be extended.

Example 2 of Battery Pack

Note that the structure of the battery pack is not limited to that illustrated in FIG. 9.

Figure 10A:
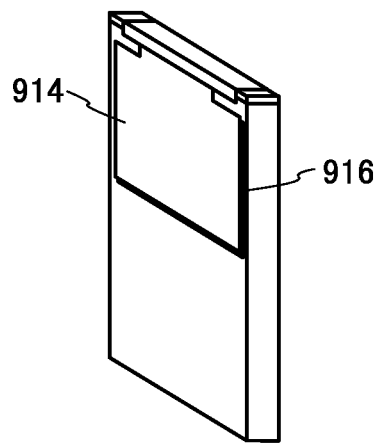
FIG. 10A is a diagram showing a structure example of a battery pack.
Figure 10B:
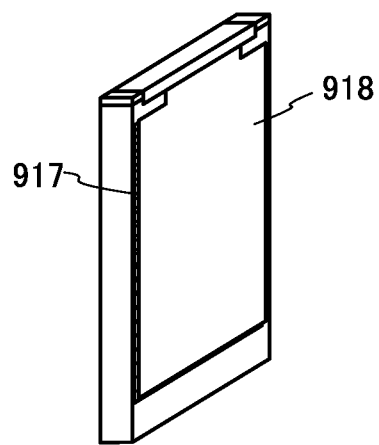
FIG. 10B is a diagram showing a structure example of a battery pack.

For example, as illustrated in FIG. 10A and FIG. 10B, an antenna may be provided for each of a pair of opposing surfaces of the secondary battery 913 illustrated in FIG. 9A and FIG. 9B. FIG. 10A is an external view illustrating one of the pair of surfaces, and FIG. 10B is an external view illustrating the other of the pair of surfaces. For portions similar to those of the secondary battery illustrated in FIG. 8A and FIG. 8B, the description of the secondary battery illustrated in FIG. 9A and FIG. 9B can be appropriately referred to.

As illustrated in FIG. 10A, the antenna 914 is provided on one of the pair of surfaces of the secondary battery 913 with the layer 916 located therebetween, and as illustrated in FIG. 10B, an antenna 918 is provided on the other of the pair of surfaces of the secondary battery 913 with a layer 917 located therebetween. The layer 917 has a function of blocking an electromagnetic field from the secondary battery 913, for example. For the layer 917, for example, a magnetic material can be used.

With the above structure, both of the antenna 914 and the antenna 918 can be increased in size. The antenna 918 has a function of communicating data with an external device, for example. An antenna with a shape that can be applied to the antenna 914, for example, can be used as the antenna 918. As a system for communication using the antenna 918 between the secondary battery and another device, a response method that can be used between the secondary battery and another device, such as NFC (near field communication), can be employed.

Figure 10C:
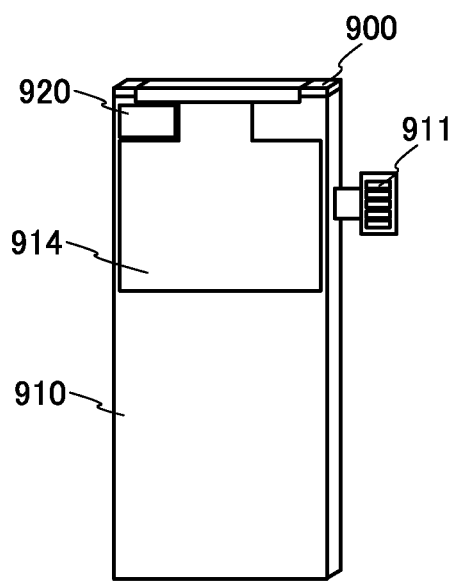
FIG. 10C is a diagram showing a structure example of a battery pack.

Alternatively, as illustrated in FIG. 10C, the secondary battery 913 illustrated in FIG. 9A and FIG. 9B may be provided with a display device 920. The display device 920 is electrically connected to the terminal 911. Note that the label 910 is not necessarily provided in a portion where the display device 920 is provided. Note that for the same portions as those in the secondary battery illustrated in FIG. 9A and FIG. 9B, it is possible to refer to the description of the secondary battery illustrated in FIG. 9A and FIG. 9B as appropriate.

The display device 920 may display, for example, an image showing whether or not charge is being carried out, an image showing the amount of stored power, or the like. As the display device 920, electronic paper, a liquid crystal display device, an electroluminescence (also referred to as EL) display device, or the like can be used, for example. For example, the use of electronic paper can reduce power consumption of the display device 920.

Figure 10D:
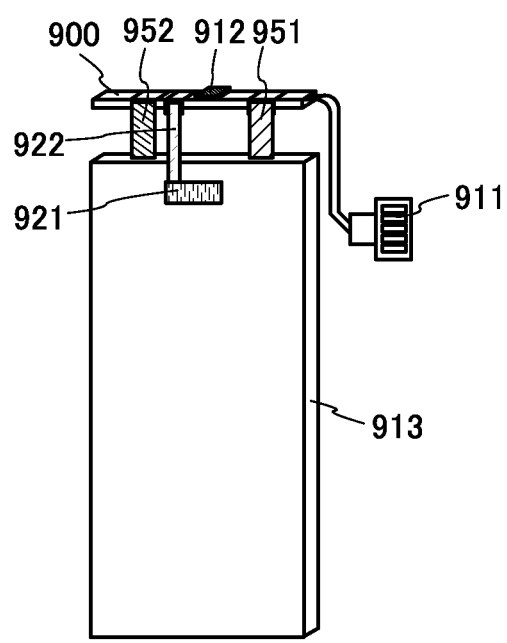
FIG. 10D is a diagram showing a structure example of a battery pack.

Alternatively, as illustrated in FIG. 10D, the secondary battery 913 illustrated in FIG. 9A and FIG. 9B may be provided with a sensor 921. The sensor 921 is electrically connected to the terminal 911 via a terminal 922. Note that for the same portions as those in the secondary battery illustrated in FIG. 9A and FIG. 9B, it is possible to refer to the description of the secondary battery illustrated in FIG. 9A and FIG. 9B as appropriate.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With the sensor 921, for example, data on an environment where the secondary battery is placed (e.g., temperature or the like) can be detected and stored in a memory inside the battery control circuit 912.

Further structural examples of the secondary battery 913 will be described with reference to FIG. 11A to FIG. 11E.

Various Structure Examples

Figure 11A:
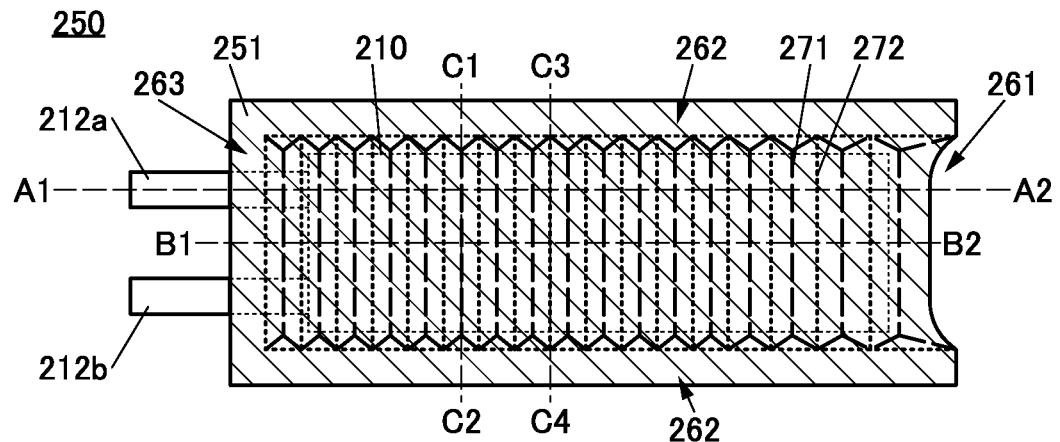
FIG. 11A is a diagram illustrating a bendable secondary battery.

FIG. 11A shows a schematic top view of a bendable secondary battery 250. FIG. 11B, FIG. 1C, FIG. 11D, and FIG. 11E are schematic cross-sectional views along cutting line C1-C2, cutting line C3-C4, cutting line A1-A2, and cutting line B1-B2, respectively, in FIG. 11A. The secondary battery 250 includes an exterior body 251 and an electrode stack 210 held in the exterior body 251. The electrode stack 210 has a structure in which at least a positive electrode 211a and a negative electrode 211b are stacked. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251. Note that although not illustrated in FIG. 11B and the like, a separator is provided between the positive electrode 211a and the negative electrode 211b, for example.

Next, the exterior body 251 is described using FIG. 11B, FIG. 11C, FIG. 11D, and FIG. 11E.

The exterior body 251 has a film-like shape and is folded in half with the positive electrodes 211a and the negative electrodes 211b between facing portions of the exterior body 251. The exterior body 251 includes a bent portion 261, a pair of seal portions 262, and a seal portion 263. The pair of seal portions 262 are provided with the positive electrodes 211a and the negative electrodes 211b positioned therebetween and can also be referred to as side seals. The seal portion 263 includes portions overlapping with the lead 212a and the lead 212b and can also be referred to as a top seal.

Portions of the exterior body 251 that overlap with the positive electrodes 211a and the negative electrodes 211b preferably have a wave shape in which crest lines 271 and trough lines 272 are alternately arranged. The seal portions 262 and the seal portion 263 of the exterior body 251 are preferably flat.

Figure 11B:
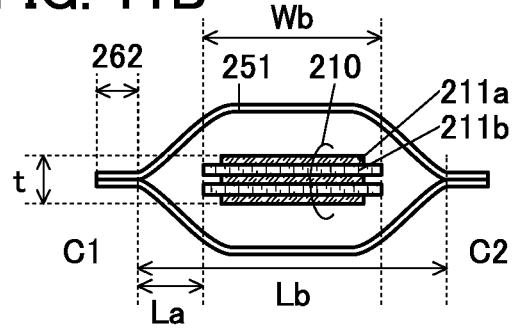
FIG. 11B is a diagram illustrating a bendable secondary battery.
Figure 11C:
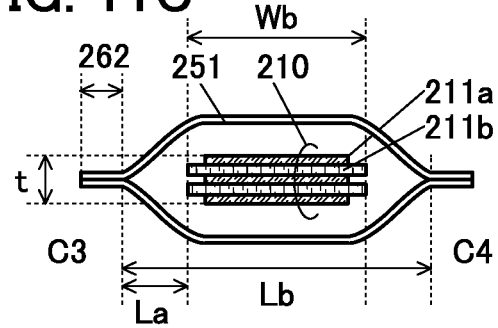
FIG. 11D is a diagram illustrating a bendable secondary battery.
FIG. 11E is a diagram illustrating a bendable secondary battery.

FIG. 11B shows a cross section cut along a portion overlapping with the crest line 271, and FIG. 11C shows a cross section cut along a portion overlapping with the trough line 272. FIG. 11B and FIG. 11C correspond to cross sections of the secondary battery 250, the positive electrodes 211a, and the negative electrodes 211b in the width direction.

Here, the distance between an end portion of the negative electrode 211b in the width direction, that is, the end portion of the negative electrode 211b, and the seal portion 262 is referred to as a distance La. When the secondary battery 250 changes in shape, for example, is bent, the positive electrode 211a and the negative electrode 211b change in shape such that positions thereof are shifted from each other in the length direction as described later. At the time, if the distance La is too short, the exterior body 251 rubs hard against the positive electrode 211a and the negative electrode 211b, so that the exterior body 251 is damaged in some cases. In particular, when a metal film of the exterior body 251 is exposed, the metal film might be corroded by the electrolyte solution. Therefore, the distance La is preferably set as long as possible. On the other hand, if the distance La is too long, the volume of the secondary battery 250 is increased.

The distance La between the positive electrode 211a and the negative electrode 211b, and the seal portion 262 is preferably increased as the total thickness of the positive electrode 211a and the negative electrode 211b that are stacked is increased.

Specifically, when the total thickness of the stacked positive electrodes 211a, negative electrodes 211b, and separators 214 (not illustrated) is indicated by t, the distance La is 0.8 times or more and 3.0 times or less, preferably 0.9 times or more and 2.5 times or less, further preferably 1.0 time or more and 2.0 times or less as large as the thickness t. When the distance La is in this range, a compact battery that is highly reliable for bending can be achieved.

Furthermore, when the distance between the pair of seal portions 262 is indicated by a distance Lb, it is preferable that the distance Lb be sufficiently larger than the widths of the positive electrode 211a and the negative electrode 211b (here, a width Wb of the negative electrode 211b). Thus, even if the positive electrode 211a and the negative electrode 211b come into contact with the exterior body 251 when deformation such as repeated bending of the secondary battery 250 is conducted, parts of the positive electrode 211a and the negative electrode 211b can be shifted in the width direction; hence, the positive electrode 211a and the negative electrode 211b can be effectively prevented from rubbing against the exterior body 251.

For example, the difference between the distance Lb between the pair of seal portions 262 and the width Wb of the negative electrode 211b is preferably 1.6 times or more and 6.0 times or less, further preferably 1.8 times or more and 5.0 times or less, still further preferably 2.0 times or more and 4.0 times or less as large as the thickness t of the positive electrode 211a and the negative electrode 211b.

Figure 11D:
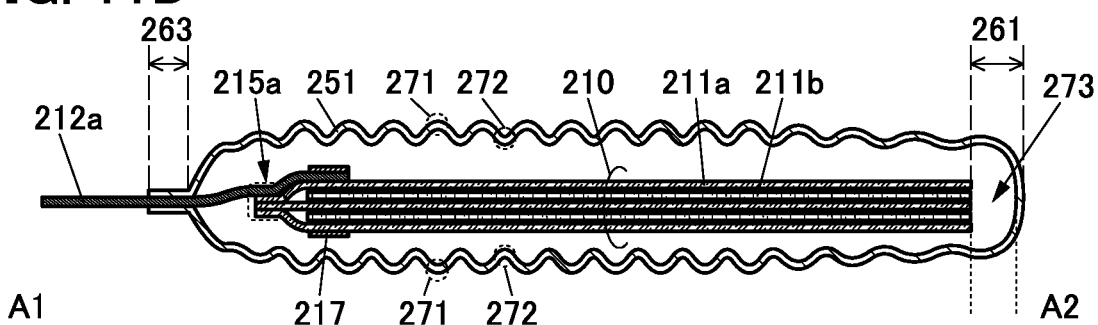

FIG. 11D shows a cross section including the lead 212a and corresponds to a cross section of the secondary battery 250, the positive electrode 211a, and the negative electrode 211b in the length direction. As illustrated in FIG. 11D, in the bent portion 261, a space 273 is preferably included between the end portions of the positive electrode 211a and the negative electrode 211b in the length direction and the exterior body 251. The lead 212a is bonded to the positive electrode 211a in a region 215a.

Figure 11E:
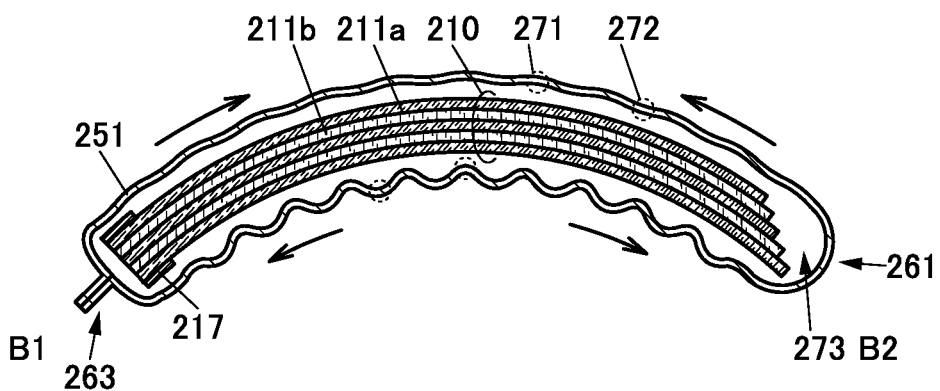

FIG. 11E shows a schematic cross-sectional view of the secondary battery 250 that is bent. FIG. 11E corresponds to a cross section along cutting line B1-B2 in FIG. 11A.

When the secondary battery 250 is bent, the exterior body 251 is deformed such that a part positioned on the outer side of bending expands and another part positioned on the inner side of bending shrinks. Specifically, a portion of the exterior body 251 that is positioned on the outer side is deformed such that the wave amplitude becomes smaller and the wave period becomes longer. By contrast, a portion of the exterior body 251 that is positioned on the inner side is deformed such that the wave amplitude becomes larger and the wave period becomes shorter. When the exterior body 251 is deformed in this manner, stress applied to the exterior body 251 due to bending is relieved, so that a material itself of the exterior body 251 does not need to expand and shrink. As a result, the secondary battery 250 can be bent with weak force without damage to the exterior body 251.

As illustrated in FIG. 11E, when the secondary battery 250 is bent, the positive electrode 211a and the negative electrode 211b are shifted relatively to each other. At this time, ends of the stacked positive electrodes 211a and negative electrodes 211b on the seal portion 263 side are fixed by a fixing member 217. Thus, the positive electrodes 211a and the negative electrodes 211b are shifted so that the shift amount becomes larger at a position closer to the bent portion 261. Therefore, stress applied to the positive electrodes 211a and the negative electrodes 211b is relieved, and the positive electrodes 211a and the negative electrodes 211b themselves do not need to expand and shrink. Consequently, the secondary battery 250 can be bent without damage to the positive electrodes 211a and the negative electrodes 211b.

Furthermore, the space 273 is included between the positive electrode 211a and the negative electrode 211b, and the exterior body 251, whereby the positive electrode 211a and the negative electrode 211b can be shifted relatively while the positive electrode 211a and the negative electrode 211b located on the inner side in bending do not come into contact with the exterior body 251.

Figure 12A:
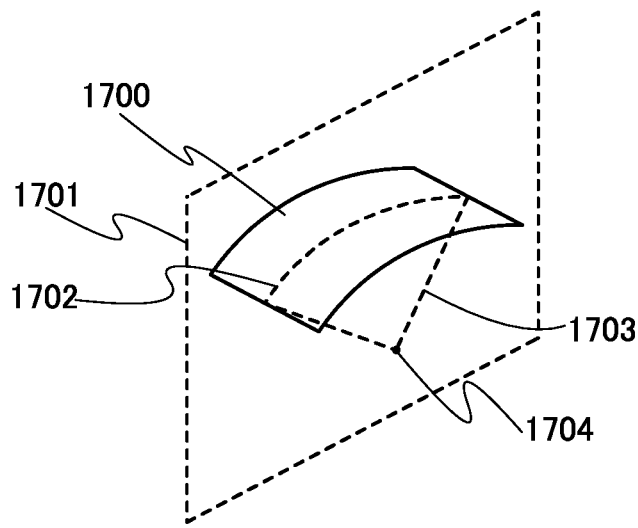
FIG. 12A is a diagram illustrating a curvature radius.
Figure 12B:
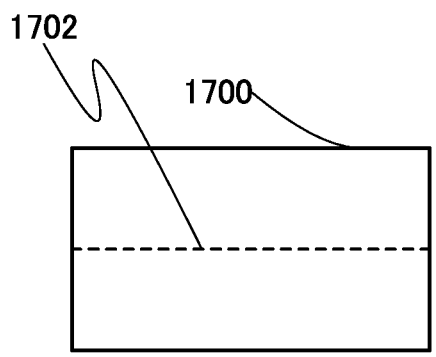
FIG. 12B is a diagram illustrating a curvature radius.
Figure 12C:
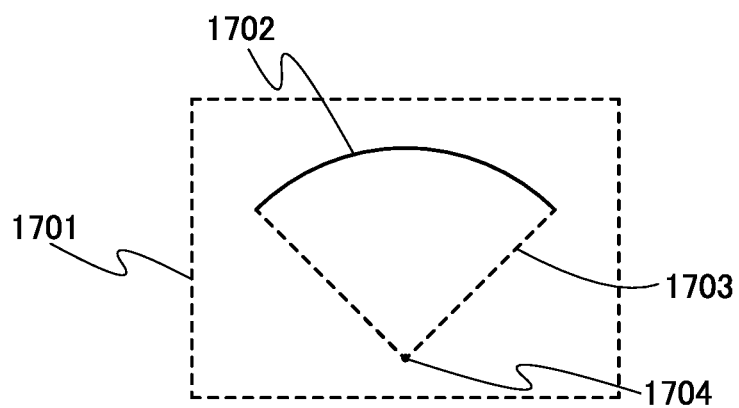
FIG. 12C is a diagram illustrating a curvature radius.

Description will be given of the radius of curvature of a surface with reference to FIG. 12A, FIG. 12B, and FIG. 12C. In FIG. 12A, on a plane 1701 with which a curved surface 1700 is cut, part of a curve 1702 forming the curved surface 1700 is approximate to an arc of a circle, and the radius of the circle is referred to as a radius 1703 of curvature and the center of the circle is referred to as a center 1704 of curvature. FIG. 12B shows a top view of the curved surface 1700. FIG. 12C shows a cross-sectional view in which the curved surface 1700 is cut with the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 13A:
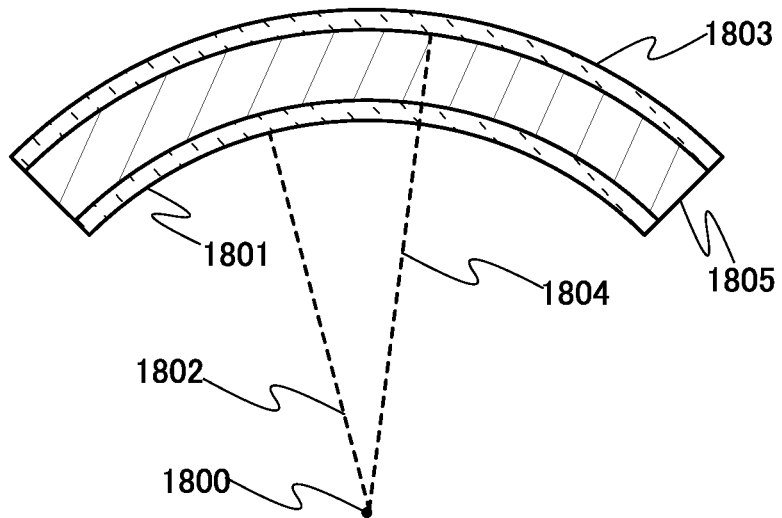
FIG. 13A is a diagram illustrating a curvature radius.
Figure 13B:
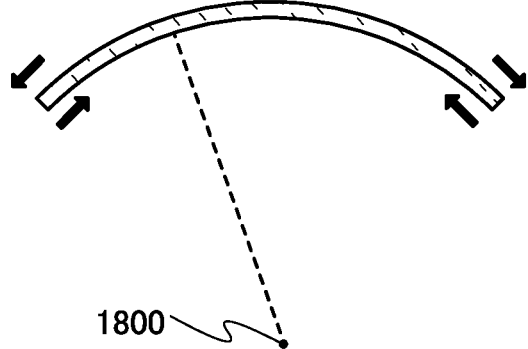
FIG. 13B is a diagram illustrating a curvature radius.

In the case of curving a secondary battery in which electrodes, an electrolyte solution, and the like 1805 are sandwiched between two films as exterior bodies, a radius 1802 of curvature of a film 1801 close to a center 1800 of curvature of the secondary battery is smaller than a radius 1804 of curvature of a film 1803 on the side far from the center 1800 of curvature (FIG. 13A). When the secondary battery is curved and has an arc-shaped cross section, compressive stress is applied to the surface of the film close to the center 1800 of curvature and tensile stress is applied to the surface of the film far from the center 1800 of curvature (FIG. 13B). By forming a pattern of projections or depressions on surfaces of the exterior bodies, influence of distortion can be reduced to be acceptable even when the compressive stress and the tensile stress are applied as described above. For this reason, the secondary battery can change its form such that the smallest curvature radius of the exterior body on the side closer to the center of curvature is greater than or equal to 3 mm and less than or equal to 30 mm, preferably greater than or equal to 3 mm and less than or equal to 10 mm.

Figure 13C:
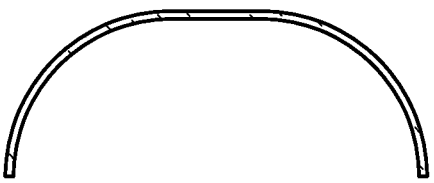
FIG. 13C is a diagram illustrating a curvature radius.
Figure 13D:
FIG. 13D is a diagram illustrating a curvature radius.

Note that the cross-sectional shape of the secondary battery is not limited to a simple arc shape, and it can have a shape including an arc partly; for example, a shape illustrated in FIG. 13C, a wavy shape (FIG. 13D), an S shape, and the like can be used. When the curved surface of the secondary battery has a shape with a plurality of centers of curvature, the secondary battery can change its form within a range that the radius of curvature of the exterior body on the side closer to the center of curvature of two exterior bodies is, for example, greater than or equal to 3 mm and less than or equal to 30 mm, preferably greater than or equal to 3 mm and less than or equal to 10 mm in the curved surface with the smallest radius of curvature among radii of curvature of each of a plurality of centers of curvature.

[Cylindrical Secondary Battery]

Figure 14A:
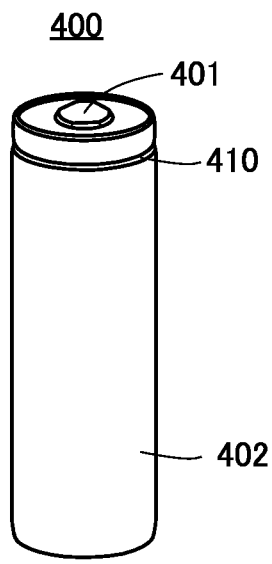
FIG. 14A shows an example of a cylindrical secondary battery.

An example of a cylindrical secondary battery is described with reference to FIG. 14A. A cylindrical secondary battery 400 includes, as illustrated in FIG. 14A, a positive electrode cap (battery lid) 401 on a top surface and a battery can (outer can) 402 on a side surface and a bottom surface. The positive electrode cap 401 and the battery can (outer can) 402 are insulated from each other by a gasket (insulating packing) 410.

Figure 14B:
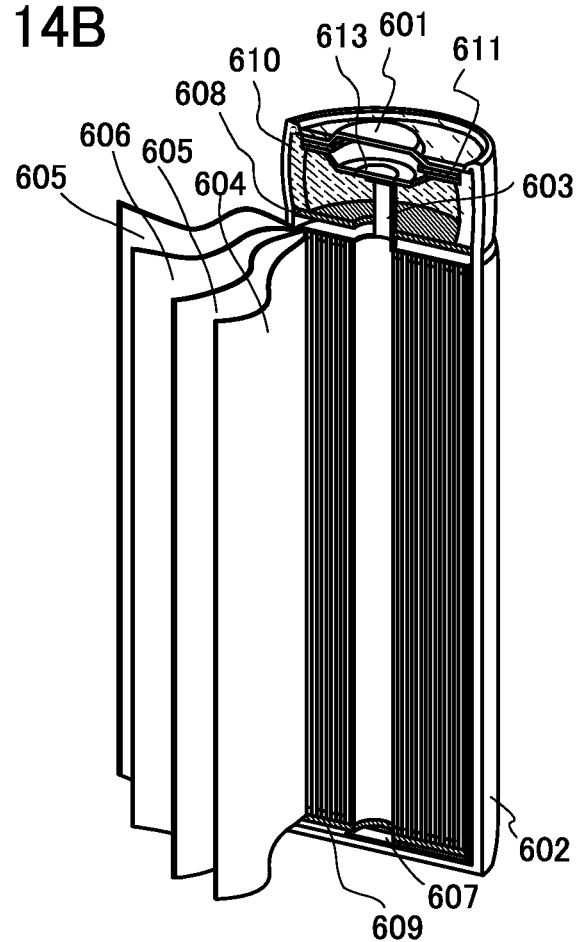
FIG. 14B shows an example of a cylindrical secondary battery.

FIG. 14B is a diagram schematically showing a cross-section of the cylindrical secondary battery. The cylindrical secondary battery illustrated in FIG. 14B includes a positive electrode cap (battery lid) 601 on a top surface and a battery can (outer can) 602 on a side surface and a bottom surface. The positive electrode cap and the battery can (outer can) 602 are insulated from each other by a gasket (insulating gasket) 610.

Inside the battery can 602 having a hollow cylindrical shape, a battery element in which a strip-like positive electrode 604 and a strip-like negative electrode 606 are wound with a separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. The battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte, a nonaqueous electrolyte that is similar to that for a coin-type secondary battery can be used.

Since a positive electrode and a negative electrode that are used for a cylindrical storage battery are wound, active materials are preferably formed on both surfaces of a current collector. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 613 and the bottom of the battery can 602, respectively. The safety valve mechanism 613 is electrically connected to the positive electrode cap 601 through a PTC (Positive Temperature Coefficient) element 611. The safety valve mechanism 613 cuts off electrical connection between the positive electrode cap 601 and the positive electrode 604 when the internal pressure of the battery exceeds a predetermined threshold. In addition, the PTC element 611 is a thermally sensitive resistor whose resistance increases as temperature rises, and limits the amount of current by increasing the resistance to prevent abnormal heat generation. Barium titanate ($BaTiO_3$)-based semiconductor ceramics or the like can be used for the PTC element.

Figure 14C:
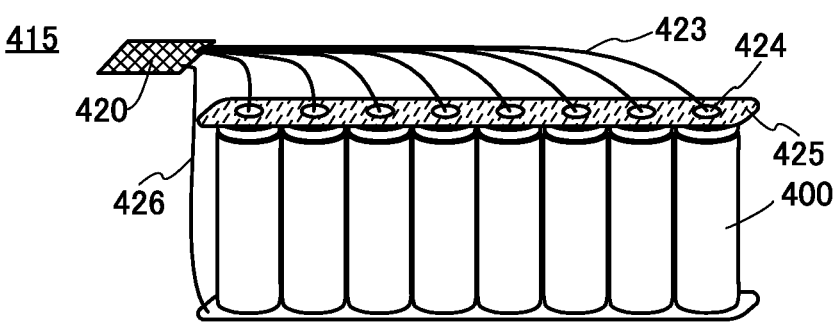
FIG. 14C shows an example of a plurality of cylindrical secondary batteries.

FIG. 14C shows an example of a power storage system 415. The power storage system 415 includes a plurality of secondary batteries 400. Positive electrodes of the secondary batteries are in contact with and electrically connected to conductors 424 isolated by an insulator 425. The conductor 424 is electrically connected to a control circuit 420 through a wiring 423. Negative electrodes of the secondary batteries are electrically connected to the control circuit 420 through a wiring 426. As the control circuit 420, the above-described battery control circuit 912 can be used.

Figure 14D:
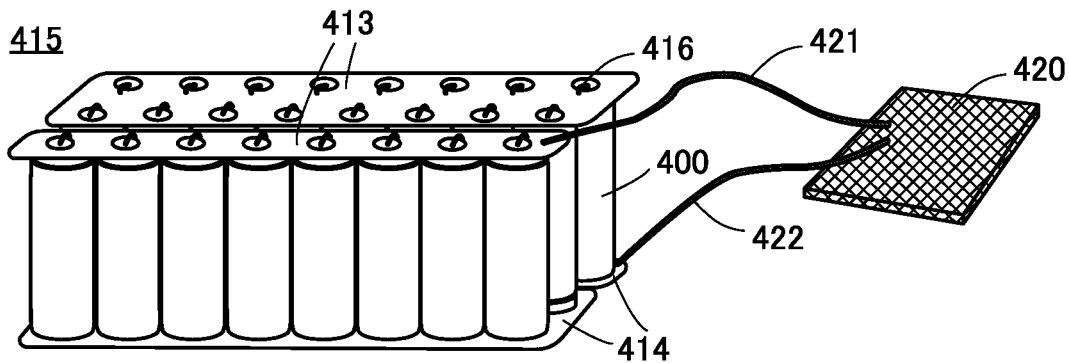
FIG. 14D shows an example of a power storage system including a plurality of cylindrical secondary batteries.

FIG. 14D shows an example of the power storage system 415. The power storage system 415 includes a plurality of secondary batteries 400, and the plurality of secondary batteries 400 are sandwiched between a conductive plate 413 and a conductive plate 414. The plurality of secondary batteries 400 are electrically connected to the conductive plate 413 and the conductive plate 414 through a wiring 416. The plurality of secondary batteries 400 may be connected in parallel, connected in series, or connected in series after being connected in parallel. With the power storage system 415 including the plurality of secondary batteries 400, large electric power can be extracted.

The plurality of secondary batteries 400 may be connected in parallel and then further connected in series.

A temperature control device may be provided between the plurality of secondary batteries 400. When the secondary batteries 400 are heated excessively, the temperature control device can cool them, and when the secondary batteries 400 get too cold, the temperature control device can heat them. Thus, the performance of the power storage system 415 is not easily influenced by the outside temperature.

In FIG. 14D, the power storage system 415 is electrically connected to the control circuit 420 through a wiring 421 and a wiring 422. The wiring 421 is electrically connected to the positive electrodes of the plurality of secondary batteries 400 through the conductive plate 413. The wiring 422 is electrically connected to the negative electrodes of the plurality of secondary batteries 400 through the conductive plate 414.

Example 3 of Battery Pack

Next, examples of the power storage system of one embodiment of the present invention are described with reference to FIG. 15.

Figure 15A:
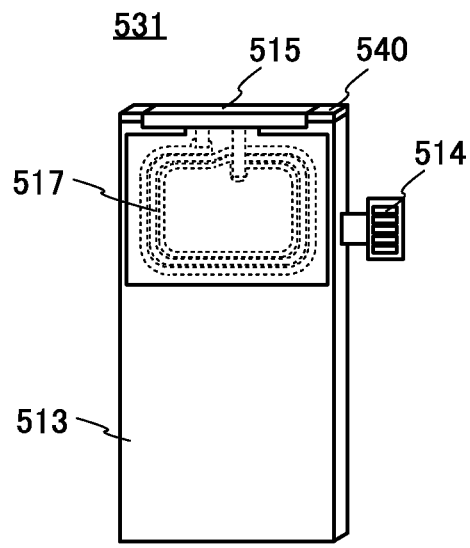
FIG. 15A shows a structure example of a battery pack.
Figure 15B:
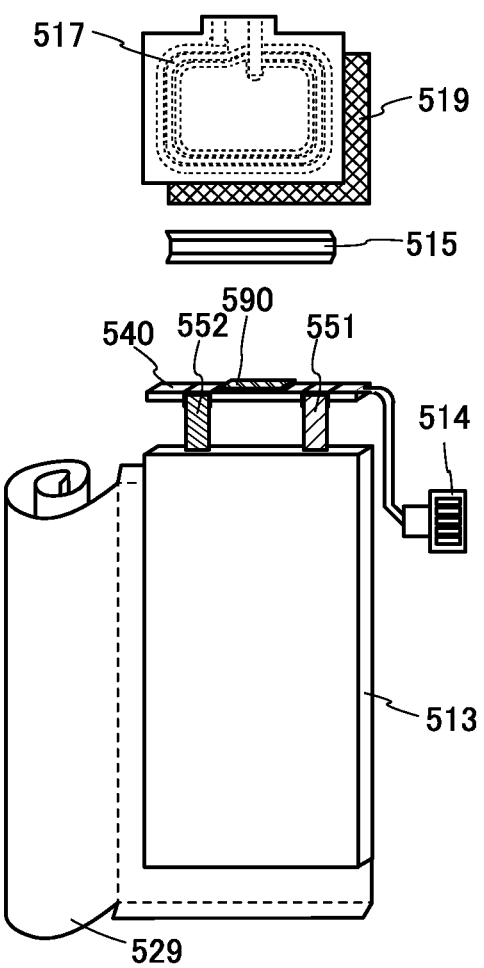
FIG. 15B shows a structure example of a battery pack.

FIG. 15A is a diagram showing an external view of a secondary battery pack 531. FIG. 15B is a diagram illustrating a structure of the secondary battery pack 531. The secondary battery pack 531 includes a circuit board 540 and a secondary battery 513. A label 529 is attached onto the secondary battery 513. The circuit board 540 is fixed by a sealant 515. The secondary battery pack 531 also includes an antenna 517.

In the secondary battery pack 531, a control circuit 590 is provided over the circuit board 540 as illustrated in FIG. 15B, for example. The circuit board 540 is electrically connected to a terminal 514. The circuit board 540 is electrically connected to the antenna 517, one 551 of a positive electrode lead and a negative electrode lead of the secondary battery 513, and the other 552 of the positive electrode lead and the negative electrode lead. As the control circuit 590, the above-described battery control circuit 912 can be used.

Figure 15C:
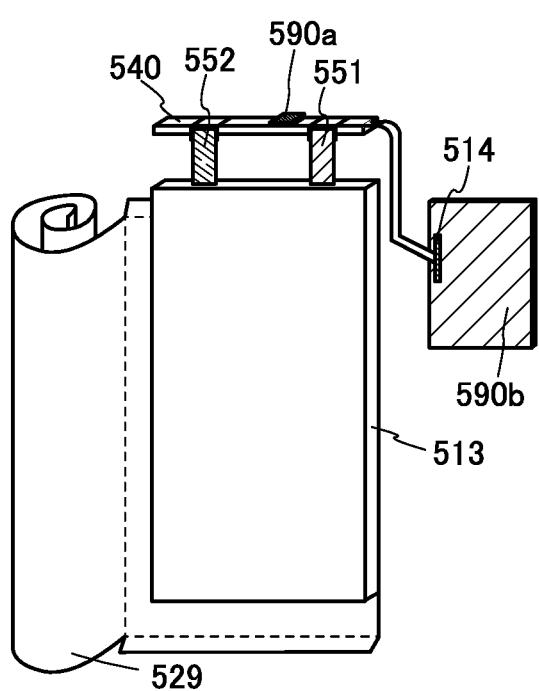
FIG. 15C shows a structure example of a battery pack.

Alternatively, as illustrated in FIG. 15C, a circuit system 590a provided over the circuit board 540 and a circuit system 590b electrically connected to the circuit board 540 through the terminal 514 may be included. For example, a part of the control circuit of one embodiment of the present invention is provided in the circuit system 590a, and another part thereof is provided in the circuit system 590b.

The shape of the antenna 517 is not limited to a coil shape and may be a linear shape or a plate shape, for example. An antenna such as a planar antenna, an aperture antenna, a traveling-wave antenna, an EH antenna, a magnetic-field antenna, or a dielectric antenna may be used. Alternatively, the antenna 517 may be a flat-plate conductor. This flat-plate conductor can serve as one of conductors for electric field coupling. That is, the antenna 517 can serve as one of two conductors of a capacitor. Thus, electric power can be transmitted and received not only by an electromagnetic field or a magnetic field but also by an electric field.

The secondary battery pack 531 includes a layer 519 between the antenna 517 and the secondary battery 513. The layer 519 has a function of blocking an electromagnetic field from the secondary battery 513, for example. For the layer 519, for example, a magnetic material can be used.

As the secondary battery 513, any of the above-described various secondary batteries can be used.

This embodiment can be combined with any of the other embodiments as appropriate.

Embodiment 2

This embodiment will describe an example of a power storage system including the secondary battery and the battery control circuit of embodiments of the present invention.

Figure 16A:
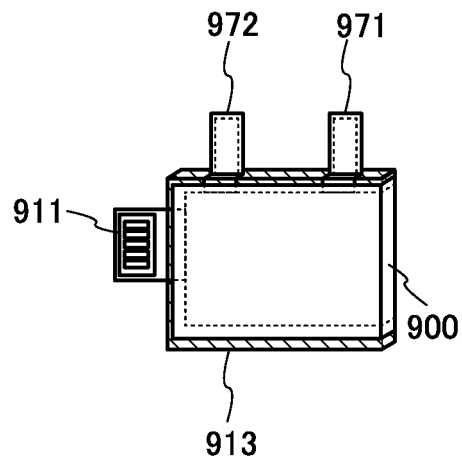
FIG. 16A shows a structure example of a power storage system.
Figure 16B:
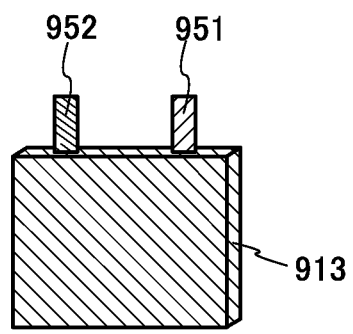
FIG. 16B shows an example of a method for manufacturing a power storage system.
Figure 16C:
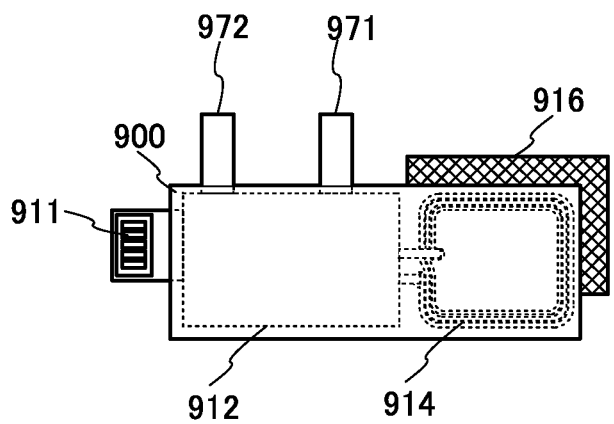
FIG. 16C shows an example of a method for manufacturing a power storage system.
Figure 16D:
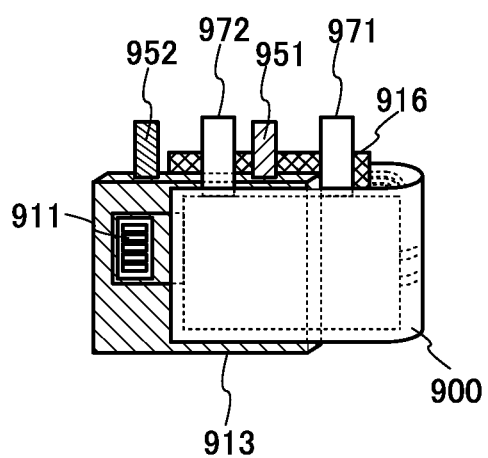
FIG. 16D shows an example of a method for manufacturing a power storage system.

FIG. 16A is a conceptual diagram of a power storage system, in which the battery control circuit 912 formed over a flexible substrate, which is a flexible film, is mounted on the secondary battery 913. The circuit board 900 is formed using a flexible substrate. FIG. 16B, FIG. 16C, and FIG. 16D are diagrams illustrating a method for fabricating the power storage system illustrated in FIG. 16A.

FIG. 16B illustrates the secondary battery 913. The secondary battery 913 includes the terminal 951 and the terminal 952. FIG. 16C illustrates the circuit board 900 that is opened.

As illustrated in FIG. 16D, the circuit board 900 is bent and provided to be wound around the secondary battery 913, whereby the power storage system illustrated in FIG. 16A can be formed.

The power storage system of one embodiment of the present invention includes the secondary battery 913 and the battery control circuit 912. The battery control circuit 912 includes a switch. The switch can be formed using a transistor, for example.

The power storage system of one embodiment of the present invention preferably includes the layer 916 and the antenna 914 formed over the circuit board 900. The layer 916 is an insulating sheet, for example. The antenna 914 is electrically connected to the battery control circuit 912, for example. The battery control circuit 912 includes, for example, a circuit for transmitting and receiving a signal from the antenna 914, such as a modulation circuit or a demodulation circuit.

A first transmission path that is connected to the terminal 951 of the secondary battery 913 and transmits electric power output from the secondary battery 913 is electrically connected through the electrode 971 to a terminal of the charge control circuit. A second transmission path connected to the terminal 952 of the secondary battery 913 is electrically connected through the electrode 972 to the switch that blocks the second transmission path. The switch controls conducting and blocking operations and can also be referred to as a switching means that switches between supply and block.

In the fabrication method in which the battery control circuit 912 is formed over the circuit board 900, a method in which the battery control circuit is formed over a semiconductor substrate, then separated by a separation method, and fixed onto the circuit board 900 is employed. A known technique can be used in the separation method. Alternatively, a method in which the battery control circuit is formed over a semiconductor substrate, a rear surface is polished, and then the circuit is fixed onto the circuit board 900 may be employed. Alternatively, a method in which what is called laser cutting, in which partial cutting is performed with the use of laser light, is performed, and then the circuit is fixed onto the circuit board 900 may be employed. Alternatively, a method in which the battery control circuit 912 is directly formed over the circuit board 900 may be employed. Alternatively, a method in which the battery control circuit 912 formed over a glass substrate is separated and then fixed onto the circuit board 900 may be employed.

In the case where abnormality such as a micro-short circuit is detected by the battery control circuit 912, a signal is input to a gate of the switch which blocks the second transmission path, so that the second transmission path can be blocked. By blocking the second transmission path, the supply of a current from a charger or the supply of a current to an electronic device or the like connected to the battery control circuit 912 can be stopped. Furthermore, when a signal voltage applied to the gate of the switch for blocking the second transmission path is retained in a memory circuit (including a transistor using an oxide semiconductor), block can be maintained for a long time. Thus, a highly safe power storage system can be achieved.

In the case where the secondary battery 913 is charged with electric power supplied from a charger, the secondary battery 913 is in a charging state. The battery control circuit 912 monitors the behavior of voltage, current, or the like in the electrode 971 and the electrode 972, and when abnormality is detected, the second transmission path is blocked so that the charge is stopped.

The charger refers to a device including an adaptor connected to an external power source and a device that performs power transmission using a wireless signal, for example. Note that the charger is sometimes incorporated in an electronic device such as a mobile device.

This embodiment can be combined with any of the other embodiments as appropriate.

Embodiment 3

In this embodiment, examples of vehicles each including the secondary battery of one embodiment of the present invention will be described. Examples of vehicles include automobiles, motorcycles, and bicycles.

The secondary battery of one embodiment of the present invention has high energy density. In addition, the secondary battery has a long lifetime and high reliability. When the secondary battery of one embodiment of the present invention is used in combination with a battery control circuit, the lifetime of the secondary battery can be further extended in some cases, which is preferable. Moreover, when the secondary battery of one embodiment of the present invention is used in combination with a battery control circuit, the safety of an electronic device, a vehicle, or the like including the secondary battery can be improved.

An example in which a vehicle includes a power storage system in which the secondary battery of one embodiment of the present invention and a battery control circuit are combined is described below, but in the structure described below, the power storage system incorporated in the vehicle can have a structure not including the above-described battery control circuit. For example, only the secondary battery of one embodiment of the present invention may be applied to the vehicle described below.

The use of power storage systems in vehicles enables production of next-generation clean energy vehicles such as hybrid electric vehicles (HVs), electric vehicles (EVs), and plug-in hybrid electric vehicles (PHVs).

Figure 17A:
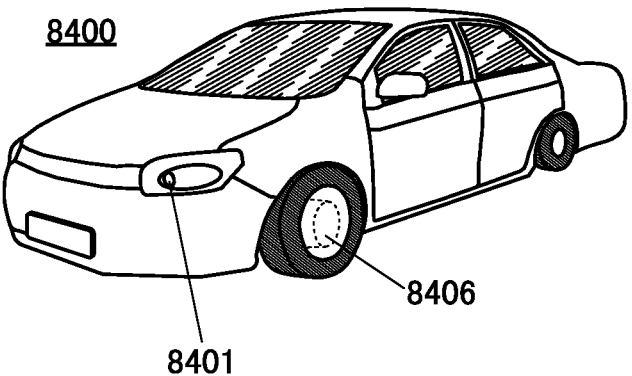
FIG. 17A is a diagram illustrating an example of a vehicle.
Figure 17B:
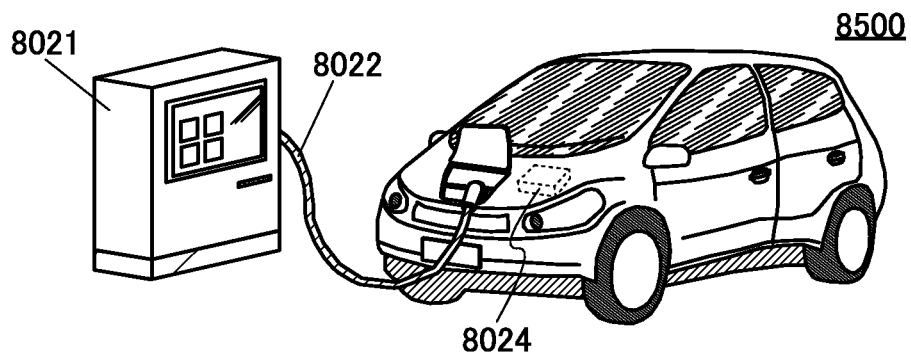
FIG. 17B is a diagram illustrating an example of a vehicle.
Figure 17C:
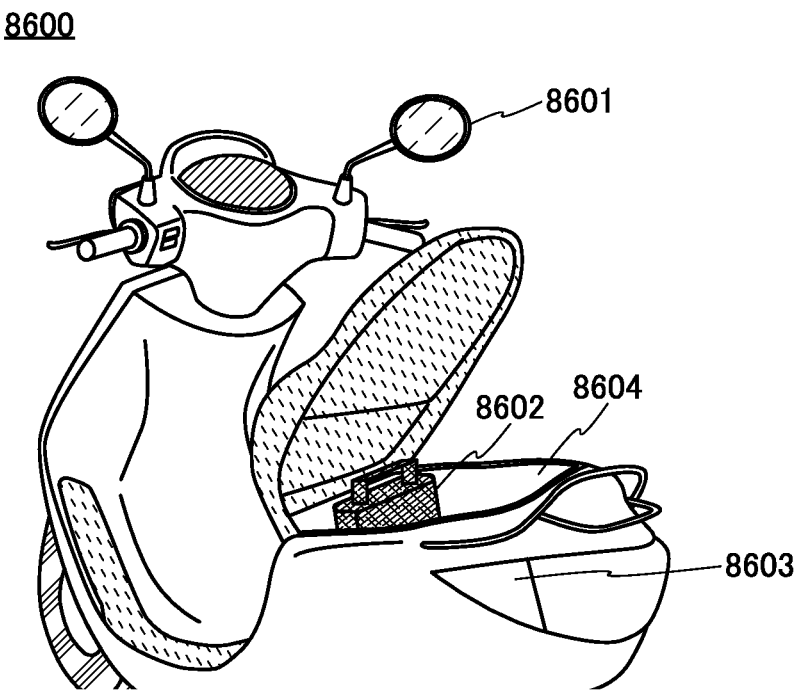
FIG. 17C is a diagram illustrating an example of a vehicle.

FIG. 17A, FIG. 17B, and FIG. 17C show examples of vehicles using the power storage system which is one embodiment of the present invention. An automobile 8400 illustrated in FIG. 17A is an electric vehicle that runs on an electric motor as a power source. Alternatively, the automobile 8400 is a hybrid electric vehicle capable of running appropriately using either an electric motor or an engine as a power source. The use of one embodiment of the present invention can achieve a high-mileage vehicle. The automobile 8400 includes a power storage system. The power storage system is used not only for driving an electric motor 8406, but also for supplying electric power to a light-emitting device such as a headlight 8401 or a room light (not illustrated).

The power storage system can also supply electric power to a display device of a speedometer, a tachometer, or the like included in the automobile 8400. Furthermore, the power storage system can supply electric power to a navigation system or the like included in the automobile 8400.

An automobile 8500 illustrated in FIG. 17B can be charged when the power storage system 8024 included in the automobile 8500 is supplied with electric power from external charging equipment by a plug-in system, a contactless power feeding system, or the like. FIG. 17B illustrates the state in which the power storage system 8024 included in the automobile 8500 is charged with a ground-based charging apparatus 8021 through a cable 8022. In charge, a given method such as CHAdeMO (registered trademark) or Combined Charging System may be employed as a charging method, the standard of a connector, or the like as appropriate. The charging apparatus 8021 may be a charging station provided in a commerce facility or a power source in a house. With the use of a plug-in technique, the power storage system 8024 included in the automobile 8500 can be charged by being supplied with electric power from the outside, for example. The charge can be performed by converting AC electric power into DC electric power through a converter, such as an AC-DC converter.

Although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charge can be performed not only when the electric vehicle is stopped but also when driven. In addition, the contactless power feeding system may be utilized to perform transmission and reception of electric power between vehicles. A solar cell may be provided in the exterior of the automobile to charge the power storage system when the automobile stops or moves. To supply electric power in such a contactless manner, an electromagnetic induction method or a magnetic resonance method can be used.

FIG. 17C is an example of a two-wheeled vehicle using the power storage system of one embodiment of the present invention. A motor scooter 8600 illustrated in FIG. 17C includes a power storage system 8602, side mirrors 8601, and indicator lights 8603. The power storage system 8602 can supply electricity to the indicator lights 8603.

In the motor scooter 8600 illustrated in FIG. 17C, the power storage system 8602 can be stored in a storage unit under seat 8604. The power storage system 8602 can be stored in the storage unit under seat 8604 even when the storage unit under seat 8604 is small.

Figure 18A:
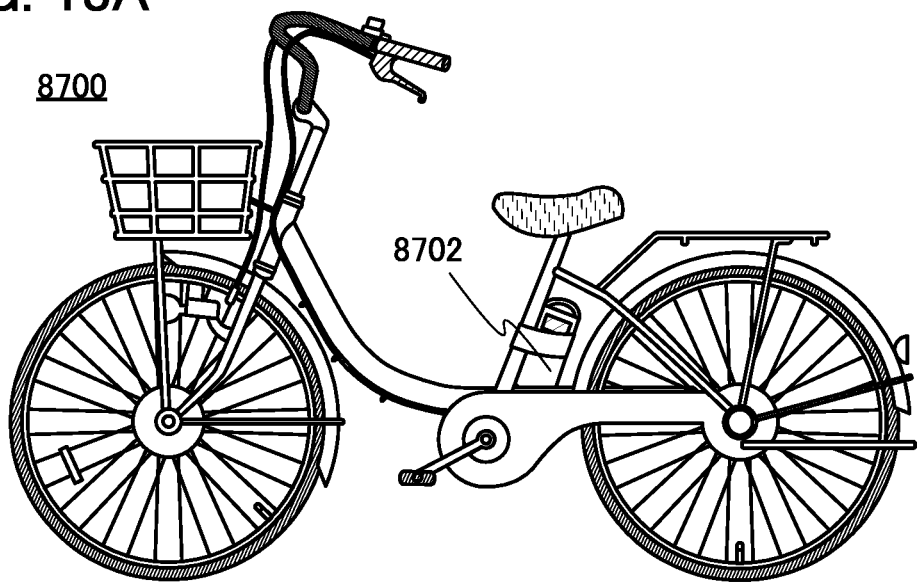
FIG. 18A is a diagram illustrating an example of a vehicle.

FIG. 18A is an example of an electric bicycle using the power storage system of one embodiment of the present invention. The power storage system of one embodiment of the present invention can be used for an electric bicycle 8700 illustrated in FIG. 18A.

Figure 18B:
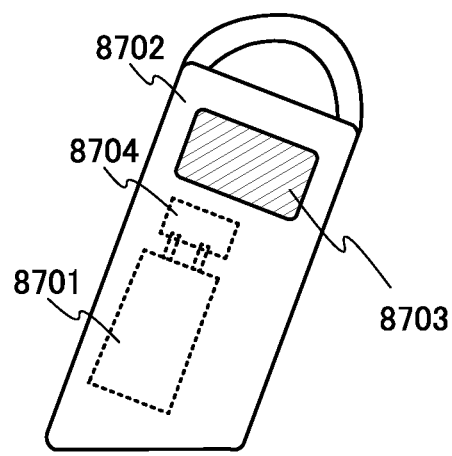
FIG. 18B is a diagram illustrating an example of a power storage system.

The electric bicycle 8700 includes a power storage system 8702. The power storage system 8702 can supply electricity to a motor that assists a rider. The power storage system 8702 is portable, and FIG. 18B illustrates the state where the power storage system 8702 is detached from the bicycle. A plurality of storage batteries 8701 included in the power storage system of one embodiment of the present invention are incorporated in the power storage system 8702, and the remaining battery capacity and the like can be displayed on a display portion 8703. The power storage system 8702 also includes a control circuit 8704 of one embodiment of the present invention. The control circuit 8704 is electrically connected to a positive electrode and a negative electrode of the storage battery 8701. The battery control circuit described in the above embodiment can be used as the control circuit 8704.

This embodiment can be combined with any of the other embodiments as appropriate.

Embodiment 4

In this embodiment, examples of electronic devices each including the secondary battery of one embodiment of the present invention will be described.

The secondary battery of one embodiment of the present invention has high energy density. In addition, the secondary battery has a long lifetime and high reliability. When the secondary battery of one embodiment of the present invention is used in combination with a battery control circuit, the lifetime of the secondary battery can be further extended in some cases, which is preferable. Moreover, when the secondary battery of one embodiment of the present invention is used in combination with a battery control circuit, the safety of an electronic device, a vehicle, or the like including the secondary battery can be improved.

An example in which an electronic device includes a power storage system in which the secondary battery of one embodiment of the present invention and a battery control circuit are combined is described below, but in the structure described below, the power storage system incorporated in the electronic device can have a structure not including the above-described battery control circuit. For example, only the secondary battery of one embodiment of the present invention may be applied to the electronic device described below.

Figure 19A:
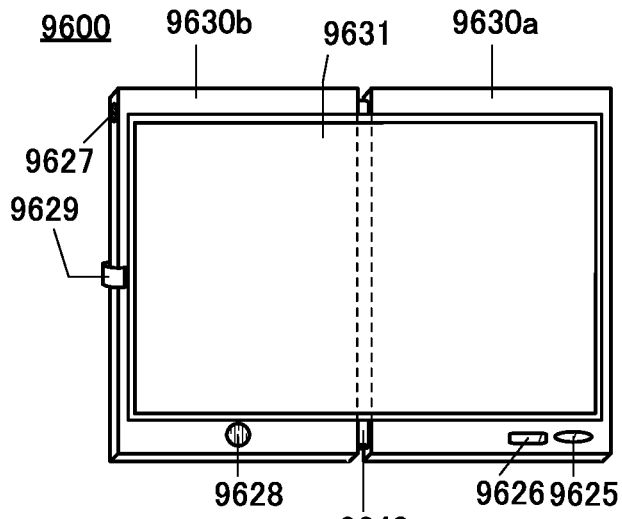
FIG. 19A is a diagram illustrating an example of an electronic device.
Figure 19B:
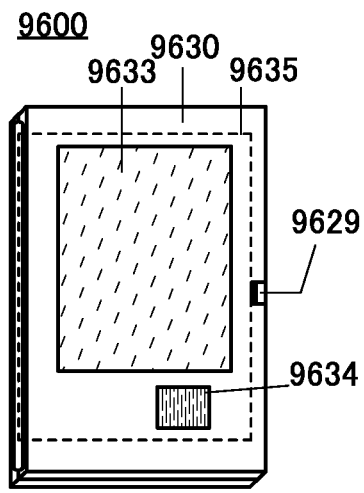
FIG. 19B is a diagram illustrating an example of an electronic device.

FIG. 19A and FIG. 19B show examples of a foldable tablet terminal (including a clamshell tablet). A tablet terminal 9600 illustrated in FIG. 19A and FIG. 19B includes a housing 9630*a*, a housing 9630*b*, a movable portion 9640 connecting the housing 9630*a* and the housing 9630*b*, a display portion 9631, a display mode changing switch 9626, a power switch 9627, a power saving mode changing switch 9625, a fastener 9629, and an operation switch 9628. A flexible panel is used for the display portion 9631, whereby a tablet terminal with a larger display portion can be provided. FIG. 19A illustrates the tablet terminal 9600 that is opened, and FIG. 19B illustrates the tablet terminal 9600 that is closed.

The tablet terminal 9600 includes a power storage unit 9635 inside the housing 9630*a* and the housing 9630*b*. The power storage unit 9635 is provided across the housing 9630*a* and the housing 9630*b*, passing through the movable portion 9640.

Part of the display portion 9631 can be a touch panel region and data can be input when a displayed operation key is touched. When a position where a keyboard display switching button is displayed on the touch panel is touched with a finger, a stylus, or the like, keyboard buttons can be displayed on the display portion 9631.

The display mode changing switch 9626 can switch the display between a portrait mode and a landscape mode, and between monochrome display and color display, for example. The power saving mode changing switch 9625 can optimize display luminance in accordance with the amount of external light in use, which is measured with an optical sensor incorporated in the tablet terminal 9600. Another detection device including, for example, a sensor for detecting inclination, such as a gyroscope sensor or an acceleration sensor, may be incorporated in the tablet terminal, in addition to the optical sensor.

FIG. 19B is a closed state and the tablet terminal includes the housing 9630, a solar cell 9633, and the power storage system of one embodiment of the present invention. The power storage system includes a control circuit 9634 and the power storage unit 9635. The battery control circuit described in the above embodiment can be used as the control circuit 9634.

The tablet terminal 9600 can be folded in half such that the housing 9630*a* and the housing 9630*b* overlap with each other when not in use. The display portion 9631 can be protected when the tablet terminal 9600 is folded, which increases the durability of the tablet terminal 9600.

The tablet terminal illustrated in FIG. 19A and FIG. 19B can also have a function of displaying various kinds of information (a still image, a moving image, a text image, and the like), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently.

Figure 19C:
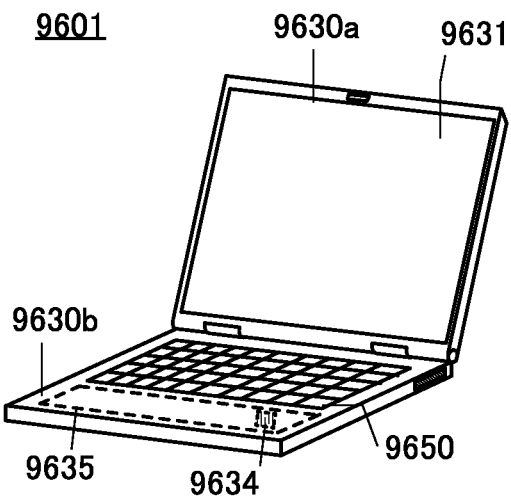
FIG. 19C is a diagram illustrating an example of an electronic device.

Note that although FIG. 19A and FIG. 19B illustrate a structure in which the battery control circuit described in the above embodiment is used for a tablet terminal that can be folded in half, another structure may be employed. For example, application to a clamshell laptop personal computer is possible as illustrated in FIG. 19C. FIG. 19C illustrates a laptop personal computer 9601 including a display portion 9631 in a housing 9630*a* and a keyboard portion 9650 in a housing 9630*b*. The laptop personal computer 9601 includes the control circuit 9634 and the power storage unit 9635 which are described with reference to FIG. 19A and FIG. 19B. The battery control circuit described in the above embodiment can be used as the control circuit 9634.

Figure 20:
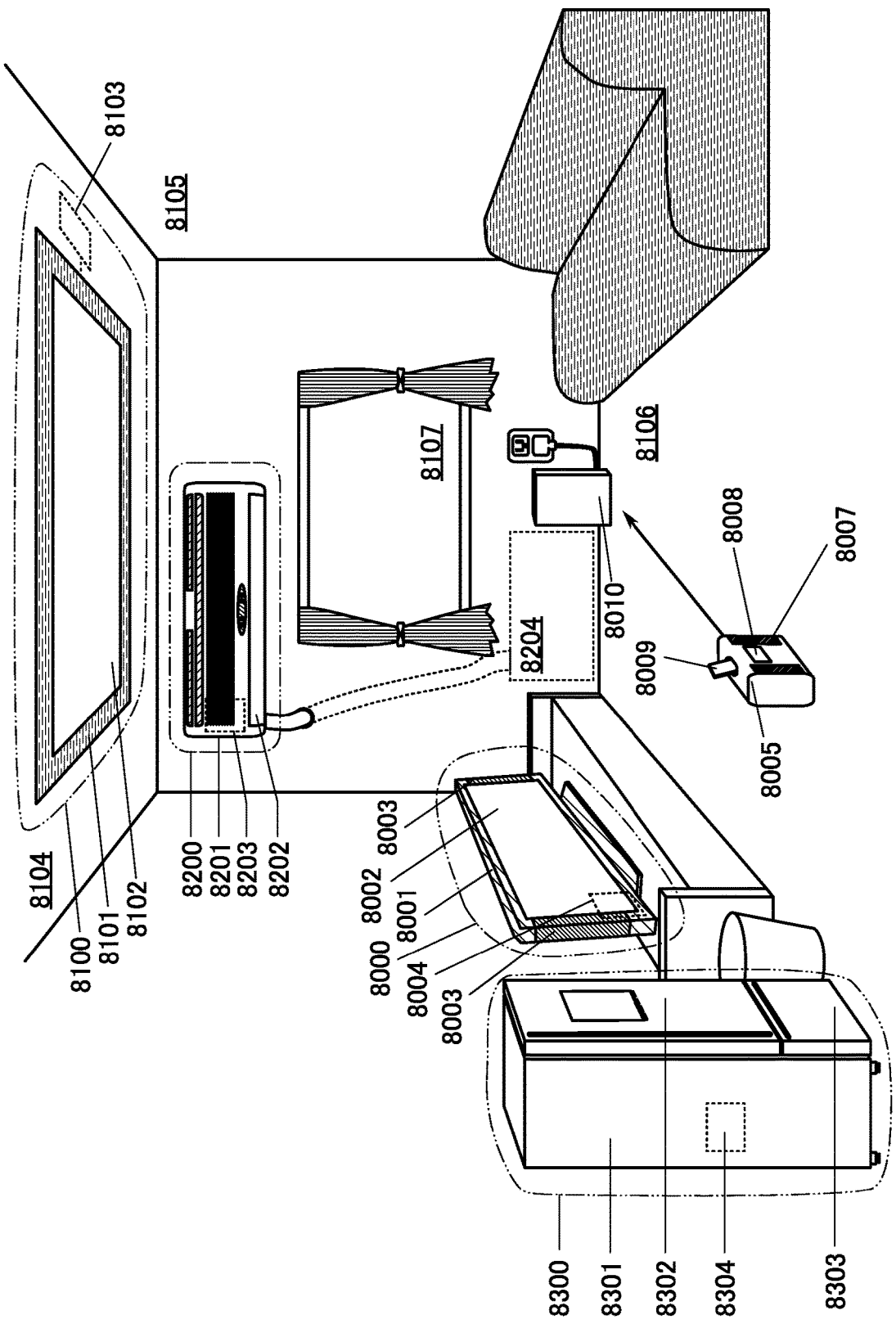
FIG. 20 is a diagram illustrating examples of electronic devices.

FIG. 20 illustrates other examples of electronic devices. In FIG. 20, a display device 8000 is an example of an electronic device including the power storage system of one embodiment of the present invention. Specifically, the display device 8000 corresponds to a display device for TV broadcast reception and includes a housing 8001, a display portion 8002, speaker portions 8003, a secondary battery 8004, and the like. A detection system according to one embodiment of the present invention is provided in the housing 8001. The display device 8000 can receive electric power from a commercial power supply. Alternatively, the display device 8000 can use electric power stored in the secondary battery 8004.

A semiconductor display device such as a liquid crystal display device, a light-emitting device in which a light-emitting element such as an organic EL element is provided in each pixel, an electrophoretic display device, a DMD (Digital Micromirror Device), a PDP (Plasma Display Panel), or an FED (Field Emission Display) can be used for the display portion 8002.

An audio input device 8005 also uses a secondary battery. The audio input device 8005 includes the power storage system described in the above embodiments. The audio input device 8005 includes a plurality of sensors (an optical sensor, a temperature sensor, a humidity sensor, a pressure sensor, an illuminance sensor, a motion sensor, and the like) including a microphone, in addition to wireless communication elements. In accordance with an instruction spoken by a user, another device can be operated; for example, powering of the display device 8000 can be controlled, the amount of light of a lighting device 8100 can be controlled, or the like. The audio input device 8005 is capable of audio operation of a peripheral device and replaces a manual remote controller.

The audio input device 8005 includes a wheel or a mechanical transfer means and is configured to be capable of, while listening to an instruction precisely with the incorporated microphone by moving in the direction in which speaking by a user can be heard, displaying the content on a display portion 8008 or performing a touch input operation on the display portion 8008.

The audio input device 8005 can also function as a charging dock of a portable information terminal 8009 such as a smartphone. Electric power can be transmitted and received with a wire or wirelessly between the portable information terminal 8009 and the audio input device 8005. The portable information terminal 8009 does not particularly need to be carried indoors, and a load on the secondary battery and degradation thereof are desirably avoided while a necessary capacity is ensured. Thus, control or maintenance of the secondary battery or the like is desirably performed by the audio input device 8005. Since the audio input device 8005 includes the speaker 8007 and the microphone, hands-free conversation is possible even while the portable information terminal 8009 is charged. When the capacity of the secondary battery of the audio input device 8005 decreases, the audio input device 8005 moves in the direction indicated by the arrow and is charged by wireless charging from a charging module 8010 connected to an external power source.

The audio input device 8005 may be put on a stand. The audio input device 8005 may be provided with a wheel or a mechanical transfer means to move to a desired position. Alternatively, a stand or a wheel is not provided and the audio input device 8005 may be fixed to a desired position, for example, on the floor or the like.

Note that the display device includes, in its category, all of information display devices for personal computers, advertisement displays, and the like other than TV broadcast reception.

In FIG. 20, the tabletop lighting device 8100 is an example of an electronic device using a secondary battery 8103 which is controlled by a microprocessor that controls charge (including an APS). Specifically, the lighting device 8100 includes a housing 8101, a light source 8102, the secondary battery 8103, and the like. Although FIG. 20 illustrates the case where the secondary battery 8103 is provided in a roof 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103.

Note that although the installation lighting device 8100 provided on the roof 8104 is illustrated in FIG. 20 as an example, the secondary battery 8103 can be used in an installation lighting device provided in, for example, a sidewall 8105, a floor 8106, a window 8107, or the like other than the roof 8104. Alternatively, the secondary battery 8103 can be used in a tabletop lighting device or the like.

As the light source 8102, an artificial light source which emits light artificially by using electric power can be used. Specifically, an incandescent lamp, a discharge lamp such as a fluorescent lamp, and a light-emitting element such as an LED or an organic EL element are given as examples of the artificial light source.

In FIG. 20, an air conditioner including an indoor unit 8200 and an outdoor unit 8204 is an example of an electronic device using a secondary battery 8203. Specifically, the indoor unit 8200 includes a housing 8201, an air outlet 8202, the secondary battery 8203, and the like. Although FIG. 20 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203.

In FIG. 20, an electric refrigerator-freezer 8300 is an example of an electronic device using a secondary battery 8304. Specifically, the electric refrigerator-freezer 8300 includes a housing 8301, a door for a refrigerator compartment 8302, a door for a freezer compartment 8303, the secondary battery 8304, and the like. The secondary battery 8304 is provided in the housing 8301 in FIG. 20. The electric refrigerator-freezer 8300 can receive electric power from a commercial power supply. Alternatively, the electric refrigerator-freezer 8300 can use electric power stored in the secondary battery 8304.

In addition, in a time period when electronic devices are not used, particularly when the proportion of the amount of electric power which is actually used to the total amount of electric power which can be supplied from a commercial power source (such a proportion is referred to as a usage rate of electric power) is low, electric power can be stored in the secondary battery, whereby an increase in the usage rate of electric power can be reduced in a time period when the electronic devices are used. For example, in the case of the electric refrigerator-freezer 8300, electric power can be stored in the secondary battery 8304 in night time when the temperature is low and the door for the refrigerator compartment 8302 and the door for the freezer compartment 8303 are not opened and closed. On the other hand, in daytime when the temperature is high and the door for the refrigerator compartment 8302 and the door for the freezer compartment 8303 are opened and closed, the secondary battery 8304 is used as an auxiliary power source; thus, the usage rate of electric power in daytime can be reduced.

A secondary battery can be provided in a variety of electronic devices as well as the above-described electronic devices. According to one embodiment of the present invention, the secondary battery can have excellent cycle performance. Thus, the microprocessor that controls charge (including an APS) of one embodiment of the present invention is mounted on the electronic device described in this embodiment, whereby an electronic device with a longer lifetime can be obtained. This embodiment can be implemented in appropriate combination with the other embodiments.

FIG. 21A to FIG. 21G show examples of electronic devices including the power storage system of one embodiment of the present invention. Examples of electronic devices to which the power storage system of one embodiment of the present invention is applied are television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines, and the like.

Figure 21A:
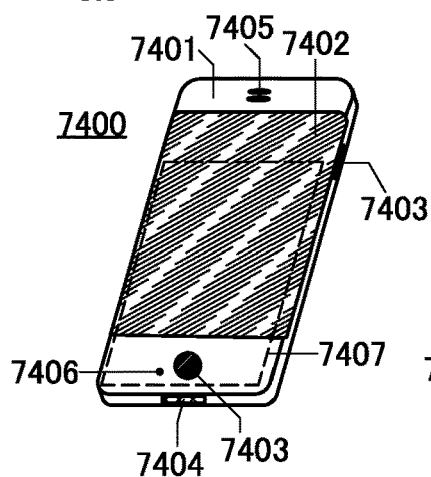
FIG. 21A is a diagram illustrating an example of an electronic device.

FIG. 21A shows an example of a mobile phone. A mobile phone 7400 includes operation buttons 7403, an external connection port 7404, a speaker 7405, a microphone 7406, and the like in addition to a display portion 7402 incorporated in a housing 7401. The mobile phone 7400 includes the power storage system of one embodiment of the present invention. The power storage system of one embodiment of the present invention includes a storage battery 7407 and the battery control circuit described in the above embodiment.

Figure 21B:
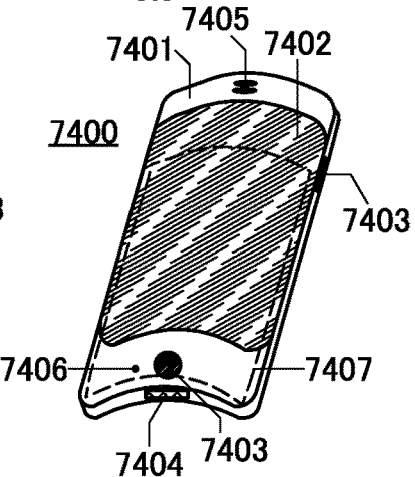
FIG. 21B is a diagram illustrating an example of an electronic device.
Figure 21C:
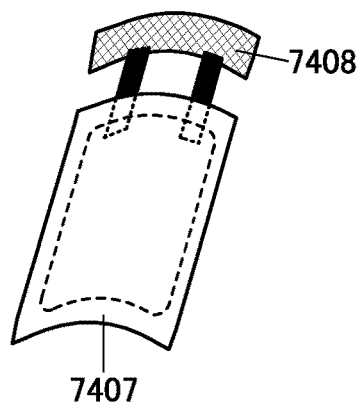
FIG. 21C is a diagram illustrating an example of a secondary battery.

FIG. 21B illustrates the state where the mobile phone 7400 is curved. When the mobile phone 7400 is entirely curved by external force, the storage battery 7407 provided therein may also be curved. In such a case, a storage battery having flexibility is preferably used as the storage battery 7407. FIG. 21C illustrates the state where the storage battery having flexibility is curved. A control circuit 7408 is electrically connected to the storage battery. The battery control circuit described in the above embodiment can be used as the control circuit 7408.

A storage battery having a flexible shape can also be incorporated along a curved inside/outside wall surface of a house or a building or a curved interior/exterior surface of an automobile.

Figure 21D:
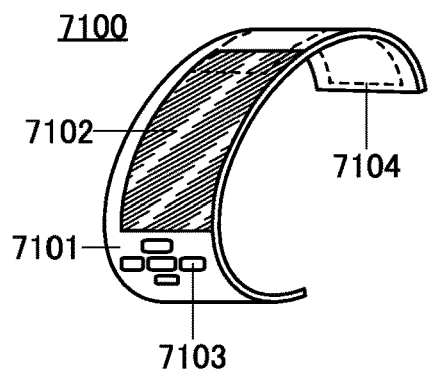
FIG. 21D is a diagram illustrating an example of an electronic device.

FIG. 21D shows an example of a bangle-type display device. A portable display device 7100 includes a housing 7101, a display portion 7102, operation buttons 7103, and the power storage system of one embodiment of the present invention. The power storage system of one embodiment of the present invention includes a storage battery 7104 and the battery control circuit described in the above embodiment.

Figure 21E:
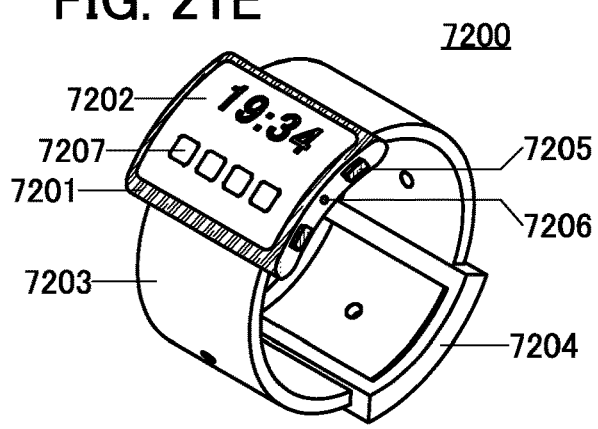
FIG. 21E is a diagram illustrating an example of a secondary battery.

FIG. 21E shows an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. The display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by the operating system incorporated in the portable information terminal 7200.

The portable information terminal 7200 can employ near field communication that is a communication method based on an existing communication standard. For example, mutual communication between the portable information terminal and a headset capable of wireless communication can be performed, and thus hands-free calling is possible.

The portable information terminal 7200 includes the input output terminal 7206, and data can be directly transmitted to and received from another information terminal via a connector. In addition, charge via the input output terminal 7206 is also possible. The charge operation may be performed by wireless power feeding without using the input output terminal 7206.

The portable information terminal 7200 includes the power storage system of one embodiment of the present invention. The power storage system includes a storage battery and the battery control circuit described in the above embodiment.

The portable information terminal 7200 preferably includes a sensor. As the sensor, for example, a human body sensor such as a fingerprint sensor, a pulse sensor, or a temperature sensor, a touch sensor, a pressure sensitive sensor, an acceleration sensor, or the like is preferably mounted.

Figure 21F:
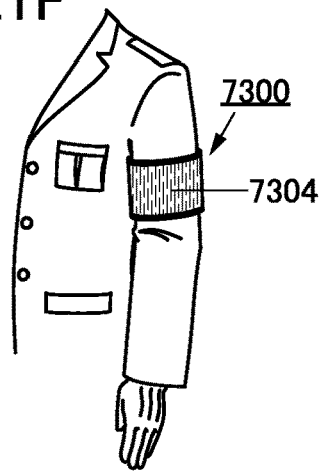
FIG. 21F is a diagram illustrating an example of an electronic device.

FIG. 21F shows an example of an armband display device. A display device 7300 includes a display portion 7304 and the secondary battery of one embodiment of the present invention. The display device 7300 can further include a touch sensor in the display portion 7304 and can also function as a portable information terminal.

The display surface of the display portion 7304 is curved, and display can be performed on the curved display surface. In addition, the display state of the display device 7300 can be changed by, for example, near field communication based on an existing communication standard.

The display device 7300 includes an input output terminal, and data can be directly transmitted to and received from another information terminal via a connector. In addition, charge via the input output terminal is also possible. The charge operation may be performed by wireless power feeding without using the input output terminal.

With the use of the secondary battery of one embodiment of the present invention as a secondary battery of a daily electronic device, a lightweight product with a long lifetime can be provided. Examples of the daily electronic device include an electric toothbrush, an electric shaver, and electric beauty equipment. As secondary batteries of these products, small and lightweight secondary batteries with stick-like shapes and high capacity are desired in consideration of handling ease for users.

Figure 21G:
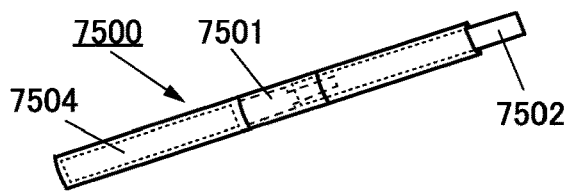
FIG. 21G is a diagram illustrating an example of an electronic device.

FIG. 21G is a perspective view of a device called a vaporizer (electronic cigarette). In FIG. 21G, an electronic cigarette 7500 includes an atomizer 7501 including a heating element, a secondary battery 7504 that supplies electric power to the atomizer, and a cartridge 7502 including a liquid supply bottle, a sensor, and the like. To increase safety, a protection circuit that prevents overcharge and overdischarge of the secondary battery 7504 may be electrically connected to the secondary battery 7504. The secondary battery 7504 illustrated in FIG. 21G includes an external terminal to be connected to a charger. When the electronic cigarette 7500 is held, the secondary battery 7504 is a tip portion; thus, it is desirable that the secondary battery 7504 have a short total length and be lightweight. Since the secondary battery of one embodiment of the present invention has high capacity and excellent cycle performance, the small and lightweight electronic cigarette 7500 that can be used for a long time over a long period can be provided.

Figure 22:
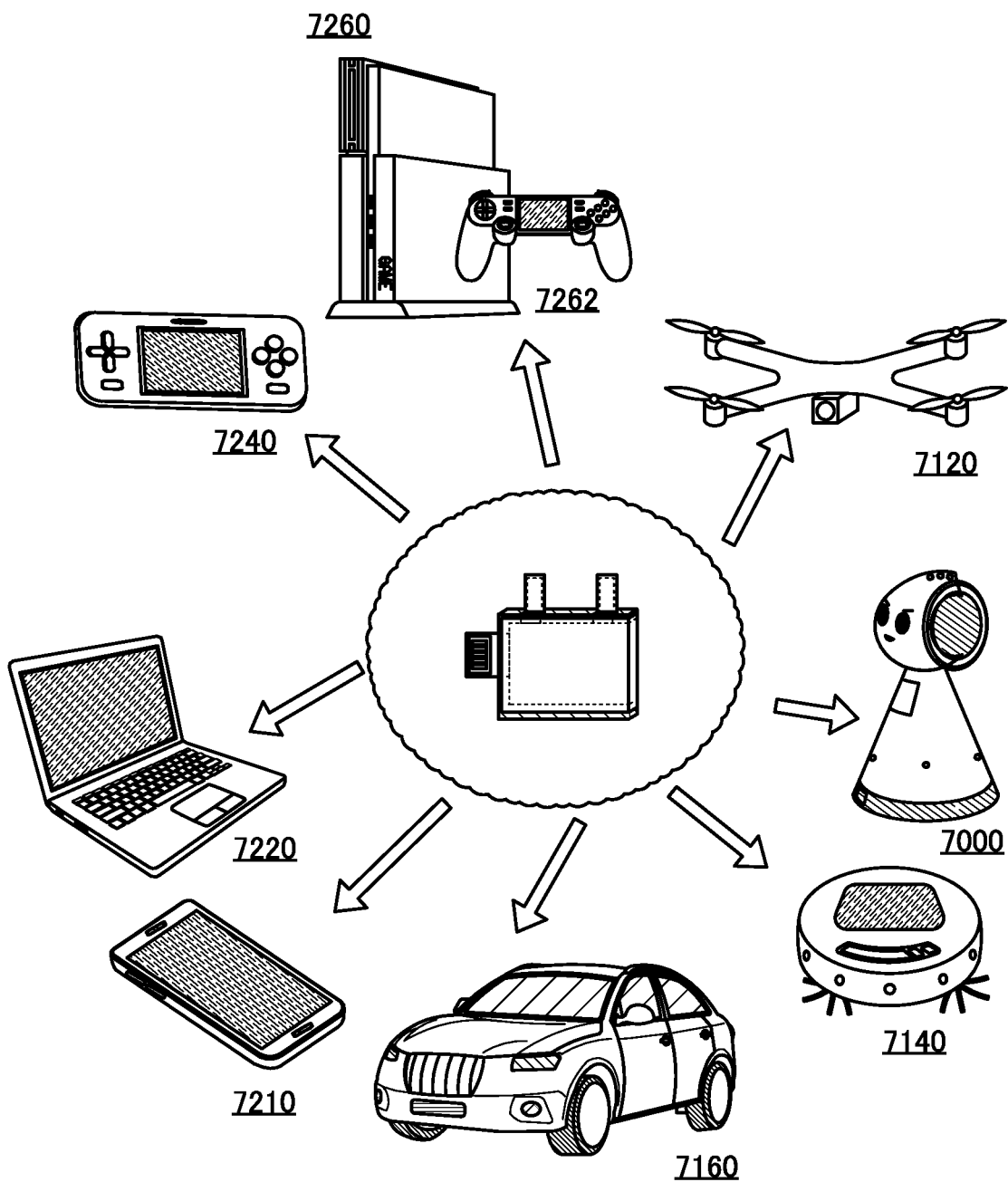
FIG. 22 is a diagram illustrating examples of electronic devices.

Next, examples of electronic devices each including the battery control circuit of one embodiment of the present invention will be described with reference to FIG. 22.

A robot 7000 includes a secondary battery, an illuminance sensor, a microphone, a camera, a speaker, a display, various kinds of sensors (e.g., an infrared ray sensor, an ultrasonic wave sensor, an acceleration sensor, a piezoelectric sensor, an optical sensor, and a gyro sensor), a moving mechanism, and the like. The power storage system including the battery control circuit of one embodiment of the present invention is used for the secondary battery of the robot 7000; thus, control, protection, and the like of the secondary battery are possible.

The microphone has a function of detecting acoustic signals of a speaking voice of a user, an environmental sound, and the like. The speaker has a function of outputting audio signals such as a voice and a warning beep. The robot 7000 can analyze an audio signal input via the microphone and can output a necessary audio signal from the speaker. The robot 7000 can communicate with the user with use of the microphone and the speaker.

The camera has a function of taking images of the surroundings of the robot 7000. The robot 7000 has a function of moving with use of the moving mechanism. The robot 7000 can take images of the surroundings with use of the camera and analyze the images to sense whether there is an obstacle in the way of the movement.

A flying object 7120 includes propellers, a camera, a secondary battery, and the like and has a function of flying autonomously.

The power storage system including the battery control circuit of one embodiment of the present invention is used for the secondary battery of the flying object 7120; thus, control, protection, and the like of the secondary battery as well as a reduction in weight are possible.

A cleaning robot 7140 includes a secondary battery, a display provided on the top surface, a plurality of cameras provided on the side surface, a brush, an operation button, various kinds of sensors, and the like. Although not illustrated, the cleaning robot 7140 is provided with a tire, an inlet, and the like. The cleaning robot 7140 can run autonomously, detect dust, and vacuum the dust through the inlet provided on the bottom surface. The use of the power storage system including the battery control circuit of one embodiment of the present invention, which is electrically connected to a secondary battery of the cleaning robot 7140, allows a reduction in the number of components and detection of an abnormality, such as a micro-short circuit, of the secondary battery.

An electric vehicle 7160 is shown as an example of a moving object. The electric vehicle 7160 includes a secondary battery, tires, a brake, a steering gear, a camera, and the like. The use of the power storage system including the battery control circuit of one embodiment of the present invention, which is electrically connected to the secondary battery of the electric vehicle 7160, allows a reduction in the number of components and detection of an abnormality, such as a micro-short circuit, of the secondary battery.

Note that although an electric vehicle is described above as an example of a moving object, the moving object is not limited to an electric vehicle. Examples of the moving object include a train, a monorail train, a ship, and a flying object (a helicopter, an unmanned aircraft (a drone), an airplane, and a rocket). The use of the power storage system including the battery control circuit of one embodiment of the present invention, which is electrically connected to secondary batteries of these moving objects, allows a reduction in the number of components and detection of an abnormality, such as a micro-short circuit, of the secondary batteries.

A secondary battery provided with the battery control circuit of one embodiment of the present invention can be incorporated in a smartphone 7210, a PC 7220 (personal computer), a game machine 7240, and the like.

The smartphone 7210 is an example of a portable information terminal. The smartphone 7210 includes a microphone, a camera, a speaker, various kinds of sensors, and a display portion. These peripheral devices are controlled with a charge control circuit. The use of the power storage system including the battery control circuit of one embodiment of the present invention, which is electrically connected to the secondary battery of the smartphone 7210, can reduce the number of components, control and protect the secondary battery, and increase the safety.

The PC 7220 is an example of a laptop PC. The use of the power storage system including the battery control circuit of one embodiment of the present invention, which is electrically connected to the secondary battery of the laptop PC, can reduce the number of components, control and protect the secondary battery, and increase the safety.

The game machine 7240 is an example of a portable game machine. A game machine 7260 is an example of a home-use stationary game machine. To the game machine 7260, a controller 7262 is connected with or without a wire. The use of the power storage system including the battery control circuit of one embodiment of the present invention in the controller 7262 can reduce the number of components, control and protect the secondary battery, and increase the safety.

Figure 23A:
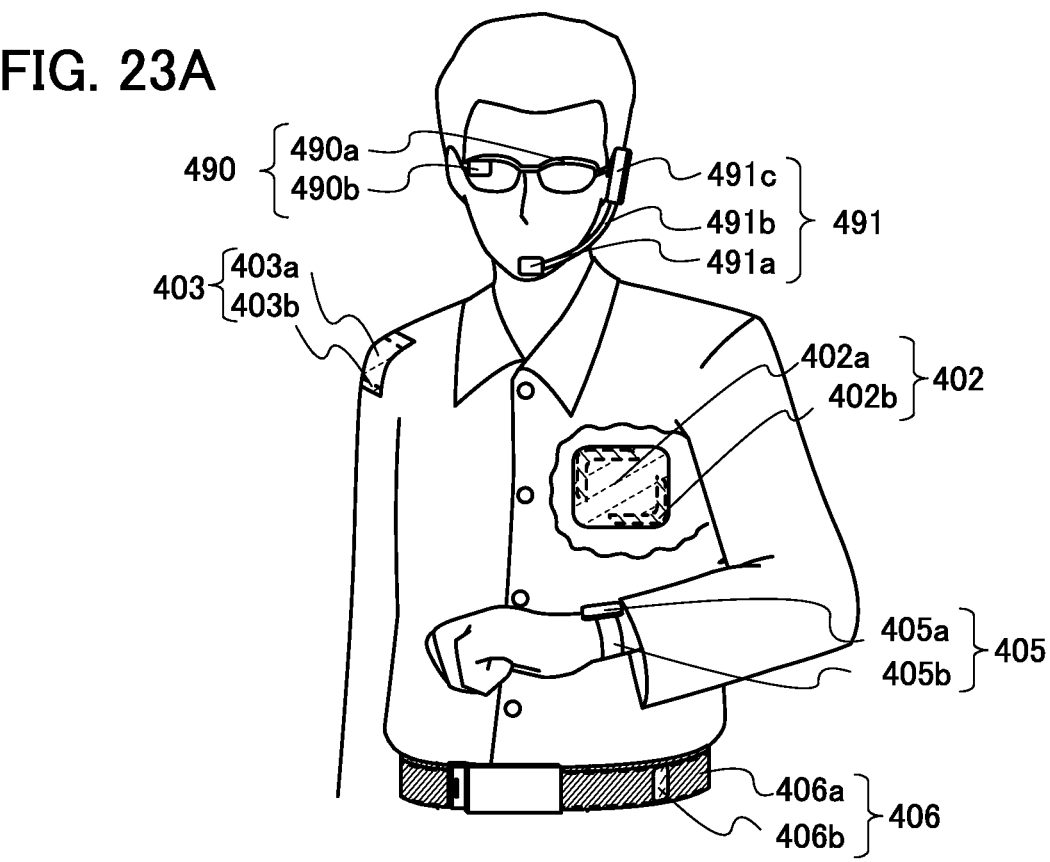
FIG. 23A is a diagram illustrating examples of electronic devices.

FIG. 23A shows examples of wearable devices. A secondary battery is used as a power source of a wearable device. To have improved water resistance in daily use or outdoor use by a user, a wearable device is desirably capable of being charged wirelessly as well as being charged with a wire whose connector portion for connection is exposed.

For example, a secondary battery can be incorporated in a glasses-type device 490 illustrated in FIG. 23A. The glasses-type device 490 includes a frame 490*a* and a display portion 490*b*. The secondary battery is provided in a temple of the frame 490*a* having a curved shape, whereby the glasses-type device 490 can be lightweight, have a well-balanced weight, and be used continuously for a long time.

Furthermore, a secondary battery can be incorporated in a headset-type device 491. The headset-type device 491 includes at least a microphone portion 491*a*, a flexible pipe 491*b*, and an earphone portion 491*c*. A secondary battery can be provided in the flexible pipe 491*b* or the earphone portion 491*c*.

A secondary battery can also be provided in a device 402 that can be directly attached to a human body. A secondary battery 402*b* can be provided in a thin housing 402*a* of the device 402.

A secondary battery can also be provided in a device 403 that can be attached to clothing. A secondary battery 403*b* can be provided in a thin housing 403*a* of the device 403.

A secondary battery can also be provided in a belt-type device 406. The belt-type device 406 includes a belt portion 406*a* and a wireless power feeding and receiving portion 406*b*, and the secondary battery can be included inside the belt portion 406*a*.

A secondary battery can also be provided in a watch-type device 405. The watch-type device 405 includes a display portion 405*a* and a belt portion 405*b*, and the secondary battery can be provided in the display portion 405*a* or the belt portion 405*b*.

The display portion 405*a* can display various kinds of information such as reception information of an e-mail or an incoming call in addition to the time.

Since the watch-type device 405 is a type of wearable device that is directly wrapped around an arm, a sensor that measures pulse, blood pressure, or the like of a user may be provided therein. Data on the exercise quantity and health of the user can be stored to be used for health maintenance.

The watch-type device 405 illustrated in FIG. 23A is described in detail below.

Figure 23B:
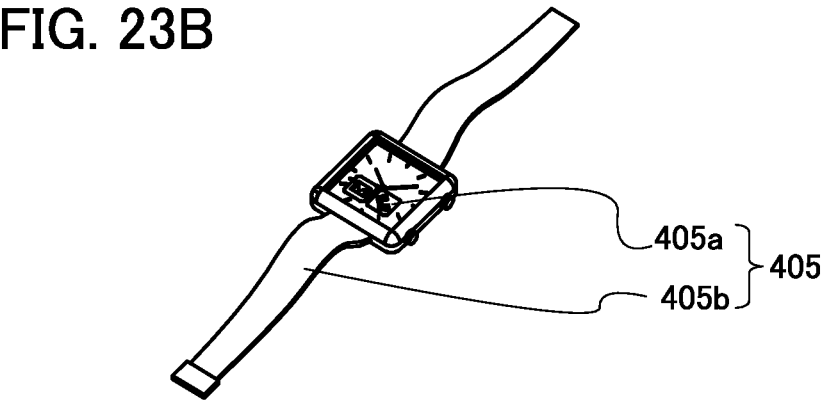
FIG. 23B is a diagram illustrating an example of an electronic device.

FIG. 23B shows a perspective view of the watch-type device 405 that is detached from an arm.

Figure 23C:
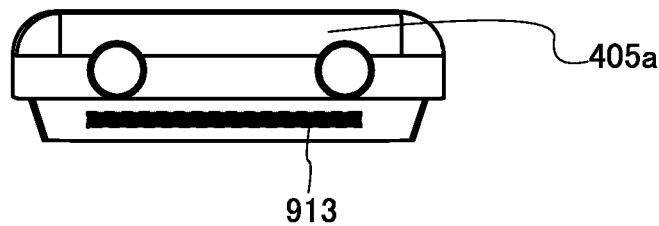
FIG. 23C is a diagram illustrating an example of an electronic device.

FIG. 23C shows a side view. FIG. 23C illustrates a state where the secondary battery 913 is incorporated in the watch-type device 405. The secondary battery 913 is provided to overlap with the display portion 405*a* and is small and lightweight.

The watch-type device 405 preferably includes therein a battery control circuit, which is electrically connected to the secondary battery 913.

This embodiment can be combined with any of the other embodiments as appropriate.

(Supplementary Notes on the Description in this Specification and the Like)

The description of the above embodiments and each structure in the embodiments are noted below.

One embodiment of the present invention can be constituted by combining, as appropriate, the structure described in each embodiment with the structures described in the other embodiments. In addition, in the case where a plurality of structure examples are described in one embodiment, the structure examples can be combined as appropriate.

Note that content (or may be part of the content) described in one embodiment can be applied to, combined with, or replaced with another content (or may be part of the content) described in the embodiment and/or content (or may be part of the content) described in another embodiment or other embodiments.

Note that in each embodiment, content described in the embodiment is content described using a variety of diagrams or content described with text disclosed in the specification.

Note that by combining a diagram (or may be part thereof) described in one embodiment with another part of the diagram, a different diagram (or may be part thereof) described in the embodiment, and/or a diagram (or may be part thereof) described in another embodiment or other embodiments, much more diagrams can be formed.

In addition, in this specification and the like, components are classified on the basis of the functions, and shown as blocks independent of one another in block diagrams. However, in an actual circuit or the like, it is difficult to separate components on the basis of the functions, and there are such a case where one circuit is associated with a plurality of functions and a case where a plurality of circuits are associated with one function. Therefore, blocks in the block diagrams are not limited by the components described in this specification, and the description can be changed appropriately depending on the situation.

Furthermore, in the drawings, the size, the layer thickness, or the region is shown with given magnitude for description convenience. Therefore, the size, the layer thickness, or the region is not necessarily limited to the illustrated scale. Note that the drawings are schematically shown for clarity, and embodiments of the present invention are not limited to shapes, values, or the like shown in the drawings. For example, variation in signal, voltage, or current due to noise, variation in signal, voltage, or current due to difference in timing, or the like can be included.

In this specification and the like, expressions "one of a source and a drain" (or a first electrode or a first terminal) and "the other of the source and the drain" (or a second electrode or a second terminal) are used in the description of the connection relationship of a transistor. This is because the source and the drain of the transistor change depending on the structure, operating conditions, or the like of the transistor. Note that the source or the drain of the transistor can also be referred to as a source (drain) terminal, a source (drain) electrode, or the like as appropriate depending on the situation.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

Furthermore, in this specification and the like, "voltage" and "potential" can be interchanged with each other as appropriate. The voltage refers to a potential difference from a reference potential, and when the reference potential is a ground voltage, for example, the voltage can be rephrased into the potential. The ground potential does not necessarily mean 0 V. Note that potentials are relative values, and a potential applied to a wiring or the like is sometimes changed depending on the reference potential.

Note that in this specification and the like, the terms such as "film" and "layer" can be interchanged with each other depending on the case or according to circumstances. For example, the term "conductive layer" can be changed into the term "conductive film" in some cases. As another example, the term "insulating film" can be changed into the term "insulating layer" in some cases.

In this specification and the like, a switch has a function of controlling whether current flows or not by being in a conduction state (an on state) or a non-conduction state (an off state). Alternatively, a switch has a function of selecting and changing a current path.

In this specification and the like, channel length refers to, for example, the distance between a source and a drain in a region where a semiconductor (or a portion where current flows in a semiconductor when a transistor is in an on state) and a gate overlap with each other or a region where a channel is formed in a top view of the transistor.

In this specification and the like, channel width refers to, for example, the length of a portion where a source and a drain face each other in a region where a semiconductor (or a portion where current flows in a semiconductor when a transistor is in an on state) and a gate electrode overlap with each other or a region where a channel is formed.

In this specification and the like, the expression "A and B are connected" includes the case where A and B are electrically connected as well as the case where A and B are directly connected. Here, the expression "A and B are electrically connected" includes the case where electric signals can be transmitted and received between A and B when an object having any electric action exists between A and B.

Example 1

In this example, a method for fabricating secondary batteries of embodiments of the present invention and performance of the fabricated secondary batteries will be described.

[Formation of Positive Electrode Active Material]

A positive electrode active material was formed.

First, a first mixture containing magnesium and fluorine was formed. LiF and $MgF_2$ were weighted so that the molar ratio of LiF to $MgF_2$ was $LiF:MgF_2=1:3$, acetone was added as a solvent, and the materials were mixed and ground by a wet process. The mixing and the grinding were performed in a ball mill using a zirconia ball at 400 rpm for 12 hours. The materials after the treatments were collected to be the first mixture.

Next, lithium cobalt oxide was prepared as a composite oxide containing lithium and cobalt. Specifically, CELLSEED C-TON manufactured by NIPPON CHEMICAL INDUSTRIAL CO., LTD. was prepared.

Next, weighting was performed so that the atomic weight of magnesium contained in the first mixture was 0.5 atomic % with respect to the molecular weight of lithium cobaltate, and mixing was performed by a dry process. The mixing was performed in a ball mill using a zirconia ball at 150 rpm for 1 hour. The materials after the treatments were collected to be a second mixture.

Next, the second mixture was put in an alumina crucible and annealed at 850° C. using a muffle furnace in an oxygen atmosphere for 60 hours. At the time of the annealing, the alumina crucible was covered with a lid. The flow rate of oxygen was 10 L/min. The temperature rise was 200° C./hr, and it took longer than or equal to 10 hours to lower the temperature. The material after the heat treatment was the positive electrode active material.

[Formation of Positive Electrode]

Next, positive electrodes were formed using the positive electrode active material formed in the above manner. The positive electrode active material formed in the above manner, acetylene black (AB), and polyvinylidene fluoride (PVDF) were mixed at the positive electrode active material: AB:PVDF=95:3:2 (weight ratio) using NMP as a solvent, whereby slurry was formed. After a current collector was coated with the formed slurry, the solvent was volatilized. After that, at 120° C., a pressure of 179 kN/m was applied and then a pressure of 1249 kN/m was further applied, and a positive electrode active material layer was formed on the current collector; thus, each positive electrode P1 was formed. In the positive electrodes P1, the loaded amount of the positive electrode active material was varied between battery cells to be used. Aluminum foil having a thickness of 20 m was used as the current collector. The positive electrode active material layer was provided on one surface of the current collector.

[Formation of Negative Electrode]

Negative electrodes were formed using graphite as a negative electrode active material.

The negative electrodes were formed using two kinds of graphite. Spherical natural graphite having a specific surface area of 6.3 $m^2/g$ and an average particle size of 15 m was used as the first kind and mixed with CMC-Na and SBR at the graphite: CMC-Na:SBR=97:1.5:1.5 (weight ratio) using water as a solvent, whereby slurry was formed. MCMB graphite having a specific surface area of 1.5 $m^2/g$ was used as the second kind and mixed with a conductive additive, CMC-Na, and SBR at the graphite: the conductive additive: CMC-Na:SBR=96:1:1:2 (weight ratio) using water as a solvent, whereby slurry was formed.

The polymerization degree of CMC-Na that was used was 600 to 800, and the viscosity of a 1 weight % CMC-Na aqueous solution was in the range from 300 mPa-s to 500 mPa-s. As the conductive additive, vapor grown carbon fiber (VGCF) (registered trademark)-H (manufactured by SHOWA DENKO K.K., the fiber diameter: 150 nm, the specific surface area: 13 m²/g) was used.

Current collectors were coated with the corresponding formed slurry and then drying was performed, and negative electrode active material layers were formed on the current collectors. As the current collector, copper foil having a thickness of 18 m was used. The negative electrode active material layers were provided on both surfaces of the current collector.

The negative electrode using the first kind of graphite is a negative electrode N1 and the negative electrode using the second kind of graphite is a negative electrode N2. In the negative electrodes N1 and the negative electrodes N2, the loaded amount of the negative electrode active material was varied between battery cells to be used.

[Fabrication of Secondary Batteries]

With use of the positive electrodes and the negative electrodes formed in the above manner, the secondary batteries using films as exterior bodies were fabricated.

Cellulose having a thickness of 50 m was used as a separator.

The positive electrode, the separator, the negative electrode, the separator, and the positive electrode were stacked in this order. The two positive electrodes were arranged so that the positive electrode active material provided on the one surface of the current collector faces the negative electrode active material with the separator sandwiched therebetween.

Leads were bonded to the positive electrode and the negative electrode.

A stack in which the positive electrodes, the negative electrode, and the separators are stacked was sandwiched between facing portions of the exterior body that is folded in half, and the stack was placed so that one ends of the leads extend outside the exterior body. Next, one side of the exterior body was left as an aperture, and the other sides were sealed.

As a film to be the exterior body, a film in which a polypropylene layer, an acid modified polypropylene layer, an aluminum layer, and a nylon layer are stacked in this order was used. The thickness of the film was approximately 110 m. The film to be the exterior body was bent so that the nylon layer is placed as the surface of the exterior body placed on the outer side and the polypropylene layer is placed as the surface of the exterior body placed on the inner side. The thickness of the aluminum layer was approximately 40 m, the thickness of the nylon layer was approximately 25 m, and the total thickness of the polypropylene layer and the acid modified polypropylene layer was approximately 45 m.

Next, in an argon gas atmosphere, an electrolyte solution was introduced from the one side left as an aperture.

Five kinds of electrolyte solutions (electrolyte solutions Sol_1, Sol_2, Sol_3, Sol_4, and Sol_5) were formed in total as electrolyte solutions and the electrolyte solutions were selectively used in the secondary batteries.

The electrolyte solution Sol_1 and the electrolyte solution Sol_2 are described. As a solvent, EMI-FSA represented by Structural Formula (G11) was used. In the electrolyte solution Sol_1, LiFSA (lithium bis(fluorosulfonyl)amide) was used as an electrolyte, and the concentration of the electrolyte in the electrolyte solution was 2.15 mol/L. In the electrolyte solution Sol_2, LiTFSA (lithium bis(trifluoromethanesulfonyl)amide) was used as an electrolyte, and the concentration of the electrolyte in the electrolyte solution was 1.50 mol/L.

[Chemical Formulae 30]

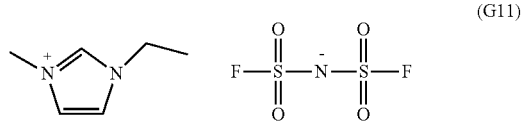

(G11)

The electrolyte solution Sol_3 is described. As a solvent, BMI-FSA represented by Structural Formula (G12) was used. As an electrolyte, LiFSA (lithium bis(fluorosulfonyl)amide) was used. The concentration of the electrolyte in the electrolyte solution was 1.93 mol/L.

[Chemical Formula 31]

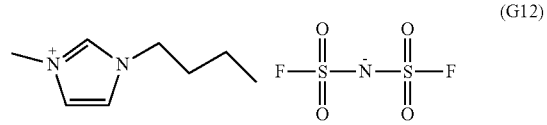

(G12)

The electrolyte solution Sol_4 is described. As a solvent, P13-FSA represented by Structural Formula (G13) was used. As an electrolyte, LiFSA (lithium bis(fluorosulfonyl)amide) was used. The concentration of the electrolyte in the electrolyte solution was 1.80 mol/L.

[Chemical Formula 32]

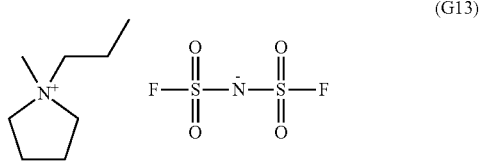

(G13)

The electrolyte solution Sol_5 is described. As a solvent, a solution in which ethylene carbonate (EC) and diethyl carbonate (DEC) were mixed at EC:DEC=3:7 (volume ratio) was used. As an electrolyte, lithium hexafluorophosphate (LiPF$_6$) was used. The concentration of the electrolyte in the electrolyte solution was 1.00 mol/L.

Table 1 lists the solvents and the electrolytes used for the electrolyte solutions.

TABLE 1

| | Solvent | Electrolyte |
|---|---|---|
| Sol_1 | EMI-FSA | LiFSA |
| Sol_2 | EMI-FSA | LiTFSA |
| Sol_3 | BMI-FSA | LiFSA |
| Sol_4 | P13-FSA | LiFSA |
| Sol_5 | EC + DEC + VC | LiPF$_6$ |

Then, the one side of the exterior body left as an aperture was sealed in a reduced-pressure atmosphere.

Through the above steps, the secondary batteries were fabricated.

[Aging]

Next, the secondary batteries were subjected to aging.

First, the secondary battery was sandwiched between two plates and CC charge (0.01 C, a capacity of 15 mAh/g) was performed. After that, the two plates were removed, the one side of the exterior body was cut open in an argon atmosphere, degassing was performed, and then sealing was performed again. Here, CC denotes constant current. Here, the capacity of the secondary battery per weight of the positive electrode active material was calculated. The C rate was calculated by setting 1 C in accordance with the conditions for charge and discharge cycles. The C rate was calculated by setting 1 C to 190 mAh/g, 210 mAh/g, and 220 mAh/g at a charge voltage of 4.4 V, 4.45 V, and 4.5 V, respectively, in evaluation of the cycle performance.

Next, the secondary battery was sandwiched between two plates and CC charge (0.1 C, a capacity of 120 mAh/g) was performed. After that, the two plates were removed, the secondary battery was held for 24 hours at 0° C., the one side of the exterior body was cut open in an argon atmosphere, degassing was performed, and then sealing was performed again.

[Evaluation of Charge and Discharge Performance]

Then, the secondary battery was sandwiched between two plates, CCCV charge (0.1 C, a termination current of 0.01 C) was performed, and CC discharge (0.2 C, 2.5 V) was performed. Charge voltage was set in accordance with charge voltage in evaluation of cycle performance. Here, CV denotes constant voltage.

After that, CCCV charge (0.2 C, a termination current of 0.01 C) and CC discharge (0.2 C, 2.5 V) were repeated three times. Charge voltage was set in accordance with charge voltage in evaluation of cycle performance.

[Evaluation 1 of Cycle Performance]

Then, cycle performance of the secondary batteries was evaluated at 25° C.

As battery cells, cells Cel_1 to Cel_7 listed in Table 2 were fabricated. Table 2 lists combinations of the positive electrode, the negative electrodes, and the electrolyte solutions that were used and charge voltages.

TABLE 2

|  | Positive Electrode | Negative Electrode | Electrolyte Solution | Charge Voltage |
|---|---|---|---|---|
| Cel_1 | P1 | N1 | Sol_1 | 4.5 V |
| Cel_2 |  |  | Sol_3 |  |
| Cel_3 |  |  | Sol_4 |  |
| Cel_4 |  |  | Sol_5 |  |
| Cel_5 | P1 | N2 | Sol_1 | 4.4 V |
| Cel_6 |  |  |  | 4.45 V |
| Cel_7 |  |  |  | 4.5 V |

When the charge voltage was 4.4 V at the C rate or the capacity ratio described later, the capacity of the positive electrode was 190 mAh/g. When the charge voltage was 4.45 V, the capacity of the positive electrode was 210 mAh/g. When the charge voltage was 4.5 V, the capacity of the positive electrode was 220 mAh/g.

The loaded amount of the positive electrode active material of the positive electrode P1 was approximately 6.5 mg/cm$^2$ in the cells Cel_1 to Cel_4 and approximately 11 mg/cm$^2$ in the cells Cel_5 to Cel_7.

The area of the positive electrode active material layer of the positive electrode P1 was 8.194 cm$^2$.

The loaded amount of the negative electrode active material of the negative electrode N1 or the negative electrode N2 in each battery cell was adjusted so that the capacity ratio becomes approximately higher than or equal to 77% and lower than or equal to 83%. Here, the capacity ratio denotes a value representing the capacity of the positive electrode with respect to the capacity of the negative electrode by percentage. In calculation of the capacity ratio, the capacity of the negative electrode was 330 mAh/g using the weight of the negative electrode active material as a reference. Note that the loaded amount of the negative electrode active material was calculated by halving the total loaded amount of the negative electrode active material layers provided on the both surfaces of the current collector.

Then, CCCV charge (0.2 C, a termination current of 0.02 C) was performed, and CC discharge (0.2 C, 2.5 V) was performed. The capacity of the secondary battery was calculated using the weight of the positive electrode active material as a reference.

Figure 24A:
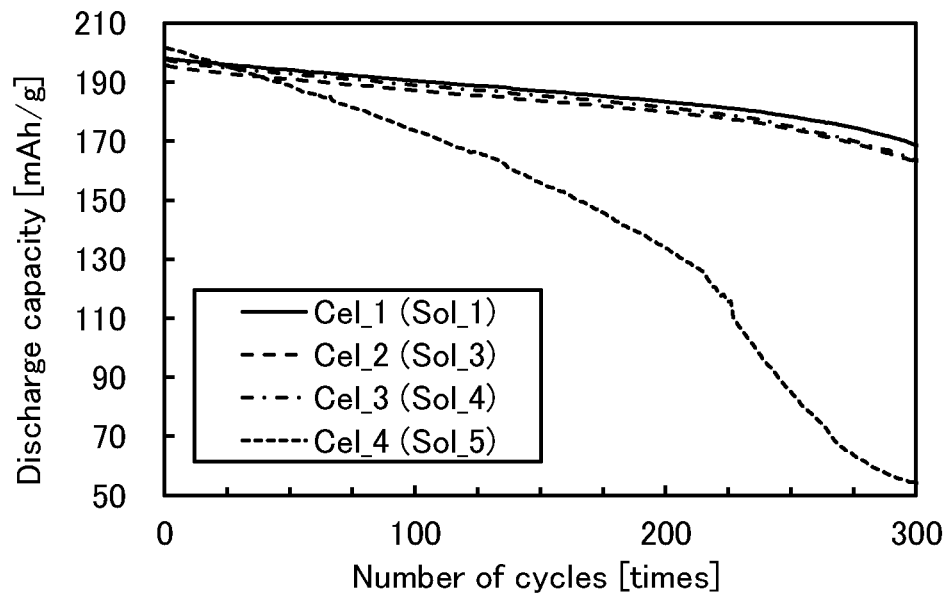
FIG. 24A is a diagram showing cycle performance of secondary batteries.
Figure 24B:
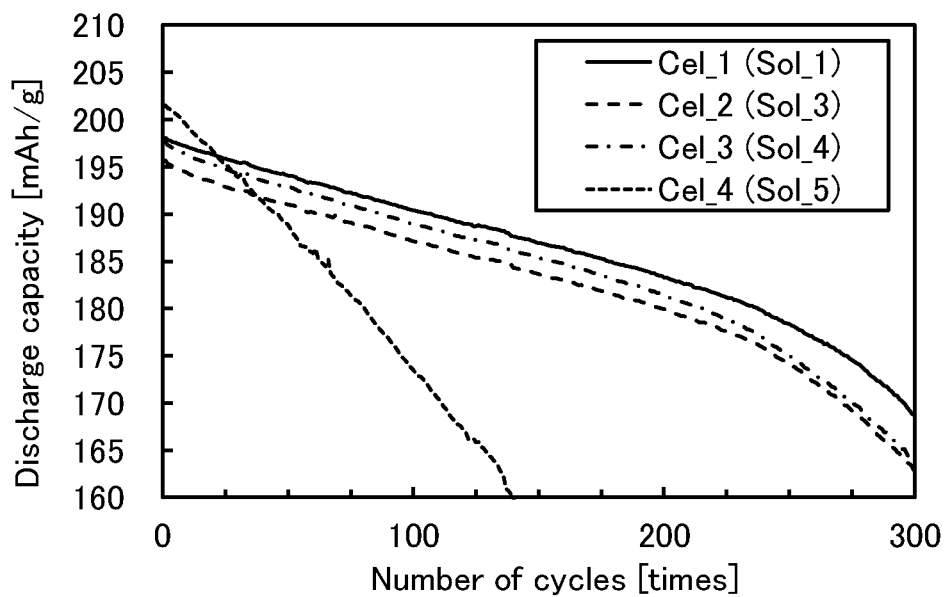
FIG. 24B is a diagram showing cycle performance of the secondary batteries.
Figure 25:
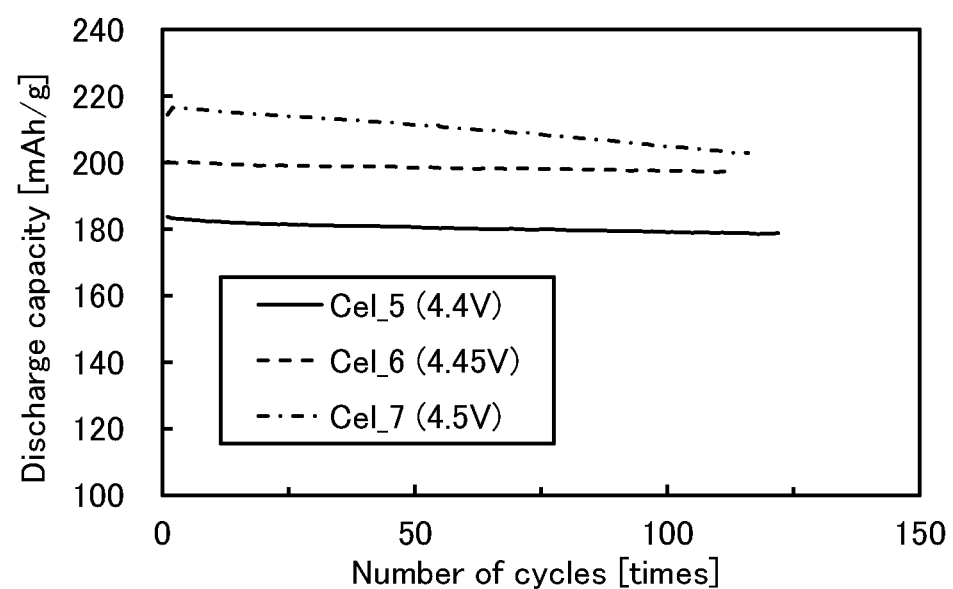
FIG. 25 is a diagram showing cycle performance of secondary batteries.
Figure 26A:
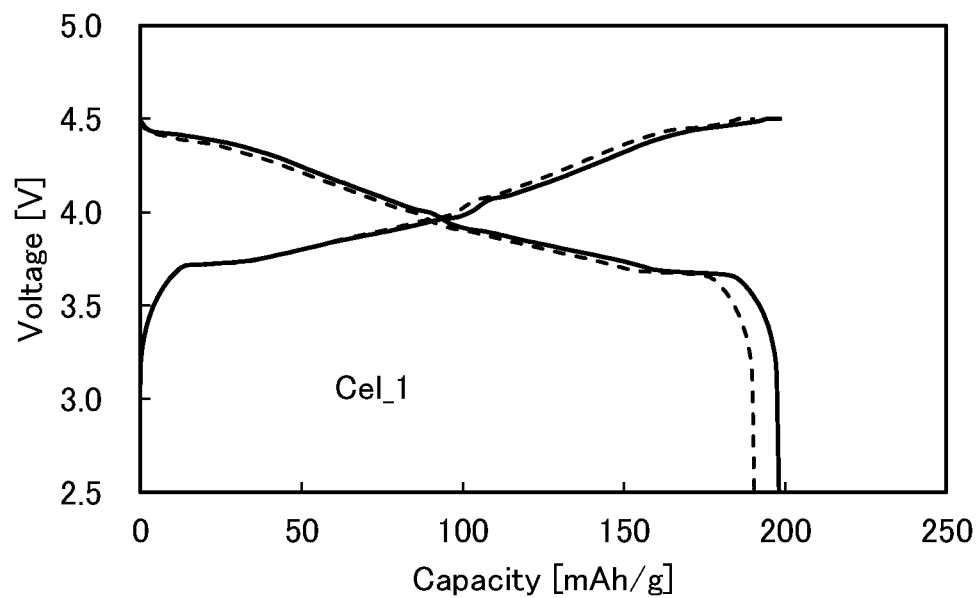
FIG. 26A is a diagram showing charge and discharge curves of the secondary battery.
Figure 26B:
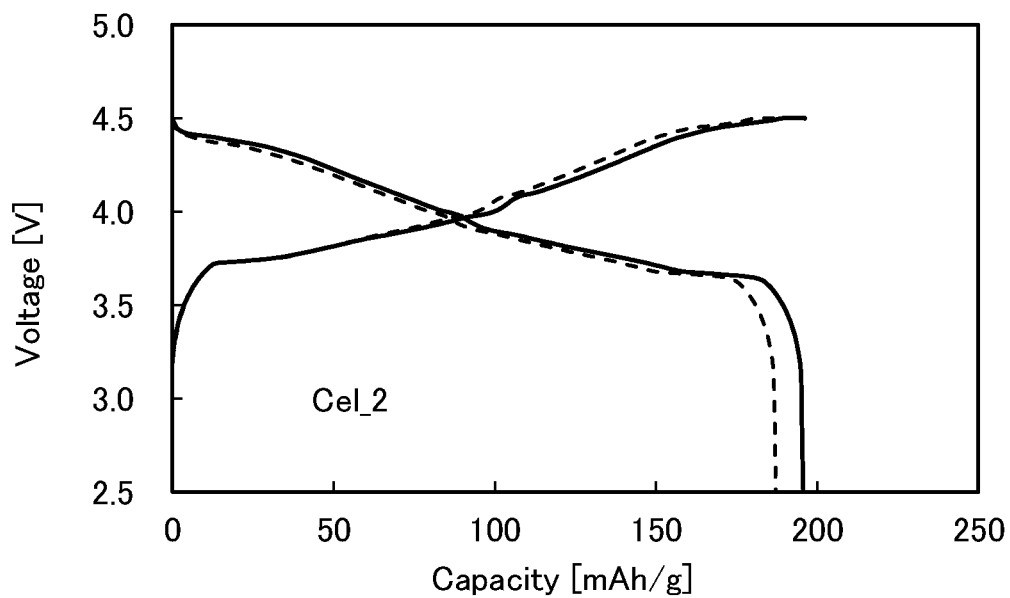
FIG. 26B is a diagram showing charge and discharge curves of the secondary battery.
Figure 27A:
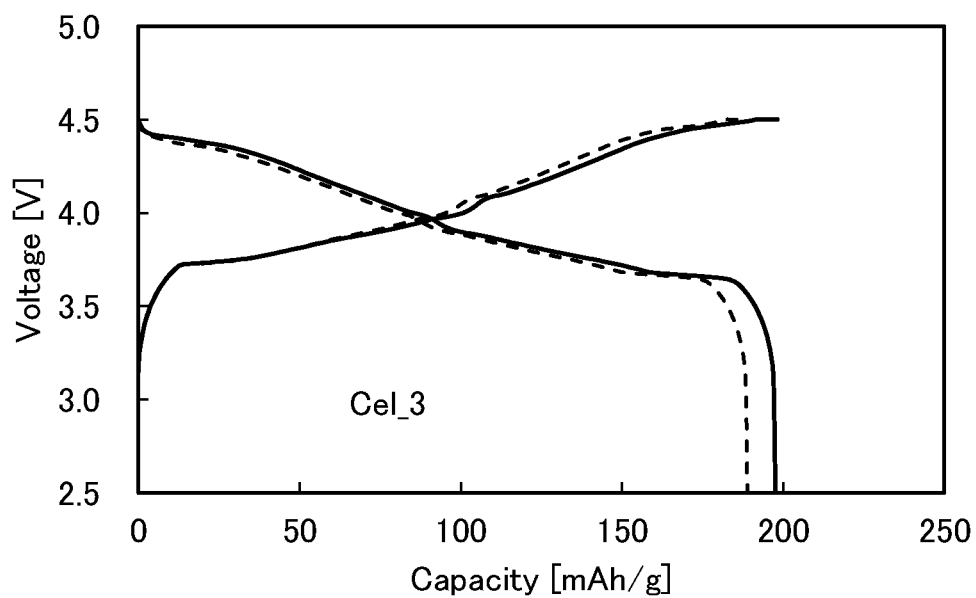
FIG. 27A is a diagram showing charge and discharge curves of the secondary battery.
Figure 27B:
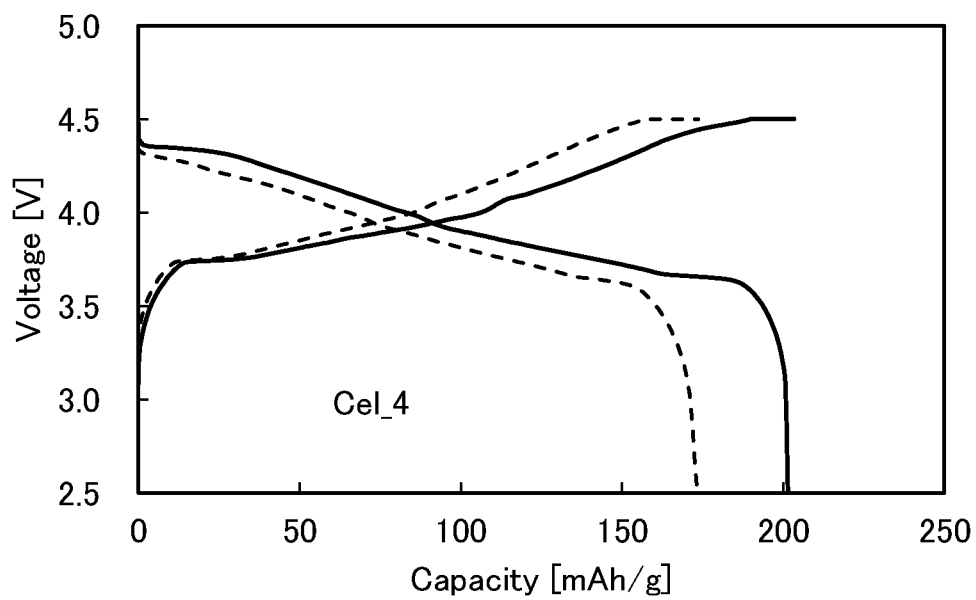
FIG. 27B is a diagram showing charge and discharge curves of the secondary battery.

The measurement results of the cycle performance at 25° C. are shown in FIG. 24A, FIG. 24B, and FIG. 25.

FIG. 24A shows the results of the cycle performance of the cells Cel_1 to Cel_4, and the horizontal axis represents the number of cycles whereas the vertical axis represents discharge capacity. FIG. 24B shows a diagram in which the vertical axis in FIG. 24A is enlarged.

FIG. 25 shows the results of the cycle performance of the cells Cel_5 to Cel_7

Moreover, charge and discharge curves of the cells Cel_1 to Cel_4 are shown in FIG. 26A, FIG. 26B, FIG. 27A, and FIG. 27B, respectively. The solid line indicates the curve at the first cycle and the dotted line indicates the curve at the hundredth cycle. In each of the charge and discharge curves, the vertical axis represents charge or discharge voltage and the horizontal axis represents capacity.

According to FIG. 26A, FIG. 26B, FIG. 27A, and FIG. 27B, even when the charge voltage was 4.5 V, which was extremely high, favorable charge and discharge curves were obtained in all of the cells Cel_1 to Cel_4 at the first cycle. This suggests that the positive electrode active material of one embodiment of the present invention has a highly stable crystal structure also at a high charge voltage.

Moreover, according to FIG. 24A and FIG. 24B, each of the cells Cel_1, Cel_2, and Cel_3 containing an ionic liquid in the electrolyte solution retained a capacity value that is higher than or equal to 80% of the initial discharge capacity after 300 cycles, and was found to exhibit extremely excellent performance.

Moreover, it was found from FIG. 25 that, in the cells in which the loaded amount of each of the positive electrode active material and the negative electrode active material was increased and the kind of graphite was changed, excellent cycle performance was achieved even when the charge voltage was increased to 4.5 V.

As described above, it was found that when the secondary battery of one embodiment of the present invention uses an excellent positive electrode active material and uses an ionic liquid in an electrolyte solution, significantly excellent performance is obtained.

[Evaluation 2 of Cycle Performance]

Then, cycle performance of the secondary batteries was evaluated at 45° C.

As battery cells, cells Cel_11 to Cel_23 listed in Table 3 were fabricated. Table 3 lists combinations of the positive electrode, the negative electrodes, and the electrolyte solutions that were used and charge voltages.

TABLE 3

|  | Positive Electrode | Negative Electrode | Electrolyte Solution | Charge Voltage |
|---|---|---|---|---|
| Cel_11 | P1 | N1 | Sol_1 | 4.4 V |
| Cel_12 |  |  | Sol_3 |  |

TABLE 3-continued

| | Positive Electrode | Negative Electrode | Electrolyte Solution | Charge Voltage |
|---|---|---|---|---|
| Cel_13 | | | Sol_5 | |
| Cel_14 | P1 | N1 | Sol_1 | 4.45 V |
| Cel_15 | | | Sol_3 | |
| Cel_16 | | | Sol_5 | |
| Cel_17 | P1 | N1 | Sol_1 | 4.5 V |
| Cel_18 | | | Sol_3 | |
| Cel_19 | | | Sol_4 | |
| Cel_20 | | | Sol_5 | |
| Cel_21 | P1 | N2 | Sol_2 | 4.4 V |
| Cel_22 | | | | 4.45 V |
| Cel_23 | | | | 4.5 V |

The loaded amount of the positive electrode active material of the positive electrode P1 was approximately 6.5 mg/cm² in the cells Cel_11 to Cel_20 and approximately 11 mg/cm² in the cells Cel_21 to Cel_23.

The area of the positive electrode active material layer of the positive electrode P1 was 8.194 cm².

The loaded amount of the negative electrode active material of the negative electrode N1 or the negative electrode N2 in each battery cell was adjusted so that the capacity ratio becomes approximately higher than or equal to 77% and lower than or equal to 83%.

Then, CCCV charge (0.2 C, a termination current of 0.02 C) was performed, and CC discharge (0.2 C, 2.5 V) was performed. The capacity of the secondary battery was calculated using the weight of the positive electrode active material as a reference.

The cycle performance of the cell Cel_11 to the cell Cel_13, the cycle performance of the cell Cel_14 to the cell Cel_16, the cycle performance of the cell Cel_17 to the cell Cel_20, and the cycle performance of the cell Cel_21 to the cell Cel_23 at 45° C. are shown in FIG. 28A, FIG. 28B, FIG. 29A, and FIG. 29B, respectively.

Figure 28A:
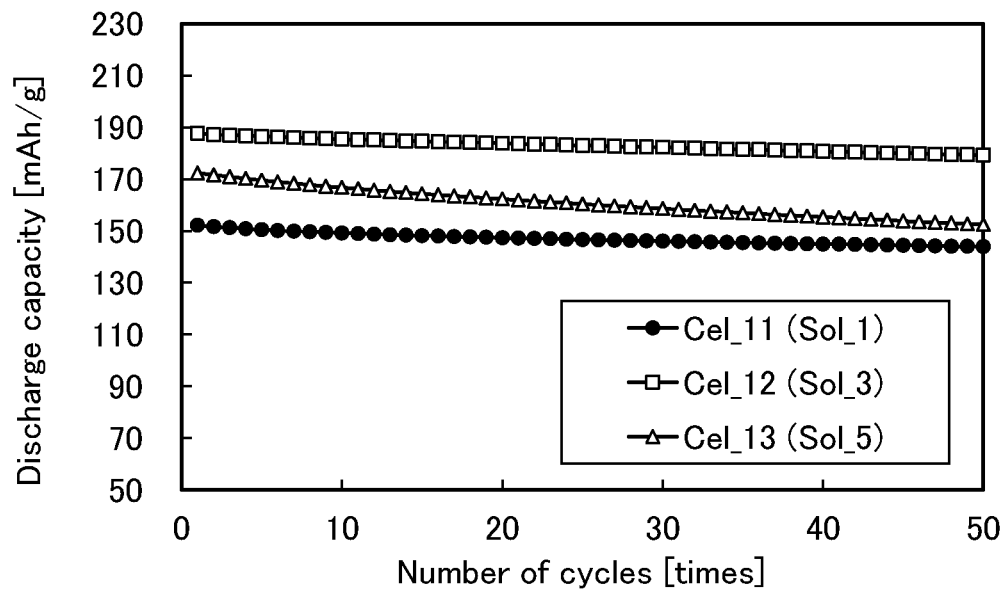
FIG. 28A is a diagram showing charge and discharge curves of secondary batteries.
Figure 28B:
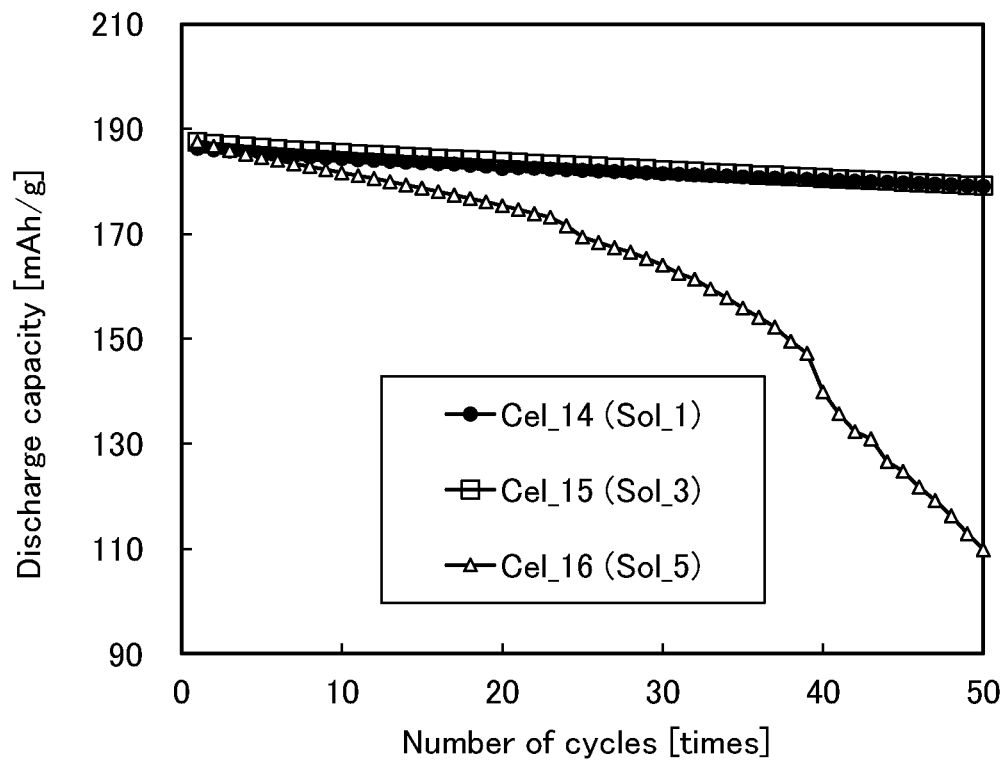
FIG. 28B is a diagram showing charge and discharge curves of secondary batteries.

FIG. 28A and FIG. 28B show the results that a decrease in discharge capacity of the cells using ionic liquids in the electrolyte solutions was extremely small even at a charge voltage of 4.45 V. In contrast, a decrease in discharge capacity of the cell using an organic electrolyte solution started to be observed at a charge voltage of 4.45 V.

Figure 29A:
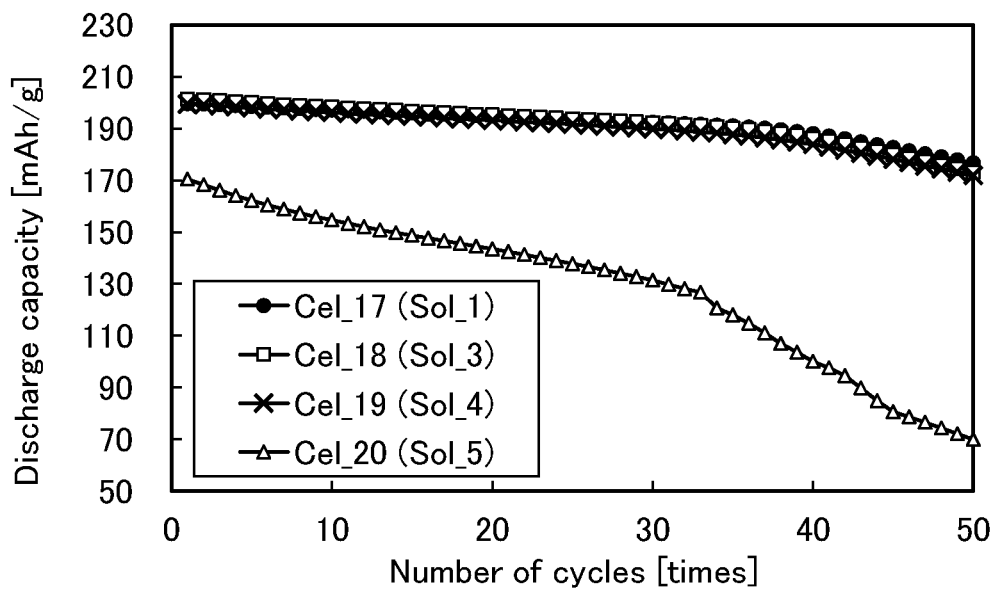
FIG. 29A is a diagram showing charge and discharge curves of secondary batteries.

According to FIG. 29A, when the charge voltage was 4.5 V, a gradual decrease in discharge capacity was observed also in the cells using ionic liquids in the electrolyte solutions. Meanwhile, according to FIG. 24A and FIG. 24B, favorable performance was achieved at 25° C. even when the charge voltage was 4.5 V. Therefore, it was suggested that by controlling charge voltage in accordance with the temperature range where the secondary battery is used, a decrease in discharge capacity due to the use of the secondary battery can be suppressed and the secondary battery can have a long lifetime.

Figure 29B:
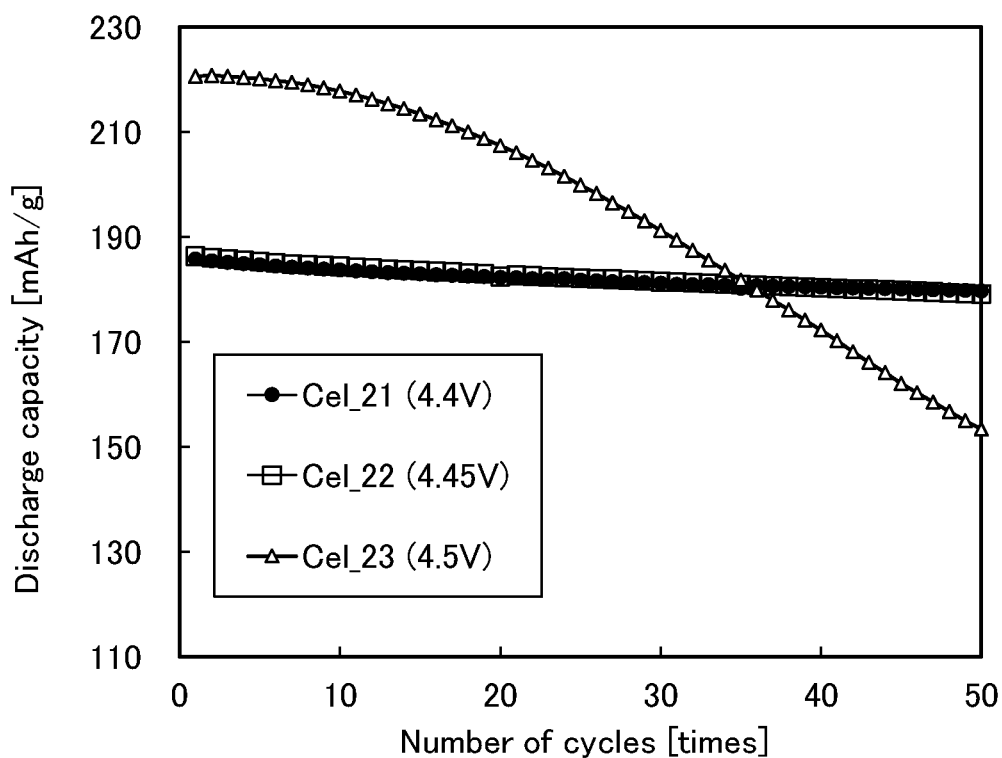
FIG. 29B is a diagram showing charge and discharge curves of secondary batteries.

It was also found from FIG. 29B that, even in the cells in which the loaded amount of each of the positive electrode active material and the negative electrode active material was increased and the kind of graphite was changed, excellent cycle performance was achieved at a charge voltage of 4.45 V.

[Evaluation of Rate Performance]

Then, rate performance was evaluated at 10° C.

As battery cells, cells Cel_31 to Cel_33 listed in Table 4 were fabricated. Table 4 lists combinations of the positive electrode, the negative electrode, and the electrolyte solutions that were used and charge voltage.

TABLE 4

| | Positive Electrode | Negative Electrode | Electrolyte Solution | Charge Voltage |
|---|---|---|---|---|
| Cel_31 | P1 | N1 | Sol_1 | 4.5 V |
| Cel_32 | | | Sol_3 | |
| Cel_33 | | | Sol_5 | |

The loaded amount of the positive electrode active material of the positive electrode P1 was approximately 6.5 mg/cm². The loaded amount of the negative electrode active material of the negative electrode N1 was adjusted so that the capacity ratio becomes approximately higher than or equal to 84% and lower than or equal to 87%.

In the positive electrode, the area of the positive electrode active material layer formed on the current collector was 8.194 cm².

Then, CCCV charge (0.2 C, a termination current of 0.02 C) was performed, and CC discharge (2.5 V) was performed. The discharge was performed at a discharge rate of 0.1, 0.2, 0.5, and 1 [C] in this order. The capacity of the secondary battery was calculated using the weight of the positive electrode active material as a reference.

Figure 30A:
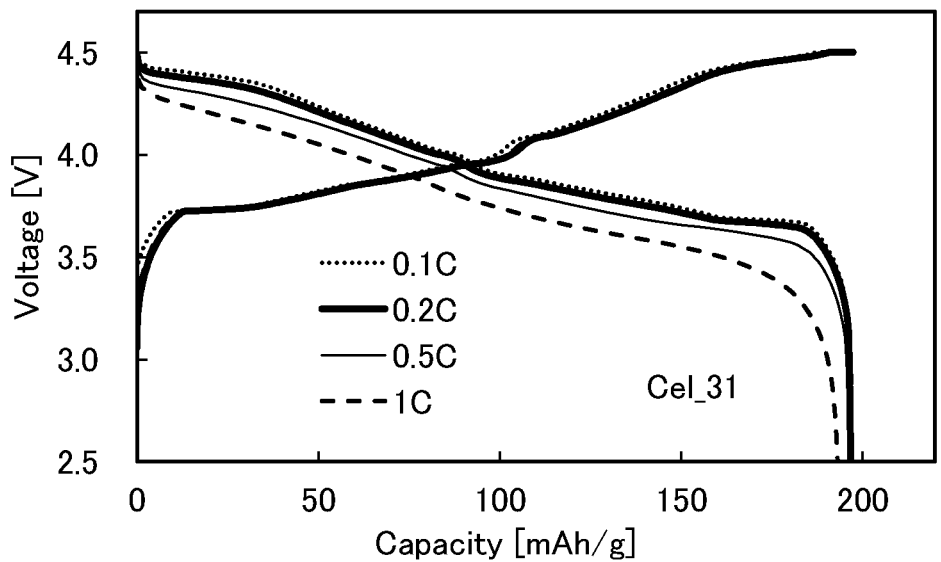
FIG. 30A is a diagram showing charge and discharge curves of a secondary battery.
Figure 30B:
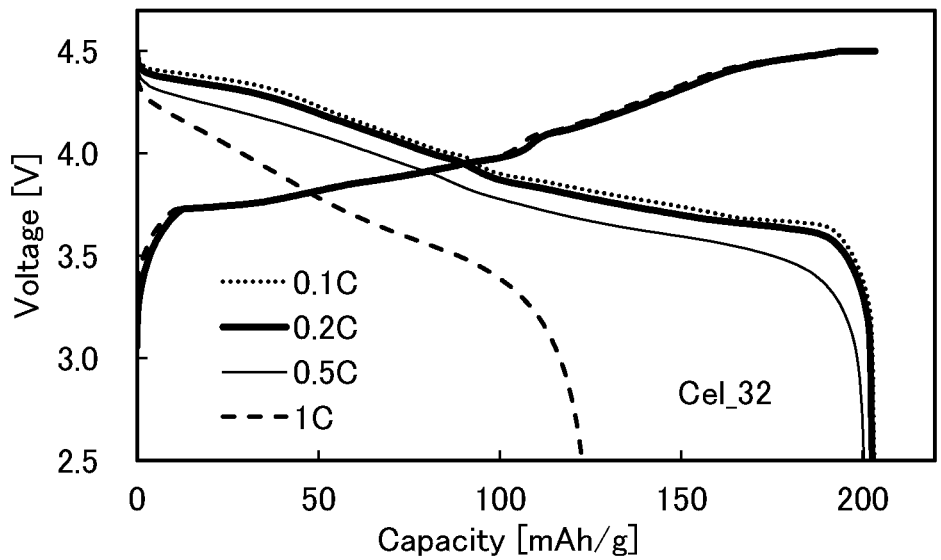
FIG. 30B is a diagram showing charge and discharge curves of a secondary battery.
Figure 31:
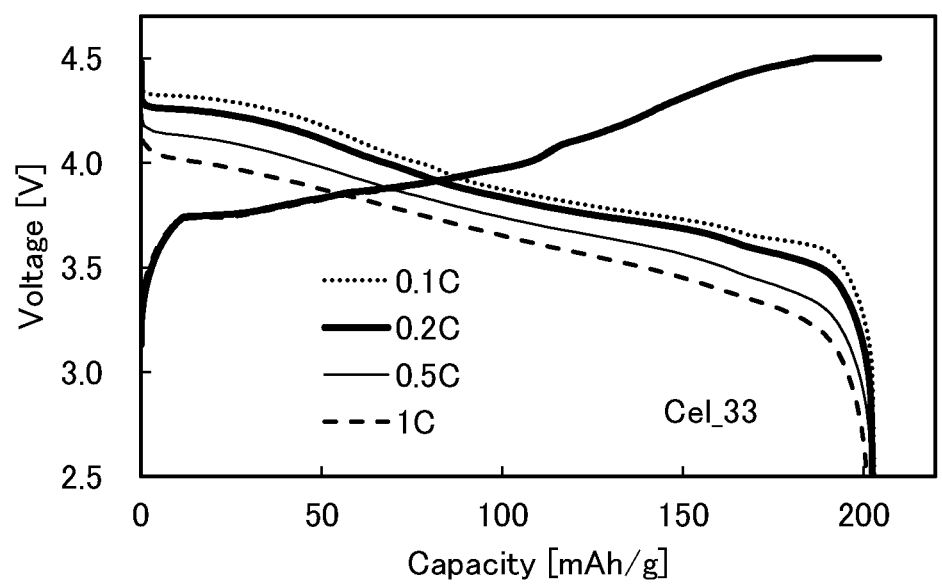
FIG. 31 is a diagram showing charge and discharge curves of a secondary battery.

The cycle performance of the cell Cel_31 to the cell Cel_33 at 10° C. is shown in FIG. 30A, FIG. 30B, and FIG. 31, respectively.

It was found from FIG. 30A, FIG. 30B, and FIG. 31 that also under the condition with a relatively low temperature of 10° C., discharge capacity higher than or equal to 98% of that at 0.1 C was obtained at a rate of 0.5 C. In addition, at a rate of 1 C, the Cel_31 had discharge capacity higher than or equal to 97% of that at 0.1 C, and thus extremely excellent rate performance was achieved. In the Cel_32, discharge capacity decreased and remained at approximately 60% of that at 0.1 C.

REFERENCE NUMERALS

111: positive electrode, 111a: positive electrode, 115: negative electrode, 115a: negative electrode, 121: positive electrode current collector, 122: positive electrode active material layer, 123: separator, 125: negative electrode current collector, 126: negative electrode active material layer, 130: electrode assembly, 131: electrode assembly, 211a: positive electrode, 211b: negative electrode, 212a: lead, 212b: lead, 214: separator, 250: secondary battery, 251: exterior body, 400: secondary battery, 401: positive electrode cap, 402: device, 402a: housing, 402b: secondary battery, 403: device, 403a: housing, 403b: secondary battery, 405: watch-type device, 405a: display portion, 405b: belt portion, 406: belt-type device, 406a: belt portion, 406b: wireless power feeding and receiving portion, 413: conductive plate, 414: conductive plate, 415: power storage system, 416: wiring, 420: control circuit, 421: wiring, 422: wiring, 423: wiring, 424: conductor, 425: insulator, 426: wiring, 490: glasses-type device, 490a: frame, 490b: display portion, 491: headset-type device, 491a: microphone portion, 491b: flexible pipe, 491c: earphone portion, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 513: secondary battery, 514: terminal, 515: sealant, 517: antenna, 519: layer, 521: sealing portion, 522: sealing portion, 523: sealing portion, 529: label, 531: secondary battery pack, 540: circuit board, 551: one, 552: the other, 590: control circuit, 590*a*: circuit system, 590*b*: circuit system, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 613: safety valve mechanism, 730: charge control circuit, 900: circuit board, 910: label, 911: terminal, 912: battery control circuit, 913: secondary battery, 914: antenna, 915: sealant, 916: layer, 917: layer, 918: antenna, 920: display device, 921: sensor, 922: terminal, 930: housing, 931: negative electrode, 932: positive electrode, 933: separator, 950: wound body, 951: terminal, 952: terminal, 971: electrode, 972: electrode, 981: film, 982: film, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 7000: robot, 7100: portable display device, 7101: housing, 7102: display portion, 7103: operation button, 7104: storage battery, 7120: flying object, 7140: cleaning robot, 7160: electric vehicle, 7200: portable information terminal, 7201: housing, 7202: display portion, 7203: band, 7204: buckle, 7205: operation button, 7206: input output terminal, 7207: icon, 7210: smartphone, 7220: PC, 7240: game machine, 7260: game machine, 7262: controller, 7300: display device, 7304: display portion, 7400: mobile phone, 7401: housing, 7402: display portion, 7403: operation button, 7404: external connection port, 7405: speaker, 7406: microphone, 7407: storage battery, 7408: control circuit, 7500: electronic cigarette, 7501: atomizer, 7504: secondary battery, 8000: display device, 8001: housing, 8002: display portion, 8003: speaker portion, 8004: secondary battery, 8005: audio input device, 8007: speaker, 8008: display portion, 8009: portable information terminal, 8010: charging module, 8021: charging apparatus, 8022: cable, 8024: power storage system, 8100: lighting device, 8101: housing, 8102: light source, 8103: secondary battery, 8104: roof, 8105: sidewall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator compartment, 8303: freezer compartment, 8304: secondary battery, 8400: automobile, 8401: headlight, 8406: electric motor, 8500: automobile, 8600: motor scooter, 8601: side mirror, 8602: power storage system, 8603: indicator light, 8604: storage unit under seat, 8700: electric bicycle, 8701: storage battery, 8702: power storage system, 8703: display portion, 8704: control circuit, 9600: tablet terminal, 9601: laptop personal computer, 9625: switch, 9626: switch, 9627: power switch, 9628: operation switch, 9629: fastener, 9630: housing, 9630*a*: housing, 9630*b*: housing, 9630B: housing, 9631: display portion, 9633: solar cell, 9634: control circuit, 9635: power storage unit, 9640: movable portion, 9650: keyboard portion

The invention claimed is:

1. A secondary battery comprising a positive electrode, a negative electrode, an electrolyte solution, and an exterior body,
   wherein the positive electrode comprises a positive electrode active material,
   wherein the positive electrode active material comprises lithium, cobalt, nickel, oxygen, magnesium, and fluorine,
   wherein the number of magnesium atoms in the positive electrode active material is greater than or equal to 0.001 times and less than or equal to 0.1 times the number of cobalt atoms in the positive electrode active material,
   wherein the proportion of the number of nickel atoms to the sum of the number of cobalt atoms and nickel atoms in the positive electrode active material is less than 0.1,
   wherein the positive electrode active material comprises a region having a layered rock-salt crystal structure,
   wherein the electrolyte solution comprises an ionic liquid,
   wherein the exterior body comprises a metal layer and a polymer layer stacked over the metal layer, and
   wherein the polymer layer comprises a region in contact with the electrolyte solution.

2. The secondary battery according to claim 1,
   wherein the ionic liquid comprises a compound represented by:

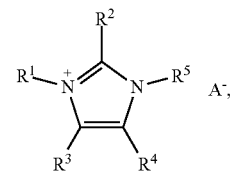

where:

$R^1$ represents an alkyl group having 1 to 4 carbon atoms;

$R^2$ to $R^4$ each independently represent a hydrogen atom or an alkyl group having 1 to 4 carbon atoms;

$R^5$ represents an alkyl group; and $A^-$ is one or more of a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

3. The secondary battery according to claim 1,
   wherein the ionic liquid comprises a compound represented by:

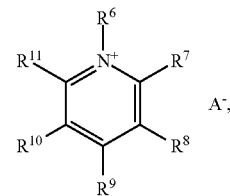

where:

$R^6$ represents an alkyl group; and $R^7$ to $R^{11}$ each independently represent a hydrogen atom or an alkyl group having 1 to 4 carbon atoms.

4. The secondary battery according to claim 1,
   wherein the ionic liquid comprises a quaternary ammonium cation.

5. The secondary battery according to claim 4, wherein the ionic liquid is one or more selected from
   General Formula (G4), General Formula (G5), and General Formula (G6),

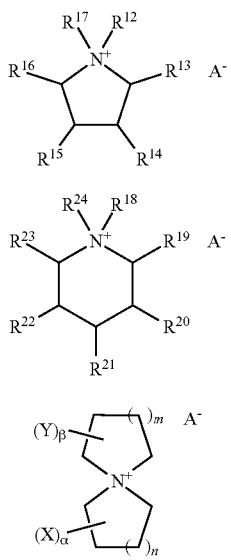

(G4)

(G5)

(G6)

where:

R$^{12}$ to R$^{17}$ and R$^{18}$ to R$^{24}$ each independently represent an alkyl group, having 1 to 20 carbon atoms, a methoxy group, a methoxymethyl group, a methoxyethyl group, or a hydrogen atom;

n and m are greater than or equal to 1 and less than or equal to 3;

α is greater than or equal to 0 and less than or equal to 6;

β is greater than or equal to 0 and less than or equal to 6; and each of X and Y represents a substituent which is a straight-chain alkyl group having 1 to 4 carbon atoms, a straight-chain alkoxy group having 1 to 4 carbon atoms, or a straight-chain alkoxyalkyl group having 1 to 4 carbon atoms.

6. The secondary battery according to claim 1, wherein the ionic liquid comprises a compound represented by:

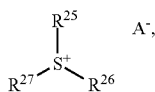

where R$^{25}$ to R$^{27}$ each independently represent a hydrogen atom, an alkyl group having 1 to 4 carbon atoms, or a phenyl group.

7. The secondary battery according to claim 1, wherein the ionic liquid comprises a compound represented by:

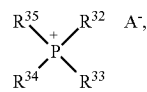

where R$^{32}$ to R$^{35}$ each independently represent a hydrogen atom, an alkyl group having 1 to 4 carbon atoms, or a phenyl group.

8. The secondary battery according to claim 1, wherein an anion of the ionic liquid is (FSO$_2$)$_2$N$^-$ or (CF$_3$SO$_2$)$_2$N$^-$.

9. The secondary battery according to claim 1, wherein an anion of the ionic liquid is (FSO$_2$)$_2$N$^-$ or (CF$_3$SO$_2$)$_2$N$^-$, and wherein the negative electrode comprises graphite.

10. The secondary battery according to claim 1, wherein the ionic liquid comprises a compound represented by:

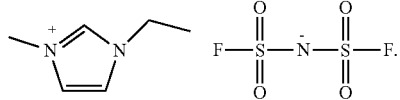

11. The secondary battery according to claim 1, wherein the ionic liquid comprises a compound represented by:

12. The secondary battery according to claim 1, wherein the ionic liquid comprises a compound represented by:

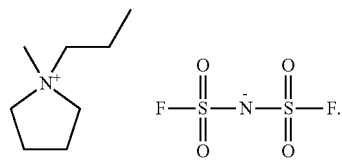

* * * * *